US011489700B2

(12) United States Patent
Zach et al.

(10) Patent No.: US 11,489,700 B2
(45) Date of Patent: Nov. 1, 2022

(54) NON-LINEAR REFERENCE SIGNAL DESIGN

(71) Applicant: QUALCOMM Incorporated, San Diego, CA (US)

(72) Inventors: Noam Zach, Kiryat Ono (IL); Ori Ben Shahar, Petach Tikva (IL); Guy Wolf, Rosh Haayin (IL); Sharon Levy, Binyamina (IL); Igor Gutman, Ramat Gan (IL); Ory Eger, Tel Aviv (IL); Assaf Touboul, Netanya (IL)

(73) Assignee: Qualcomm Incorporated, San Diego, CA (US)

( * ) Notice: Subject to any disclaimer, the term of this patent is extended or adjusted under 35 U.S.C. 154(b) by 117 days.

(21) Appl. No.: 17/141,190

(22) Filed: Jan. 4, 2021

(65) Prior Publication Data
US 2022/0217017 A1 Jul. 7, 2022

(51) Int. Cl.
*H04L 25/02* (2006.01)
*H04W 24/10* (2009.01)
*H04L 5/00* (2006.01)

(52) U.S. Cl.
CPC ........ *H04L 25/0224* (2013.01); *H04L 5/0023* (2013.01); *H04L 5/0048* (2013.01); *H04L 25/0204* (2013.01); *H04W 24/10* (2013.01)

(58) Field of Classification Search
CPC . H04L 5/0023; H04L 5/0048; H04L 25/0204; H04L 25/0224; H04W 24/10
See application file for complete search history.

(56) References Cited

U.S. PATENT DOCUMENTS

| 2010/0075706 A1 | 3/2010 | Montojo et al. |
| 2018/0083744 A1* | 3/2018 | Kim ............... H04L 5/0058 |
| 2019/0190552 A1 | 6/2019 | Sagi et al. |

FOREIGN PATENT DOCUMENTS

EP   2608410 A1   6/2013

OTHER PUBLICATIONS

International Search Report and Written Opinion—PCT/US2021/072704—ISA/EPO—dated Apr. 5, 2022.

* cited by examiner

*Primary Examiner* — David B Lugo
(74) *Attorney, Agent, or Firm* — Holland & Hart LLP

(57) ABSTRACT

Methods, systems, and devices for wireless communications are described. A receiving device may receive a channel estimation reference signal (CHEST-RS) transmitted over a bandwidth, the CHEST-RS associated with a power amplifier (PA) configuration of a transmitting device. The receiving device may determine a channel estimation measurement associated with the PA configuration based at least in part on the CHEST-RS. The receiving device may receive a non-linear estimation reference signal (NLEST-RS) transmitted over a subset bandwidth of the bandwidth, the NLEST-RS associated with the PA configuration. The receiving device may determine a non-linear estimation measurement associated with the PA configuration based at least in part on the NLEST-RS and the CHEST-RS, the non-linear estimation measurement identifying a non-linear response of the PA configuration. The receiving device may communicate with the transmitting device based at least in part on the channel estimation measurement and the non-linear response of the PA configuration.

30 Claims, 26 Drawing Sheets

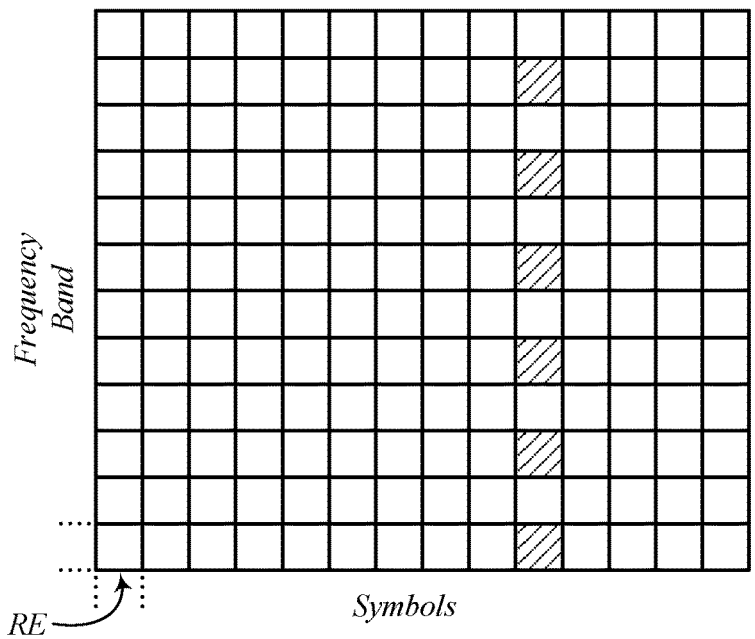
FIG. 4A
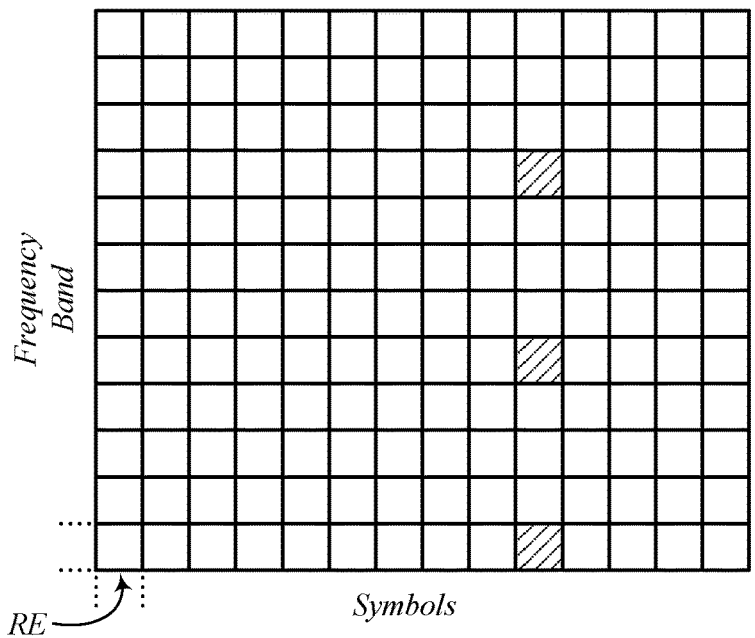
FIG. 4B

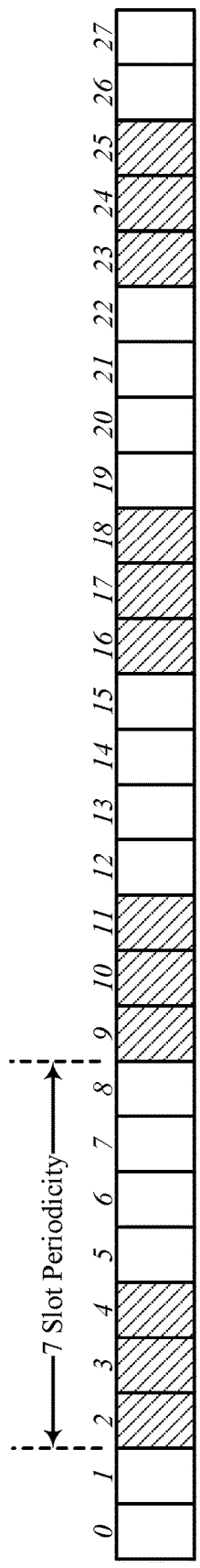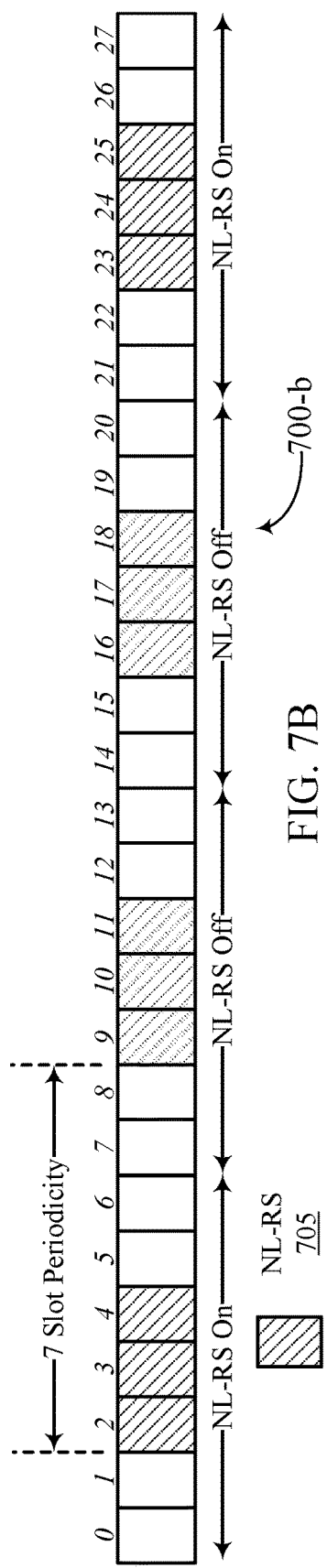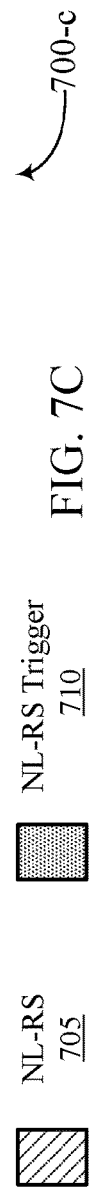
FIG. 7A
FIG. 7B
FIG. 7C

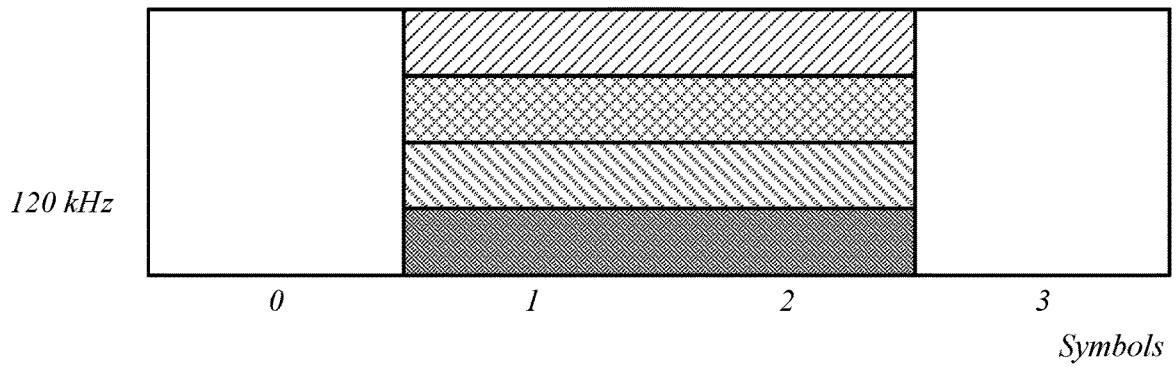
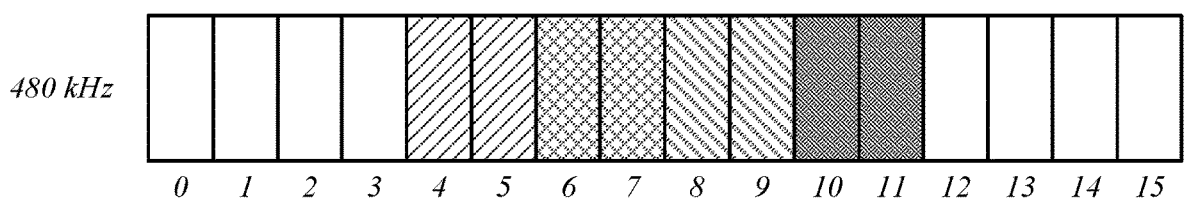
FIG. 8

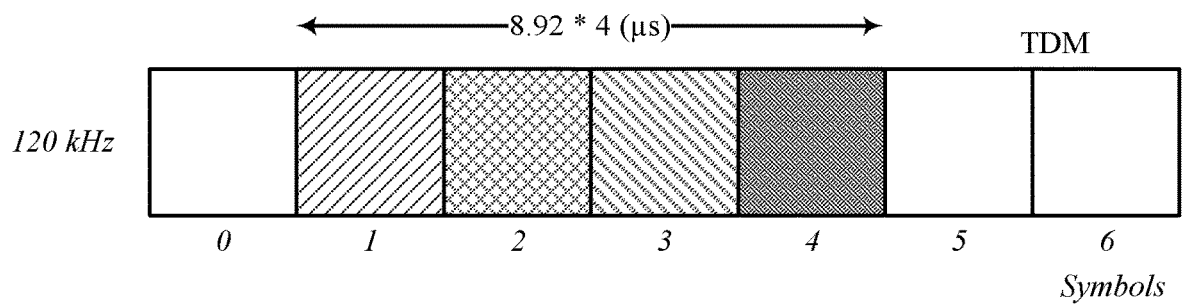
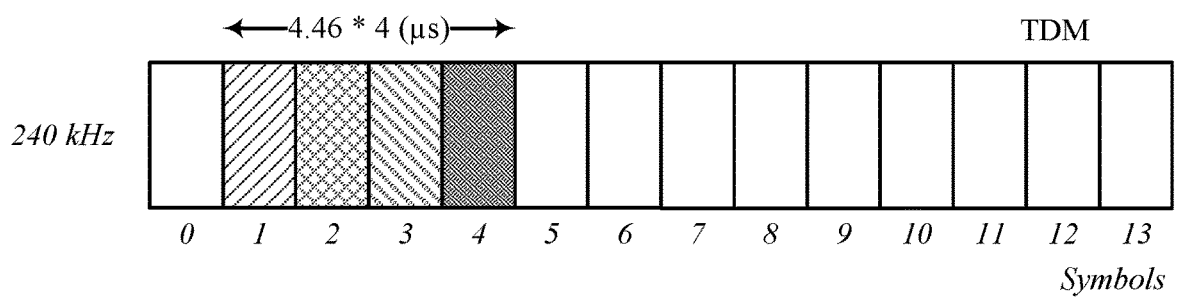
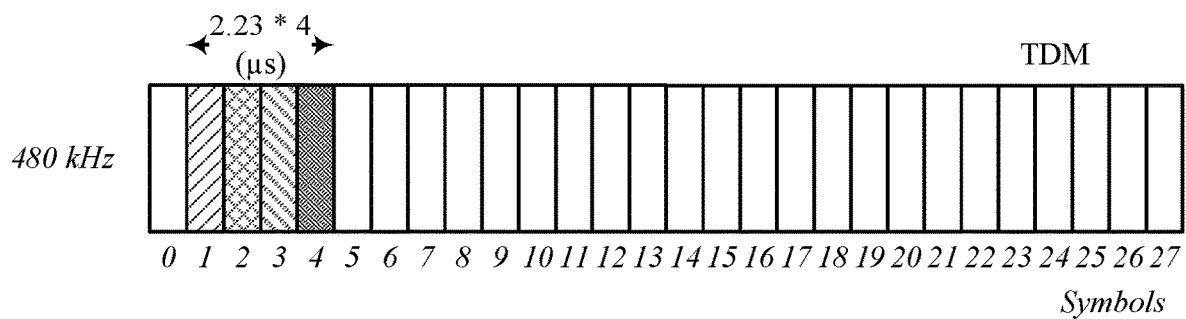
 NL-RS 0
905
 NL-RS 2
915
 NL-RS 1
910
 NL-RS 3
920
FIG. 9 — 900

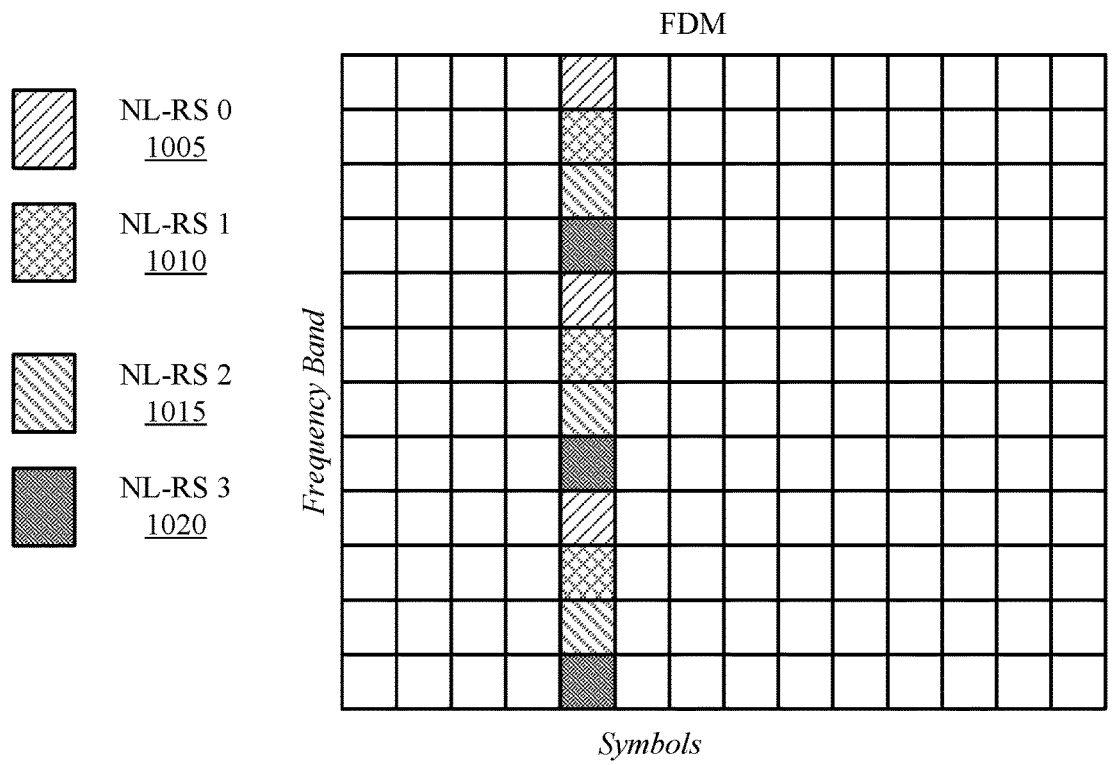
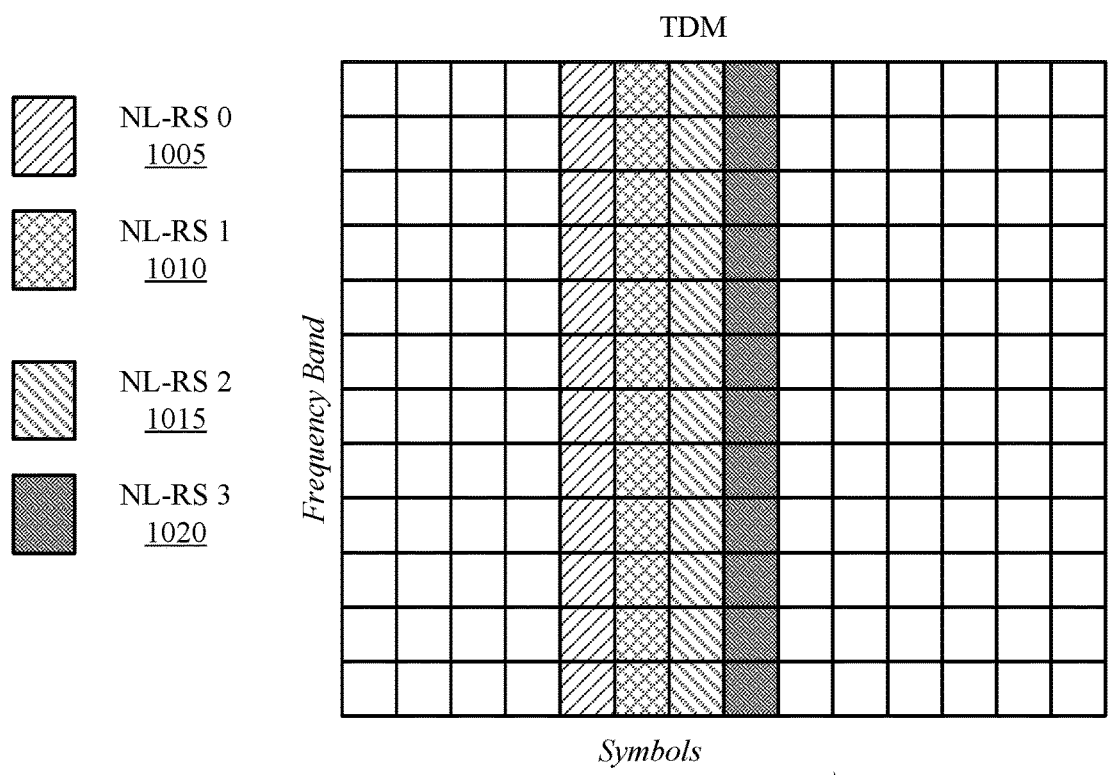
FIG. 10

NON-LINEAR REFERENCE SIGNAL DESIGN

FIELD OF TECHNOLOGY

The following relates to wireless communications, including non-linear reference signal design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support non-linear reference signal design and communication. Generally, the described techniques provide various mechanisms that support wireless communications in a wireless network. Aspects of the described techniques support various mechanisms for a non-linear reference signal (NL-RS) used to measure or quantify a non-linear response of power amplifier (PA) configuration of a transmitting device, such as a base station and/or user equipment (UE). The transmitting device may configure, for example, a channel estimation reference signal (CHEST-RS) and a non-linear estimation reference signal (NLEST-RS) for transmission to a receiving device. The receiving device may receive the CHEST-RS and NLEST-RS signals, among other information, and use these to measure the non-linear response of the PA configuration for the corresponding transmitting device (e.g., the base station). For example, the receiving device may measure, identify, quantify, or otherwise determine a channel estimation measurement (e.g., based on the CHEST-RS) and a non-linear estimation measurement (e.g., based on the NLEST-RS) for a specific PA configuration. The receiving device may then communicate with the transmitting device according to the channel response (e.g., based on the CHEST-RS) and the non-linear response (e.g., based on the NLEST-RS). For example, the receiving device may transmit or otherwise provide feedback information to the transmitting device indicating at least some aspects of the channel estimation measurement, or the non-linear estimation measurement, or both, among other aspects. The transmitting device may perform mitigation of interference, such as noise, introduced into the channel associated with the non-linear response of the transmitting device. The transmitting device may configure the receiving device with the CHEST-RS and NLEST-RS resources, which may be the same or different between the two reference signals.

To avoid excessive indices associated with the NLEST-RS (e.g., particularly when each NLEST-RS is associated with different antenna configurations), the base station may in some examples adopt a dynamic numerology scheme for the NLEST-RS. For example, the numbering scheme may include some indices being reused based on the antenna configuration/PA configuration basis. That is, one or more numerologies (e.g., numbers, indices, or other identifiers) may be reused for some antenna configurations. For example, a numerology of a NLEST-RS associated with a particular PA configuration/antenna configuration may be reused for a different PA configuration/antenna configuration. More particularly, a set of numerologies associated with one PA configuration may be assigned or otherwise associated with a corresponding set of antenna configurations. Those numerologies may then be reused for the same set of antenna configurations, but with a different PA configuration. Other reuse techniques may also be implemented. Accordingly, the transmitting device and the receiving device may use the dynamic numerology scheme for the NLEST-RS transmissions.

A method for wireless communication at a receiving device is described. The method may include receiving, from a transmitting device, a CHEST-RS transmitted over a bandwidth, the CHEST-RS associated with a PA configuration of the transmitting device, determining a channel estimation measurement associated with the PA configuration based on the CHEST-RS, receiving, from the transmitting device, a NLEST-RS transmitted over a subset bandwidth of the bandwidth, the NLEST-RS associated with the PA configuration, determining a non-linear estimation measurement associated with the PA configuration based on the NLEST-RS and the CHEST-RS, the non-linear estimation measurement identifying a non-linear response of the PA configuration, and communicating with the transmitting device based on the channel estimation measurement and the non-linear response of the PA configuration.

An apparatus for wireless communication at a receiving device is described. The apparatus may include a processor, memory in electronic communication with the processor, and instructions stored in the memory. The instructions may be executable by the processor to cause the apparatus to receive, from a transmitting device, a CHEST-RS transmitted over a bandwidth, the CHEST-RS associated with a PA configuration of the transmitting device, determine a channel estimation measurement associated with the PA configuration based on the CHEST-RS, receive, from the transmitting device, a NLEST-RS transmitted over a subset bandwidth of the bandwidth, the NLEST-RS associated with the PA configuration, determine a non-linear estimation measurement associated with the PA configuration based on the NLEST-RS and the CHEST-RS, the non-linear estimation measurement identifying a non-linear response of the PA configuration, and communicate with the transmitting device based on the channel estimation measurement and the non-linear response of the PA configuration.

Another apparatus for wireless communication at a receiving device is described. The apparatus may include means for receiving, from a transmitting device, a CHEST-RS transmitted over a bandwidth, the CHEST-RS associated with a PA configuration of the transmitting device, means for determining a channel estimation measurement associated with the PA configuration based on the CHEST-RS, means for receiving, from the transmitting device, a NLEST-RS transmitted over a subset bandwidth of the bandwidth, the NLEST-RS associated with the PA configuration, means for determining a non-linear estimation measurement associated with the PA configuration based on the NLEST-RS and the CHEST-RS, the non-linear estimation measurement identifying a non-linear response of the PA configuration, and means for communicating with the transmitting device based on the channel estimation measurement and the non-linear response of the PA configuration.

A non-transitory computer-readable medium storing code for wireless communication at a receiving device is described. The code may include instructions executable by a processor to receive, from a transmitting device, a CHEST-RS transmitted over a bandwidth, the CHEST-RS associated with a PA configuration of the transmitting device, determine a channel estimation measurement associated with the PA configuration based on the CHEST-RS, receive, from the transmitting device, a NLEST-RS transmitted over a subset bandwidth of the bandwidth, the NLEST-RS associated with the PA configuration, determine a non-linear estimation measurement associated with the PA configuration based on the NLEST-RS and the CHEST-RS, the non-linear estimation measurement identifying a non-linear response of the PA configuration, and communicate with the transmitting device based on the channel estimation measurement and the non-linear response of the PA configuration.

Some examples of the method, apparatuses, and non-transitory computer-readable medium described herein may further include operations, features, means, or instructions for receiving a signal identifying a resource configuration for the CHEST-RS, the NLEST-RS, or both, where the CHEST-RS and the NLEST-RS may be received based on receiving the signal identifying the resource configuration, the resource configuration for the CHEST-RS and the resource configuration for the NLEST-RS including a same resource configuration or a different resource configurations.

Some examples of the method, apparatuses, and non-transitory computer-readable medium described herein may further include operations, features, means, or instructions for receiving one or more instances of the CHEST-RS according to a repetition pattern of the CHEST-RS, where the channel estimation measurement may be based on receiving the one or more instances of the CHEST-RS.

Some examples of the method, apparatuses, and non-transitory computer-readable medium described herein may further include operations, features, means, or instructions for receiving one or more instances of the NLEST-RS according to a repetition pattern of the NLEST-RS, where the non-linear estimation measurement may be based on the one or more instances of the NLEST-RS.

Some examples of the method, apparatuses, and non-transitory computer-readable medium described herein may further include operations, features, means, or instructions for identifying an antenna configuration of the CHEST-RS, where the channel estimation measurement may be for the antenna configuration and the PA configuration.

Some examples of the method, apparatuses, and non-transitory computer-readable medium described herein may further include operations, features, means, or instructions for identifying an antenna configuration of the NLEST-RS, where the non-linear estimation measurement may be for the antenna configuration and the PA configuration.

Some examples of the method, apparatuses, and non-transitory computer-readable medium described herein may further include operations, features, means, or instructions for receiving the CHEST-RS includes receiving during a first symbol, and receiving the NLEST-RS includes receiving during a second symbol following the first symbol.

Some examples of the method, apparatuses, and non-transitory computer-readable medium described herein may further include operations, features, means, or instructions for receiving one or more instances of the CHEST-RS and one or more instances of the non-linear reference signal according to a periodic schedule, a semi-persistent schedule, aperiodically, or any combination thereof.

A method for wireless communication at a transmitting device is described. The method may include identifying a CHEST-RS and a NLEST-RS associated with a PA configuration of the transmitting device, transmitting, to a receiving device, the CHEST-RS transmitted over a bandwidth, transmitting, to the receiving device, the NLEST-RS transmitted over a subset bandwidth of the bandwidth, and communicating with the receiving device based on a channel estimation measurement based on the CHEST-RS and a non-linear response of the PA configuration based on the NLEST-RS and the CHEST-RS.

An apparatus for wireless communication at a transmitting device is described. The apparatus may include a processor, memory in electronic communication with the processor, and instructions stored in the memory. The instructions may be executable by the processor to cause the apparatus to identify a CHEST-RS and a NLEST-RS associated with a PA configuration of the transmitting device, transmit, to a receiving device, the CHEST-RS transmitted over a bandwidth, transmit, to the receiving device, the NLEST-RS transmitted over a subset bandwidth of the bandwidth, and communicate with the receiving device based on a channel estimation measurement based on the CHEST-RS and a non-linear response of the PA configuration based on the NLEST-RS and the CHEST-RS.

Another apparatus for wireless communication at a transmitting device is described. The apparatus may include means for identifying a CHEST-RS and a NLEST-RS associated with a PA configuration of the transmitting device, means for transmitting, to a receiving device, the CHEST-RS transmitted over a bandwidth, means for transmitting, to the receiving device, the NLEST-RS transmitted over a subset bandwidth of the bandwidth, and means for communicating with the receiving device based on a channel estimation measurement based on the CHEST-RS and a non-linear response of the PA configuration based on the NLEST-RS and the CHEST-RS.

A non-transitory computer-readable medium storing code for wireless communication at a transmitting device is described. The code may include instructions executable by a processor to identify a CHEST-RS and a NLEST-RS associated with a PA configuration of the transmitting device, transmit, to a receiving device, the CHEST-RS transmitted over a bandwidth, transmit, to the receiving device, the NLEST-RS transmitted over a subset bandwidth of the bandwidth, and communicate with the receiving device based on a channel estimation measurement based on the CHEST-RS and a non-linear response of the PA configuration based on the NLEST-RS and the CHEST-RS.

Some examples of the method, apparatuses, and non-transitory computer-readable medium described herein may further include operations, features, means, or instructions for transmitting a signal identifying a resource configuration for the CHEST-RS, the NLEST-RS, or both, where the CHEST-RS and the NLEST-RS may be transmitted based on the signal identifying the resource configuration, the resource configuration for the CHEST-RS and the resource configuration for the NLEST-RS including a same resource configuration or a different resource configuration.

Some examples of the method, apparatuses, and non-transitory computer-readable medium described herein may further include operations, features, means, or instructions for transmitting one or more instances of the CHEST-RS according to a repetition pattern of the CHEST-RS, where the channel estimation measurement may be based on transmitting the one or more instances of the CHEST-RS.

Some examples of the method, apparatuses, and non-transitory computer-readable medium described herein may further include operations, features, means, or instructions for selecting an de-boosted transmit power level for the CHEST-RS.

Some examples of the method, apparatuses, and non-transitory computer-readable medium described herein may further include operations, features, means, or instructions for transmitting one or more instances of the NLEST-RS according to a repetition pattern of the NLEST-RS, where the non-linear estimation measurement may be based on the one or more instances of the NLEST-RS.

Some examples of the method, apparatuses, and non-transitory computer-readable medium described herein may further include operations, features, means, or instructions for selecting a boosted transmit power level for the CHEST-RS.

Some examples of the method, apparatuses, and non-transitory computer-readable medium described herein may further include operations, features, means, or instructions for identifying an antenna configuration of the CHEST-RS, where the channel estimation measurement may be for the antenna configuration and the PA configuration.

Some examples of the method, apparatuses, and non-transitory computer-readable medium described herein may further include operations, features, means, or instructions for identifying an antenna configuration of the NLEST-RS, where the non-linear estimation measurement may be for the antenna configuration and the PA configuration.

Some examples of the method, apparatuses, and non-transitory computer-readable medium described herein may further include operations, features, means, or instructions for transmitting the CHEST-RS includes transmitting during a first symbol, and transmitting the NLEST-RS includes transmitting during a second symbol following the first symbol.

Some examples of the method, apparatuses, and non-transitory computer-readable medium described herein may further include operations, features, means, or instructions for transmitting one or more instances of the CHEST-RS and one or more instances of the non-linear reference signal according to a periodic schedule, a semi-persistent schedule, aperiodically, or any combination thereof.

A method for wireless communication at a receiving device is described. The method may include determining a dynamic numerology scheme associated with one or more NLEST-RSs to be transmitted from a transmitting device according to corresponding one or more antenna configurations, each NLEST-RS associated with a corresponding antenna configuration and a PA configuration, receiving, from the transmitting device, a NLEST-RS associated with a PA configuration of the transmitting device, determining a numerology associated with the NLEST-RS based on the dynamic numerology scheme and a non-linear response of the PA configuration that is based on the NLEST-RS and the numerology, and communicating with the transmitting device based on the non-linear response of the PA configuration.

An apparatus for wireless communication at a receiving device is described. The apparatus may include a processor, memory in electronic communication with the processor, and instructions stored in the memory. The instructions may be executable by the processor to cause the apparatus to determine a dynamic numerology scheme associated with one or more NLEST-RSs to be transmitted from a transmitting device according to corresponding one or more antenna configurations, each NLEST-RS associated with a corresponding antenna configuration and a PA configuration, receive, from the transmitting device, a NLEST-RS associated with a PA configuration of the transmitting device, determine a numerology associated with the NLEST-RS based on the dynamic numerology scheme and a non-linear response of the PA configuration that is based on the NLEST-RS and the numerology, and communicate with the transmitting device based on the non-linear response of the PA configuration.

Another apparatus for wireless communication at a receiving device is described. The apparatus may include means for determining a dynamic numerology scheme associated with one or more NLEST-RSs to be transmitted from a transmitting device according to corresponding one or more antenna configurations, each NLEST-RS associated with a corresponding antenna configuration and a PA configuration, means for receiving, from the transmitting device, a NLEST-RS associated with a PA configuration of the transmitting device, means for determining a numerology associated with the NLEST-RS based on the dynamic numerology scheme and a non-linear response of the PA configuration that is based on the NLEST-RS and the numerology, and means for communicating with the transmitting device based on the non-linear response of the PA configuration.

A non-transitory computer-readable medium storing code for wireless communication at a receiving device is described. The code may include instructions executable by a processor to determine a dynamic numerology scheme associated with one or more NLEST-RSs to be transmitted from a transmitting device according to corresponding one or more antenna configurations, each NLEST-RS associated with a corresponding antenna configuration and a PA configuration, receive, from the transmitting device, a NLEST-RS associated with a PA configuration of the transmitting device, determine a numerology associated with the NLEST-RS based on the dynamic numerology scheme and a non-linear response of the PA configuration that is based on the NLEST-RS and the numerology, and communicate with the transmitting device based on the non-linear response of the PA configuration.

Some examples of the method, apparatuses, and non-transitory computer-readable medium described herein may further include operations, features, means, or instructions for determining that transmission of the NLEST-RS may be switched from a first multiplexing technique to a second multiplexing technique of one or more multiplexing techniques and receiving, based on the dynamic numerology scheme, the NLEST-RS according to the second multiplexing technique using an index number associated with the NLEST-RS for the first multiplexing technique.

Some examples of the method, apparatuses, and non-transitory computer-readable medium described herein may further include operations, features, means, or instructions for identifying, based on the dynamic numerology scheme, the index number associated with the NLEST-RS for the first multiplexing technique, where the NLEST-RS may be received according to the second multiplexing technique based on the index number.

In some examples of the method, apparatuses, and non-transitory computer-readable medium described herein, the first multiplexing technique includes a frequency division multiplexing technique and the second multiplexing technique includes a time division multiplexing technique.

In some examples of the method, apparatuses, and non-transitory computer-readable medium described herein, the first multiplexing technique and the second multiplexing technique each include a respective time division multiplexing technique.

In some examples of the method, apparatuses, and non-transitory computer-readable medium described herein, the one or more multiplexing techniques include a frequency division multiplexing technique, a time division multiplexing technique, a code division multiplexing technique, or any combination thereof.

A method for wireless communication at a transmitting device is described. The method may include determining a dynamic numerology scheme associated with one or more NLEST-RSs to be transmitted to a receiving device according to corresponding one or more antenna configurations, each NLEST-RS associated with a corresponding antenna configuration and PA configuration, transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology, and communicating with the receiving device based on the non-linear response of the PA configuration.

An apparatus for wireless communication at a transmitting device is described. The apparatus may include a processor, memory in electronic communication with the processor, and instructions stored in the memory. The instructions may be executable by the processor to cause the apparatus to determine a dynamic numerology scheme associated with one or more NLEST-RSs to be transmitted to a receiving device according to corresponding one or more antenna configurations, each NLEST-RS associated with a corresponding antenna configuration and PA configuration, transmit, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology, and communicate with the receiving device based on the non-linear response of the PA configuration.

Another apparatus for wireless communication at a transmitting device is described. The apparatus may include means for determining a dynamic numerology scheme associated with one or more NLEST-RSs to be transmitted to a receiving device according to corresponding one or more antenna configurations, each NLEST-RS associated with a corresponding antenna configuration and PA configuration, means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology, and means for communicating with the receiving device based on the non-linear response of the PA configuration.

A non-transitory computer-readable medium storing code for wireless communication at a transmitting device is described. The code may include instructions executable by a processor to determine a dynamic numerology scheme associated with one or more NLEST-RSs to be transmitted to a receiving device according to corresponding one or more antenna configurations, each NLEST-RS associated with a corresponding antenna configuration and PA configuration, transmit, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology, and communicate with the receiving device based on the non-linear response of the PA configuration.

Some examples of the method, apparatuses, and non-transitory computer-readable medium described herein may further include operations, features, means, or instructions for determining that transmission of the NLEST-RS may have switched from a first multiplexing technique to a second multiplexing technique of the one or more multiplexing techniques and transmitting, based on the dynamic numerology scheme, the NLEST-RS according to the second multiplexing technique using an index number associated with the NLEST-RS for the first multiplexing technique.

Some examples of the method, apparatuses, and non-transitory computer-readable medium described herein may further include operations, features, means, or instructions for identifying, based on the dynamic numerology scheme, the index number associated with the NLEST-RS for the first multiplexing technique, where the NLEST-RS may be transmitted according to the second multiplexing technique based on the index number.

In some examples of the method, apparatuses, and non-transitory computer-readable medium described herein, the first multiplexing technique includes a frequency division multiplexing technique and the second multiplexing technique includes a time division multiplexing technique.

In some examples of the method, apparatuses, and non-transitory computer-readable medium described herein, the first multiplexing technique and the second multiplexing technique each include a respective time division multiplexing technique.

In some examples of the method, apparatuses, and non-transitory computer-readable medium described herein, the one or more multiplexing techniques include a frequency division multiplexing technique, a time division multiplexing technique, a code division multiplexing technique, or any combination thereof.

BRIEF DESCRIPTION OF THE DRAWINGS

FIGS. 4A and 4B illustrate examples of a resource configuration that supports non-linear reference signal design in accordance with aspects of the present disclosure.

FIGS. 7A-7C illustrate examples of a resource configuration that supports non-linear reference signal design in accordance with aspects of the present disclosure.

FIG. 8 illustrates an example of a resource configuration that supports non-linear reference signal design in accordance with aspects of the present disclosure.

FIG. 9 illustrates an example of a resource configuration that supports non-linear reference signal design in accordance with aspects of the present disclosure.

FIG. 10 illustrates an example of a resource configuration that supports non-linear reference signal design in accordance with aspects of the present disclosure.

DETAILED DESCRIPTION

Figure 1:
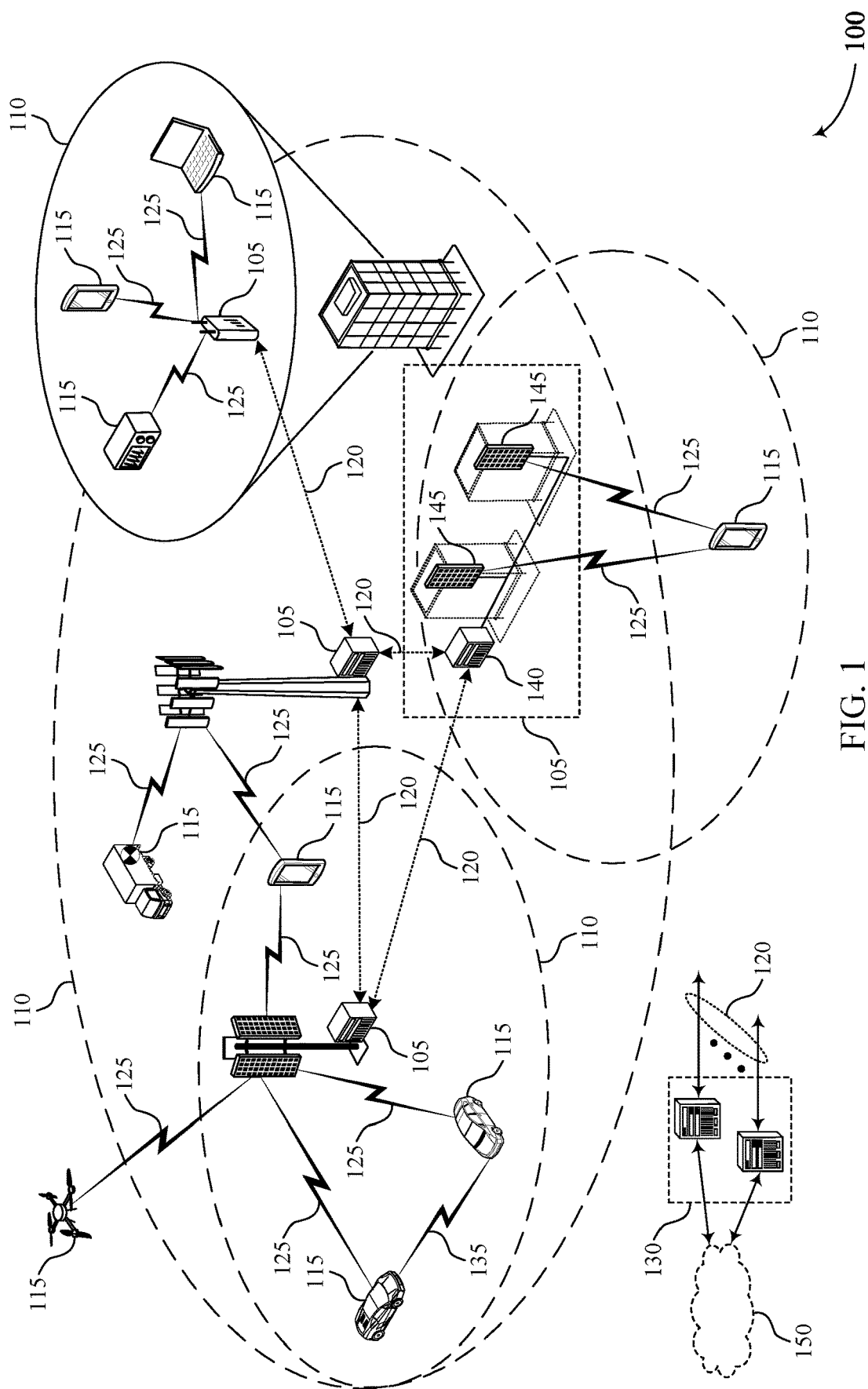
FIG. 1 illustrates an example of a wireless communications system that supports non-linear reference signal design in accordance with aspects of the present disclosure.

Some wireless communication systems may attempt power amplifier (PA) non-linear response estimation using different methods. The non-linear response generally refers to the non-linear portion of a response, such as a ramp-up curve, as the PA begins transmission until the PA reaches full transmit power level (e.g., saturation power). From the perspective of the receiving device (e.g., a base station and/or user equipment (UE)), the non-linear response may be difficult to quantify between a static front-end response of the transmitting device (e.g., the linear and non-linear components) and a dynamic response of the channel (e.g., the linear component and not the non-linear component). In some other different approaches to address this, the transmitting device (e.g., a base station and/or UE) may use predistortion compensation (e.g., the non-linear correction) based on reports from receiving devices. However, those reports are based on different channel responses, and therefore provide little insight into the non-linear portion of the PA response curve.

Additionally, simply adding a non-linear estimation reference signal (NLEST-RS) to the wireless medium to support non-linear response estimation may be problematic for some wireless networks. In particular, each NLEST-RS is based on a specific PA configuration (e.g., the full transmit chain, antenna configuration, beam configuration, antenna port, etc.) of the transmitting device. To support so many different PA configurations, multi-layer configurations, etc., the number of NLEST-RS may be significant. As each reference signal may be typically associated with a fixed number, index, or other identifier, the number of indices necessary to configure the NLEST-RS may be significant. This may lead to substantial over-the-air overhead signaling, processing, storage, etc., at the transmitting device, or receiving device, or both. Such overhead within the wireless network is difficult to work with and may markedly and adversely affect performance, and in some situations may even be impossible.

Aspects of the disclosure are initially described in the context of wireless communications systems. Generally, the described techniques provide various mechanisms that support wireless communications in a wireless network. Aspects of the described techniques support various mechanisms for a non-linear reference signal (NL-RS) used to measure or quantify a non-linear response of PA configuration of a transmitting device, such as a base station and/or UE. The transmitting device may configure, for example, a channel estimation reference signal (CHEST-RS) and a NLEST-RS for transmission to a receiving device. The receiving device may receive the CHEST-RS and NLEST-RS signals, among other information, and use these to measure the non-linear response of the PA configuration for the corresponding transmitting device (e.g., the base station). For example, the receiving device may measure, identify, quantify, or otherwise determine a channel estimation measurement (e.g., based on the CHEST-RS) and a non-linear estimation measurement (e.g., based on the NLEST-RS) for a specific PA configuration. The receiving device may then communicate with the transmitting device according to the channel response (e.g., based on the CHEST-RS) and the non-linear response (e.g., based on the NLEST-RS). For example, the receiving device may transmit or otherwise provide feedback information to the transmitting device indicating at least some aspects of the channel estimation measurement, or the non-linear estimation measurement, or both, among other aspects. The transmitting device may perform mitigation of interference, such as noise, introduced into the channel associated with the non-linear response of the transmitting device. The transmitting device may configure the receiving device with the CHEST-RS and NLEST-RS resources, which may be the same or different between the two reference signals.

To avoid excessive indices associated with the NLEST-RS (e.g., particularly when each NLEST-RS is associated with different antenna configurations), the base station may in some examples adopt a dynamic numerology scheme for the NLEST-RS. For example, the numbering scheme may include some indices being reused based on the antenna configuration/PA configuration basis. That is, one or more numerologies (e.g., numbers, indices, or other identifiers) may be reused for some antenna configurations. For example, a numerology of a NLEST-RS associated with a particular PA configuration/antenna configuration may be reused for a different PA configuration/antenna configuration. More particularly, a set of numerologies associated with one PA configuration may be assigned or otherwise associated with a corresponding set of antenna configurations. Those numerologies may then be reused for the same set of antenna configurations, but with a different PA configuration. Other reuse techniques may also be implemented.

Accordingly, the transmitting device and the receiving device may use the dynamic numerology scheme for the NLEST-RS transmissions.

Aspects of the disclosure are further illustrated by and described with reference to apparatus diagrams, system diagrams, and flowcharts that relate to non-linear reference signal design.

FIG. 1 illustrates an example of a wireless communications system 100 that supports non-linear reference signal design in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both)

may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A receiving device (e.g., a UE 115 and/or base station 105) may receive, from a transmitting device (e.g., a UE 115 and/or base station 105), a CHEST-RS transmitted over a frequency band, the CHEST-RS associated with a PA configuration of the transmitting device. The receiving device may determine a channel estimation measurement associated with the PA configuration based at least in part on the CHEST-RS. The receiving device may receive, from the transmitting device, a NLEST-RS transmitted over a subset of the frequency band, the NLEST-RS associated with the PA configuration. The receiving device may determine a non-linear estimation measurement associated with the PA configuration based at least in part on the NLEST-RS and the CHEST-RS, the non-linear estimation measurement identifying a non-linear response of the PA configuration. The receiving device may communicate with the transmitting device based at least in part on the channel estimation measurement and the non-linear response of the PA configuration.

A transmitting device (e.g., a UE 115 and/or base station 105) may identify a CHEST-RS and a NLEST-RS associated with a PA configuration of the transmitting device. The transmitting device may transmit, to a receiving device, the CHEST-RS transmitted over a frequency band. The transmitting device may transmit, to the receiving device, the NLEST-RS transmitted over a subset of the frequency band. The transmitting device may communicate with the receiving device based at least in part on a channel estimation measurement based on the CHEST-RS and a non-linear response of the PA configuration based on the NLEST-RS and the CHEST-RS.

A receiving device (e.g., a UE 115 and/or base station 105) may determine a dynamic numerology scheme associated with one or more NLEST-RSs to be transmitted from the transmitting device according to corresponding one or more antenna configurations, each NLEST-RS associated with a corresponding antenna configuration and PA configuration. The receiving device may receive, from the transmitting device, the NLEST-RS associated with the PA configuration of the transmitting device. The receiving device may determine a numerology associated with the NLEST-RS based at least in part on the dynamic numerology scheme and a non-linear response of the PA configuration that is based at least in part on the NLEST-RS and the numerology. The receiving device may communicate with the transmitting device based at least in part on the non-linear response of the PA configuration.

A transmitting device (e.g., a UE 115 and/or base station 105) may determine a dynamic numerology scheme associated with one or more NLEST-RSs to be transmitted to a receiving device according to corresponding one or more antenna configurations, each NLEST-RS associated with a corresponding antenna configuration and PA configuration. The transmitting device may transmit, to the receiving device, the NLEST-RS associated with the PA configuration of the transmitting device, wherein a numerology associated with the NLEST-RS is based at least in part on the dynamic numerology scheme and a non-linear response of the PA configuration that is based at least in part on the NLEST-RS and the numerology. The transmitting device may communicate with the receiving device based at least in part on the non-linear response of the PA configuration.

Figure 2:
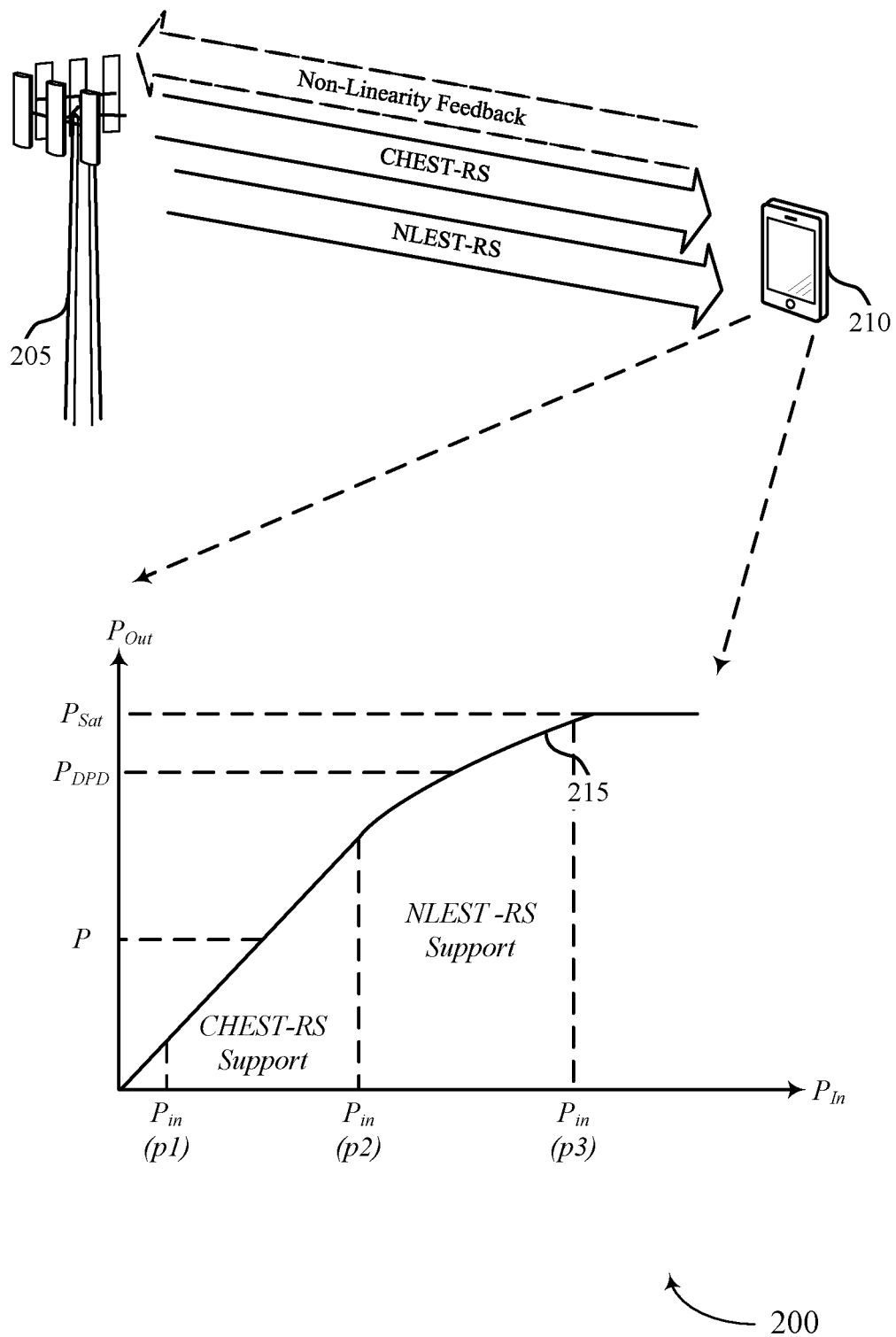
FIG. 2 illustrates an example of a wireless communication system that supports non-linear reference signal design in accordance with aspects of the present disclosure.

FIG. 2 illustrates an example of a wireless communication system 200 that supports non-linear reference signal design and communication in accordance with aspects of the present disclosure. Wireless communication system 200 may implement aspects or may be implemented by aspects of wireless communication system 100. Wireless communication system 200 may include base station 205 and/or UE 210, which may be examples of the corresponding devices described herein.

The techniques described herein are generally discussed with reference to a base station, such as base station 205, acting as the transmitting device and a UE, such as UE 210, acting as the receiving device. However, it is to be understood that the described techniques may be implemented to, and are therefore equally applicable to, a UE acting as the transmitting device and a base station acting as the receiving device. Therefore, the examples discussed herein are not limited to a base station acting as the transmitting device and a UE acting as the receiving device.

Wireless communication systems sometimes use various reference signal types, with each reference signal serving one or more specific purposes. For example, a channel state information reference signal (CSI-RS) may be used for channel state information (CSI) acquisition and beam management, e.g., to measure the downlink channel performance. Demodulation reference signal(s) (DMRS)(s) may be used to support demodulation of the accompanying transmissions (e.g., PDSCH, PUSCH, etc., transmissions). A phase tracking reference signal (PTRS) may be used to track phase and/or frequency within a wireless network, e.g., as phase noise tends to increase at higher operating frequencies. A sounding reference signal (SRS) may be used by a device (e.g., such as UE 210) to sound the uplink channel to determine the uplink channel performance characteristics. However, some functions associated with wireless communications are not supported by various reference signal design schemes. For example, various reference signal design schemes do not provide a mechanism that supports non-linearity response quantification and/or mitigation for a PA configuration of a transmitting device, such as base station 205 and/or UE 210.

An example PA response 215 is illustrated in FIG. 2. The PA response 215 is plotted showing the input power ($P_{in}$) to the PA on the horizontal axis and the output power ($P_{Out}$) of the PA on the vertical axis. At p1 the input power the PA may increase linearly through the region until p2. The region between p1 and p2 may be generally linear in that increases in the input power to the PA may result in a corresponding (e.g., linear) increase in the output power of the PA. As the input power continues to increase in the region between p2 and p3, the PA response 215 may become nonlinear in that increases in the input power to the PA may result in a corresponding non-linear increase in the output power of the PA until the PA reaches saturation ($P_{Sat}$) where the output power levels out. That is, an increase to the input power of X may correspond to an increase in the output power of Y, which may be different from X. Accordingly, the PA configuration of the transmitting device may include both a linear and a nonlinear component, with each component impacting, at least to some degree, channel performance, interference, and the like.

Some other different wireless communication systems attempt to provide PA configurations non-linearity response estimation for coverage enhancement. These other different approaches can involve two methods—digital post distortion (DPoD) or over-the-air digital pre-distortion (OTA-DPD)—both of which are implemented at the transmitting device. Because a transmitting device contains non-linear components, such as high-power amplifiers (HPAs)/PAs with limited linear dynamic range (DR), this may distort the transmitted signal due to a high peak-to-average-power-ratio (PAPR). The non-linear distortions may introduce in-band distortion, which impacts the link performance in terms of mutual information and/or error vector magnitudes (EVM). The non-linear distortions may also introduce out-of-band distortion, which may dictate the amount of adjacent channel interference (ACI). The ACI generally corresponds to how much the adjacent channel is "polluted" by the transmitted signal. To avoid such distortions, power back-off may be introduced, but this approach has its own limitations. For example, a higher the power back-off may have lower power efficiency for the transmitting device and less power being transmitted on the channel. A complementary method to power back-off is to use digital pre-distortion (DPD) in the transmitter's digital front-end. Using the DPD, the amount of distortion is maintained in some target level, while the power back-off is reduced to be as low as possible, and hence the PA efficiency is improved. However, DPD operations typically require signal sensing at the radio frequency (RF) circuit. For example, this approach typically requires the transmitted signal from all PAs to be received and measured for non-linearity estimation.

But in some other different wireless communication systems there may be a very high quantity of transmit antenna arrays used by the base stations (e.g., multiple spatial streams, transmission ports, beamforming configurations, antenna ports, etc.), with the cost of these feedback links being very high and, in some examples, impractical. For example, some RF architecture analog pre-coding and/or beamforming may impact the PA response. Accordingly, the receiving device will configure a response which depends on the transmit beam (or other spatial stream) used for the transmission.

Accordingly, in such wireless communication systems the non-linearity response estimation of a PA configuration of the transmitting device by the receiver side may be attempted for non-linearity compensation. However, the receiver side needs to be aware of the actual nonlinearity per-PA configuration at the transmitter side. Using the DPoD and/or OTA-DPD methods, it is difficult to separate between the static front end response of the transmitter (which includes both linear and non-linear components) and the dynamic response of the channel (which includes a linear component only). In OTA-DPD, the non-linear correction (e.g., pre-distortion) occurs in the transmitter based on reports from one or more UEs. When applying the method for downlink DPD, reports from multiple UEs (e.g., multiple receivers) are combined at the base station, where each report is based on different channel responses. Accordingly, the receiving device is unable to separate between the response of the static front end of the transmitter and the response of the channel, which may limit or render impractical proper non-linearity compensation.

In contrast, aspects of the described techniques provide various mechanisms that will enable separation between the static front end response of the transmitting device and the response of the channel, which will improve the performance of DPoD and OTA-DPD techniques, as well as other applicable techniques. The described techniques relate to reference signals, which include two new reference signals, to be utilized for non-linearity response of the transmitting device estimation and compensation, for example, a CHEST-RS and a NLEST-RS. It is to be understood that each transmission of a CHEST-RS and/or an NLEST-RS may be associated with a specific PA configuration of the transmitting device (which is generally described with reference to base station 205 in this example). Broadly, a PA configuration generally corresponds to a specific configuration of the RF architecture of the transmitting device. For example, a PA configuration may generally correspond to a specific transmit chain (e.g., including oscillator(s), PA(s), filter(s), switch(es), etc.), a spatial stream, a specific transmission port, a specific beamforming configuration (e.g., antenna array, beamforming direction, beamforming angle, antenna port, etc.), and the like.

In some aspects, the CHEST-RS and/or NLEST-RS may be different than other reference signals transmitted within a wireless communication system. One difference may include each CHEST-RS and/or NLEST-RS being associated with, or otherwise corresponding to, a specific PA configuration of the transmitting device. Another difference may include each CHEST-RS and/or NLEST-RS may not be a precoded signal.

Accordingly, a transmitting device (e.g., base station 205 in this example) may transmit a CHEST-RS to a receiving device (e.g., UE 210 in this example). The CHEST-RS may be associated with a particular PA configuration of base station 205 (e.g., with a specific transmit chain, using a specific PA within a transmit chain, using a specific spatial stream, a specific beamforming configuration, etc.). The UE 210 may receive the CHEST-RS and measure, identify, or otherwise determine a channel estimation measurement associated with the PA configuration based on the CHEST-RS. That is, the CHEST-RS may correspond to the linear portion of PA response 215 and be used to quantify the channel performance between the transmitting device and the receiving device. Accordingly, the CHEST-RS may support channel performance estimation or mitigation for the portion of PA response 215 extending between p1 and p2. In some examples, the CHEST-RS may be transmitted over a frequency band (e.g., a full bandwidth) used for communications between base station 205 and UE 210.

The transmitting device (e.g., base station 205 in this example) may then transmit a NLEST-RS over a subset of the frequency band (e.g., over a smaller bandwidth) used for communications between the transmitting device and the receiving device. Again, the NLEST-RS may be associated with the same PA configuration that the CHEST-RS is associated with. UE 210 may measure, identify, or otherwise determine a non-linear estimation measurement associated with the PA configure based on the NLEST-RS and the CHEST-RS. For example, UE 210 may measure the signal strength over time of the NLEST-RS and/or CHEST-RS to determine the channel estimation measurement and the non-linear estimation measurement. Broadly, the non-linear estimation measurement may generally identify or correspond to the nonlinear response of the PA configuration. For example, the non-linear estimation measurement may identify the non-linear response portion of PA response 215 extending between the p2 and p3.

In some aspects, UE 210 may transmit a feedback message (e.g., a non-linear response feedback message) to base station 205 that identifies or otherwise indicates the channel estimation measurement as well as the non-linear estimation measurement. That is, UE 210 may transmit or otherwise convey feedback information to base station 205 identifying the channel estimation measurement and/or the non-linear estimation measurement corresponding to response curve 215 of base station 205. Accordingly, base station 205 and UE 210 may perform wireless communications based on the channel estimation measurement and the non-linear response of the PA configuration of base station 205. That is, base station 205 and/or UE 210 may use DPoD and/or OTA-DPD techniques discussed herein according to the feedback message to quantify and/or mitigate distortion or interference caused by a transmission from base station 205 (in this example) using that PA configuration.

In some aspects, the CHEST-RS and/or NLEST-RS may have various resource configurations, which may be preconfigured or preset, and/or may be configured by base station 205 using a signal (e.g., a higher layer signal, RRC signaling, MAC CE, DCI, etc. and/or a new signal). That is, resource configurations for the CHEST-RS and/or NLEST-RS may generally identify various resources, configurations, etc., associated with the CHEST-RS and/or NLEST-RS transmissions. The resources for CHEST-RS and NLEST-RS may be the same or may be different resource (e.g., in terms of subcarriers, time, bandwidth, etc.). UE 210 may use the resource configurations when receiving the CHEST-RS and/or NLEST-RS according to the resource configurations, e.g., repetition patterns, antenna configurations, timing, etc. Aspects of features of the various resource configurations for the CHEST-RS and/or NLEST-RS are discussed with respect to FIGS. 3-10.

Accordingly, aspects of the described techniques provide for base station 205 (e.g., the transmitting device in this example) to transmit or otherwise convey CHEST-RS and/or NLEST-RS to UE 210 (e.g., the receiving device in this example) to use for channel estimation measurements and/or non-linear estimation measurements. Base station 205 and/or UE 210 may use these measurements to identify or otherwise quantify the PA response curve 215 of base station 205. Accordingly, base station 205 may use OTA-DPD and/or DPoD techniques for predistortion management.

In some aspects, a dynamic numerology scheme may be associated with at least the NLEST-RS (although such dynamic numerology scheme may also be associated with the CHEST-RS, which collectively may be referred to as non-linear reference signal (NL-RS)). As discussed above, transmitting CHEST-RS and/or NLEST-RS for each particular PA configuration of a transmitting device as well as for each antenna configuration, each beamforming configuration, each layer, each antenna port, etc., may generally result in a very large number of reference signal transmissions. To distinguish between reference signal transmissions, some wireless communication systems associate an individual number, index, or any other identifier (e.g., numerology) with each reference signal. The corresponding number of reference signal numbers or indices required to support individual PA configurations, beamforming configurations, antenna ports/configurations, etc., of each transmitting device would be enormous and, in some examples, improbable to support in some wireless communication systems.

Accordingly, the dynamic numerology scheme described herein may be utilized in order to reduce the total number of reference signal numbers or indices (e.g., numerologies) that would otherwise be required to support NLEST-RS transmissions on a per-PA configuration basis. In some aspects, the dynamic numerology scheme may be associated with different antenna configurations (e.g., antenna ports—layers—of DMRS in that each antenna configuration has its own set of time and/or frequency resources allocation and configuration under the same NL-RS used by the transmitting device (e.g., base station 205). Some numbers or indices for NLEST-RS (and/or CHEST-RS in some examples) transmissions may be reused. For example, this may include numbers or indices for a set of PA configurations/antenna configurations being reused for a different set of PA configurations or antenna configurations. More particular, a set of numbers of indices associated with a PA configuration and corresponding set of antenna configurations may then be reused for a different PA configuration and the corresponding set of antenna configurations. Other number/index reuse schemes may also be implemented.

In another example, the number/index reuse rules may be based on a multiplexing technique. For example, some numbers or indices for NLEST-RS (and/or CHEST-RS in some examples) transmissions may be reused in one multiplexing technique (e.g., FDM) from another multiplexing technique (e.g., TDM), or vice versa (e.g., TDM to FDM). That is, numbers or indices associated with NLEST-RS transmissions associated with specific PA configurations of the transmitting device may be reused or reassigned between multiplexing techniques. For example, a NLEST-RS (and/or CHEST-RS) signal transmitted on a TDM carrier may use a number or index of 0. However, a NLEST-RS (and/or CHEST-RS) signal transmitted on FDM carrier may also use number or index 0. However, the NLEST-RS having the number or index of 0 on the TDM carrier may be differentiated from the NLEST-RS having the number or index of 0 on the FDM carrier by the multiplexing technique (e.g., TDM v. FDM) associated with the NLEST-RSs.

Accordingly, base station 205 and/or UE 210 (the transmitting and receiving devices in this example) may determine the dynamic numerology scheme associated with the NLEST-RSs (and/or CHEST-RSs) being transmitted according to PA configuration/antenna configuration. The dynamic numerology scheme may be preconfigured (e.g., known a priori, previously configured, preset) and/or configured by base station 205. For example, base station 205 may configure the dynamic numerology scheme periodically (e.g., via a broadcast signal transmitted to UE), semi-periodically, and/or as needed. Base station 205 may, in some examples, use higher layer signaling, RRC signaling, MAC CE, DCI, or other signaling to configure the dynamic numerology scheme for UE 210. The dynamic numerology scheme may generally reuse one or more numbers are indices of NLEST-RS (and/or CHEST-RS) for transmissions using different PA configurations, antenna configurations, multiplexing techniques, etc. Those NLEST-RS (and/or CHEST-RS) transmissions having the same number or index may be distinguished based on the PA configuration, antenna configuration, multiplexing technique, etc., associated with the reference signal, e.g., depending on whether the NLEST-RS (and/or CHEST-RS) transmission is on an FDM carrier or a TDM carrier, associated with a first PA configuration or a second PA configuration, based on carriers using different subcarrier spacing (SCS), etc.

Accordingly base station 205 may transmit and UE 210 may receive a NLEST-RS (and/or CHEST-RS) specific to a PA configuration/antenna configuration/multiplexing technique of base station 205. UE 210 may determine a numerology (e.g., a number or index) associated with the NLEST-RS (and/or CHEST-RS) based on the dynamic numerology scheme. For example, UE 210 may identify or otherwise determine the PA configuration, antenna configuration, multiplexing technique, etc., used for, or otherwise associated with, the NLEST-RS (and/or CHEST-RS). This may include UE 210 determining whether the NLEST-RS (and/or CHEST-RS) was transmitted on a first PA configuration or a second PA configuration, using a first antenna configuration or a second antenna configuration, using a FDM carrier or a TDM carrier, and the like. Based on the number or index (e.g., numerology) associated with the NLEST-RS (and/or CHEST-RS), UE 210 may be able to distinguish that the NLEST-RS (and/or CHEST-RS) is associated with a specific PA configuration/antenna configuration combination of base station 205. That is, UE 210 may be able to specifically identify the PA configuration of the transmitting device based on the number or index and antenna configuration associated with the NLEST-RS (and/or CHEST-RS).

UE 210 may also be able to determine the non-linear response of the PA configuration based on the NLEST-RS and the number or index of the NLEST, e.g., according to the techniques discussed above. Accordingly, base station 205 and UE 210 may communicate based on the nonlinear response of the PA configuration.

Although the dynamic numerology scheme is generally described herein as being applied between different PA configurations, antenna configurations, multiplexing techniques, etc., it is to be understood that other distinguishing features may be used to support the dynamic numerology scheme and distinguish between NLEST-RS (and/or CHEST-RS) having the same number or index. For example, a set of numbers or indices for NLEST-RS (and/or CHEST-RS) signals may be associated with different geographic regions (e.g., reused by geographically separated base stations), with different time periods (e.g., reused between different transmission windows), with different transmission times (e.g., reused between different symbols, slots, subframes, etc., within a transmission window), with different SCS configurations (e.g., reused between carriers having different SCS) and the like. Accordingly, the dynamic numerology scheme may be adopted to support a relatively large number of NLEST-RS signals (and/or CHEST-RS) being transmitted, where at least a portion of those signals are associated with the same number or index, but are distinguishable based on the associated feature.

Figure 3A:
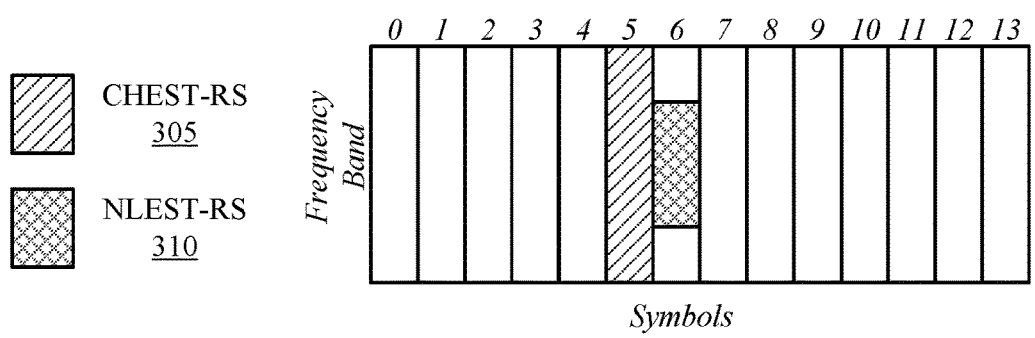
FIGS. 3A-3C illustrate examples of a resource configuration that supports non-linear reference signal design in accordance with aspects of the present disclosure.
Figure 3B:
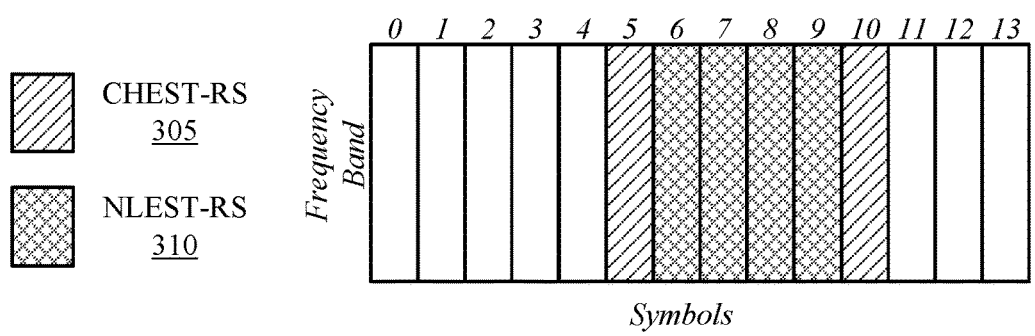
Figure 3C:
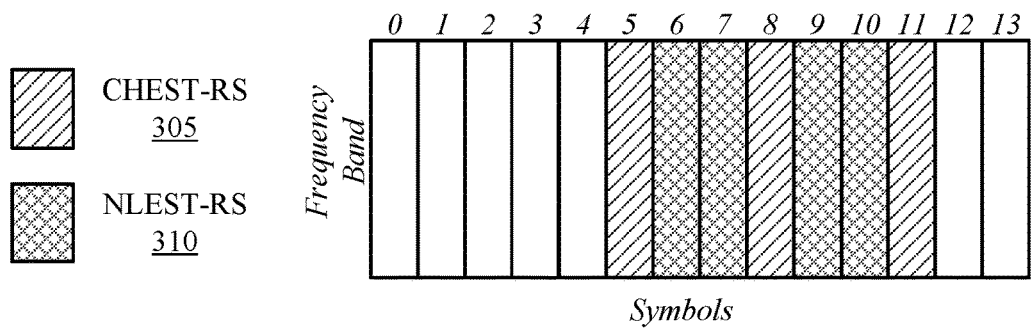

FIGS. 3A-3C illustrate examples of a resource configuration 300 that supports non-linear reference signal design and communication in accordance with aspects of the present disclosure. Resource configuration 300 may implement aspects of or may be implemented by aspects of wireless communication systems 100 and/or 200. Aspects of resource configuration 300 may be implemented by a base station and/or UE, which may be examples of the corresponding devices described herein. The base station and/or UE may be configured as a transmitting device/receiving device, respective, or vice versa. Generally, resource configuration 300-a of FIG. 3A illustrates a CHEST-RS/NLEST-RS resource configuration without repetition. Resource configuration 300-b of FIG. 3B and resource configuration 300-c of FIG. 3C illustrate CHEST-RS/NLEST-RS resource configurations using different repetition patterns.

As discussed above, aspects of the described techniques introduce CHEST-RS 305 and NLEST-RS 310 signals associated with a particular PA configuration of the transmitting device (e.g., a base station). That is, each CHEST-RS 305 and NLEST-RS 310 transmission may be associated with a specific PA configuration of the base station, such as a particular transmit chain, spatial stream, beamforming direction/configuration, particular PA/oscillator(s) within the transmit chain, and the like, alone or in any combination, of the base station. The UE may receive the CHEST-RS 305 transmitted over a frequency band (e.g., over the full bandwidth being used for communications between the base station and the UE). The UE may measure, identify, or otherwise determine a channel estimation measurement associated with the PA configuration based on the CHEST-RS 305 signal. For example, the UE may measure over time the receive power level of the CHEST-RS 305.

The UE may receive the NLEST-RS 310 transmitted over a subset of the frequency band (e.g., over a portion of the full bandwidth being used for communications between the base station and the UE). The UE may measure, identify, or otherwise determine a non-linear estimation measurement associated with the PA configuration based on the NLEST-RS 310 signal. The nonlinear estimation measurement may generally identify or otherwise correspond to a nonlinear response of the PA configuration of the base station. The UE may provide feedback information associated with the channel estimation measurement and/or the non-linear estimation measurement to the base station, which may be utilized to mitigate or eliminate distortion or interference into the channel resulting from the PA configuration non-linearity. Accordingly, the base station and UE may perform wireless communications based on the channel estimation measurement and the non-linear response of the PA configuration.

In some aspects, the base station may configure the UE with the resource configuration for the CHEST-RS 305 and/or NLEST-RS 310 transmissions. Broadly, the resource configuration may identify aspects of the time, frequency, spatial, code, etc., resources or other parameters associated with a corresponding reference signal. For example, the resource configuration may broadly identify the spatial allocation (e.g., number of antenna ports/precoding), the frequency allocation (e.g., the PRB density, number of CHEST-RS PRBs, number of NLEST-RS PRBs), the time allocation (e.g., number of CHEST-RS symbols/repetition, number of NLEST-RS symbols/repetition), and the like, for the CHEST-RS/NLEST-RS transmissions. The base station may use higher layer signaling, RRC signaling, a MAC CE, DCI, and/or other signaling techniques to configure the resource configuration for the UE. CHEST-RS 305 and NLEST-RS 310 may allocated the same resources or different resources according to the resource configuration. Resource configuration 300 illustrates three non-limiting examples of resource configurations that may be implemented in accordance with the described techniques.

Turning first to resource configuration 300-a of FIG. 3A, the resource configuration configured by the base station may include CHEST-RS 305 transmitted during a single symbol (e.g., symbol 5) that may be one symbol before the NLEST-RS 310 transmission. A NLEST-RS 310 may be transmitted during a single symbol (e.g., symbol 6) that may be one symbol after the CHEST-RS 305 transmission.

The CHEST-RS 305 may be transmitted using the full frequency band (e.g., spread over the whole UE allocated bandwidth to allow as much resources as possible). The NLEST-RS 310 may be transmitted using a subset of the frequency band (e.g. spread over a limited bandwidth to avoid or mitigate a high adjacent channel leakage ratio (ACLR)).

In some examples, the CHEST-RS 305 transmission may be de-boosted (e.g., may not be amplified for transmission at a specific transmit power level) such that the signal support will be in the PA linear region. In some examples, the NLEST-RS 310 may be boosted (e.g., amplified at least some degree) such that the signal support will be in the PA non-linear region. In some aspects, the UE may or may not be aware of whether or not the reference signals are boosted or de-boosted. In some aspects, base station may increase the bandwidth and/or power according to a configuration table. In the resource configuration 300-a of FIG. 3A, the CHEST-RS 305 and/or NLEST-RS 310 are transmitted without repetition.

Turning to the resource configuration 300-b of FIG. 3B and resource configuration 300-c of FIG. 3C, the resource configuration configured by the base station may include repetition for the CHEST-RS 305 and/or NLEST-RS 310. Generally, repetition of the CHEST-RS 305 and/or NLEST-RS 310 transmissions may improve the receiver's CHEST/NLEST measurement performance. That is, the UE may receive one or more instances of the CHEST-RS 305 and/or NLEST-RS 310 transmissions according to a repetition pattern. Accordingly, the channel estimation measurement and non-linear estimation measurement may each be based on the repetition pattern of the CHEST-RS 305 and NLEST-RS 310, respectively.

Resource configuration 300-b of FIG. 3B illustrates an example repetition pattern where the NLEST-RS 310 is repeated four times and the CHEST-RS 305 is not repeated. Resource configuration 300-b of FIG. 3B does include an optional CHEST-RS 305 transmission following the last NLEST-RS 310 transmission. Accordingly, the resource configuration 300-b of FIG. 3B illustrates an example where the base station transmits CHEST-RS 305 during one symbol (e.g., symbol 5) and then transmits four repetitions of the NLEST-RS 310 signals during the next four symbols (e.g., symbols 6-9). The optional CHEST-RS 305 transmission during symbol 10 may again improve channel estimation measurement and/or the non-linear estimation measurement obtained by the UE.

Resource configuration 300-c of FIG. 3C illustrates an example repetition pattern where the NLEST-RS 310 is repeated four times and the CHEST-RS 305 is repeated twice. Resource configuration 300-c of FIG. 3C does include an optional CHEST-RS 305 transmission following the last NLEST-RS 310 transmission. Accordingly, the resource configuration 300-c of FIG. 3C illustrates an example where the base station transmits CHEST-RS 305 during one symbol (e.g., symbol 5) and then transmits two repetitions of the NLEST-RS 310 signals during the next two symbols (e.g., symbols 6-7). The base station may transmit another repetition of the CHEST-RS 305 during one symbol (e.g., symbol 8) and then transmits another two repetitions of the NLEST-RS 310 signals during the next two symbols (e.g., symbols 9-10). The optional CHEST-RS 305 transmission during symbol 11 may again improve channel estimation measurement and/or the non-linear estimation measurement obtained by the UE.

It is to be understood that other repetition/sequencing patterns may also be used for the CHEST-RS 305 and/or NLEST-RS 310 signals. Moreover, aspects of resource configuration 300 (resource configuration 300-*a*, resource configuration 300-*b*, resource configuration 300-*c*) may implement the dynamic numerology scheme discussed herein.

FIGS. 4A and 4B illustrate examples of a resource configuration 400 that supports non-linear reference signal design and communication in accordance with aspects of the present disclosure. Resource configuration 400 may implement aspects of or may be implemented by aspects of wireless communication systems 100 and/or 200 and/or resource configuration 300. Aspects of resource configuration 400 may be implemented by a base station and/or UE, which may be examples of the corresponding devices described herein. Generally, resource configuration 400-*a* of FIG. 4A illustrates a first example CHEST-RS/NLEST-RS resource configuration and resource configuration 400-*b* of FIG. 4B illustrates a second example CHEST-RS/NLEST-RS resource configuration.

As discussed above, aspects of the described techniques introduce CHEST-RS and NLEST-RS signals (which are jointly illustrated simply as a non-linear reference signal (NL-RS)) associated with a particular PA configuration of the transmitting device (e.g., a base station). That is, each CHEST-RS and NLEST-RS transmission may be associated with a specific PA configuration of the base station, such as a particular transmit chain, spatial stream, beamforming direction/configuration, particular PA/oscillator(s) within the transmit chain, etc., within the base station, and the like, alone or in any combination, of the base station. The UE may receive the CHEST-RS transmitted over a frequency band (e.g., over the full bandwidth being used for communications between the base station and the UE). The UE may measure, identify, or otherwise determine a channel estimation measurement associated with the PA configuration based on the CHEST-RS signal. For example, the UE may measure over time the receive power level of the CHEST-RS.

Similarly, the UE may receive the NLEST-RS transmitted over, for example, a subset of the frequency band (e.g., over a portion of the full bandwidth being used for communications between the base station and the UE). The UE may measure, identify, or otherwise determine a non-linear estimation measurement associated with the PA configuration based on the NLEST-RS signal and the CHEST-RS. The nonlinear estimation measurement may generally identify or otherwise correspond to a nonlinear response of the PA configuration of the base station. The UE may provide feedback information associated with the channel estimation measurement and/or the non-linear estimation measurement to the base station, which may be utilized to mitigate or eliminate distortion or interference into the channel resulting from the PA configuration non-linearity. Accordingly, the base station and UE may perform wireless communications based on the channel estimation measurement and the non-linear response of the PA configuration.

In some aspects, the base station may configure the UE with the resource configuration for the CHEST-RS and/or NLEST-RS transmissions. Broadly, the resource configuration may identify aspects of the time, frequency, spatial, code, etc., resources or other parameters associated with a corresponding signal. For example, the resource configuration may broadly identify the spatial allocation (e.g., number of antenna ports/precoding), the frequency allocation (e.g., the PRB density, number of CHEST-RS PRBs, number of NLEST-RS PRBs), the time allocation (e.g., number of CHEST-RS symbols/repetition, number of NLEST-RS symbols/repetition), and the like, for the CHEST-RS/NLEST-RS transmissions. The base station may use higher layer signaling, RRC signaling, a MAC CE, DCI, and/or other signaling techniques to configure the resource configuration for the UE. Resource configuration 400 illustrates two non-limiting examples of resource configurations that may be implemented in accordance with the described techniques.

In some examples, the resource configuration may leverage or otherwise mimic other reference signal design schemes. For example, a frequency allocation density may correspond to a resource element allocation density that is configurable (e.g., density=[1, 2, 3, 4, 6, 12, etc.]. In some examples, the resource element allocation may be equally spread across the frequency band. In some examples, the CHEST-RS and NLEST-RS resource elements may be the same or may be different.

Resource configuration 400-*a* of FIG. 4A configured by the base station may include a resource element density of 6 and resource configuration 400-*b* of FIG. 4B may include a resource element density of three. That is, resource configuration 400-*a* may include six resource elements being configured for the CHEST-RS and/or NLEST-RS transmissions (illustrated as six resource elements carrying NL-RS 405). These six resource elements may occur during one symbol of the slot. Resource configuration 400-*b* may include three resource elements being configured for the CHEST-RS and/or NLEST-RS transmissions (illustrated as three resource elements carrying NL-RS 405). These three resource elements may occur during one symbol of the slot.

Figure 5:
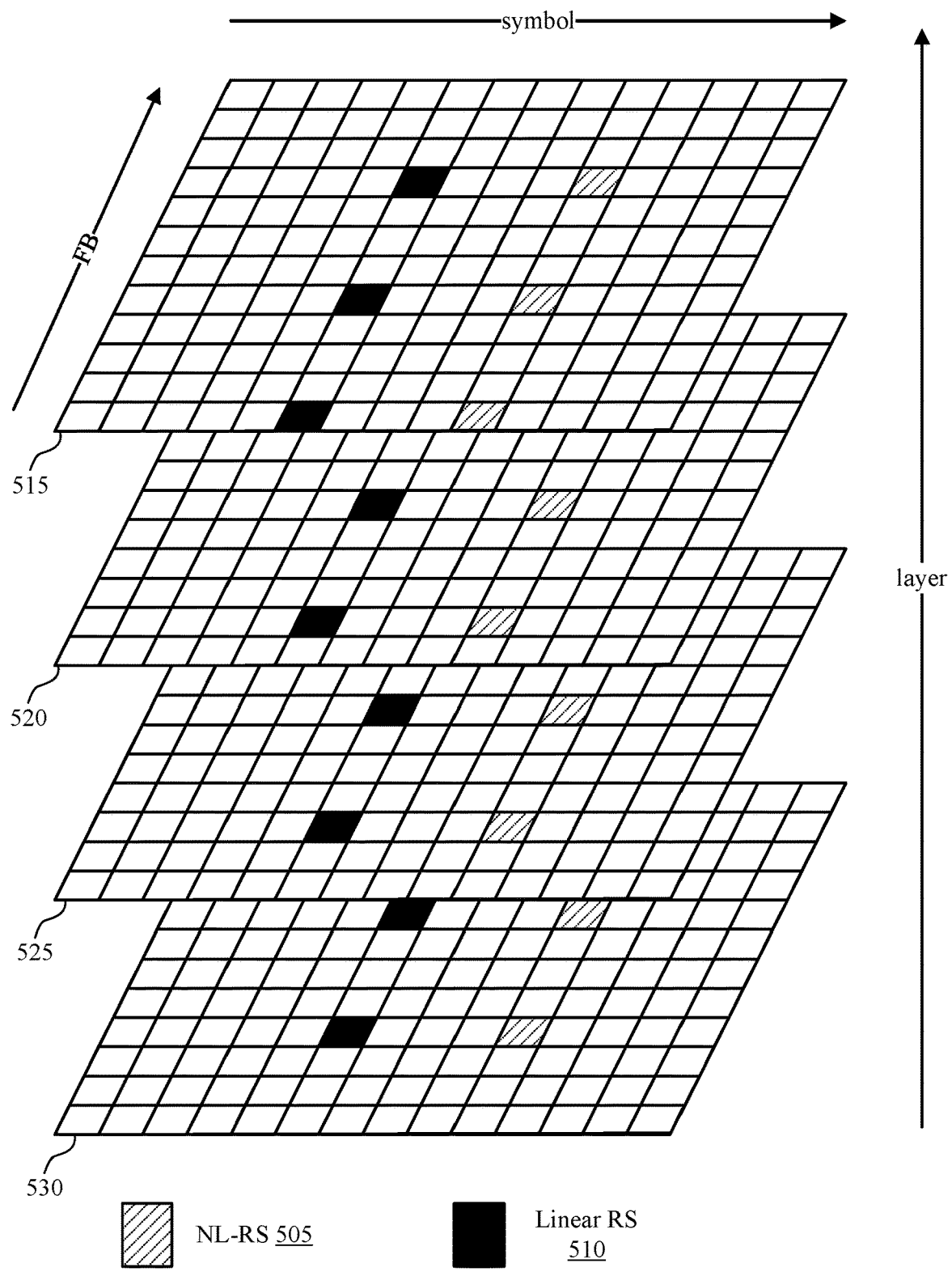
FIG. 5 illustrates an example of a resource configuration that supports non-linear reference signal design in accordance with aspects of the present disclosure.

FIG. 5 illustrates an example of a resource configuration 500 that supports non-linear reference signal design and communication in accordance with aspects of the present disclosure. Resource configuration 500 may implement aspects of or may be implemented by aspects of wireless communication systems 100 and/or 200 and/or resource configurations 300 and/or 400. Aspects of resource configuration 500 may be implemented by a base station and/or UE, which may be examples of the corresponding devices described herein. Generally, resource configuration 500 illustrates an example multi-layer resource configuration.

As discussed above, aspects of the described techniques introduce CHEST-RS and NLEST-RS signals (which are jointly illustrated simply as NL-RS 505) associated with a particular PA configuration of the transmitting device (e.g., a base station). That is, each CHEST-RS and NLEST-RS transmission may be associated with a specific PA configuration of the base station, such as a particular transmit chain, spatial stream, beamforming direction/configuration, a particular PA/oscillator(s) within the transmit chain, and the like, alone or in any combination, of the base station. The UE may receive the CHEST-RS transmitted over a frequency band (e.g., over the full bandwidth being used for communications between the base station and the UE). The UE may measure, identify, or otherwise determine a channel estimation measurement associated with the PA configuration based on the CHEST-RS signal. For example, the UE may measure over time the receive power level of the CHEST-RS.

Similarly, the UE may receive the NLEST-RS transmitted over a subset of the frequency band (e.g., over a portion of the full bandwidth being used for communications between the base station and the UE). The UE may measure, identify, or otherwise determine a non-linear estimation measurement associated with the PA configuration based on the NLEST-RS signal and the CHEST-RS. The nonlinear estimation measurement may generally identify or otherwise correspond to a non-linear response of the PA configuration of the base station. The UE may provide feedback information associated with the channel estimation measurement and/or the non-linear estimation measurement to the base station, which may be utilized to mitigate or eliminate distortion or interference into the channel resulting from the PA configuration non-linearity. Accordingly, the base station and UE may perform wireless communications based on the channel estimation measurement and the non-linear response of the PA configuration.

In some aspects, the base station may configure the UE with the resource configuration for the CHEST-RS and/or NLEST-RS transmissions. Broadly, the resource configuration may identify aspects of the time, frequency, spatial, code, etc., resources or other parameters associated with a corresponding signal. For example, the resource configuration may broadly identify the spatial allocation (e.g., number of antenna ports/precoding), the frequency allocation (e.g., the PRB density, number of CHEST-RS PRBs, number of NLEST-RS PRBs), the time allocation (e.g., number of CHEST-RS symbols/repetition, number of NLEST-RS symbols/repetition), and the like, for the CHEST-RS/NLEST-RS transmissions. The base station may use higher layer signaling, RRC signaling, a MAC CE, DCI, and/or other signaling techniques to configure the resource configuration for the UE. Resource configuration 500 illustrates a non-limiting example of a resource configuration that may be implemented in accordance with the described techniques.

In the example illustrated in resource configuration 500, the resource configuration configured by the base station is multi-layered. For example, resource configuration 500 may utilize antenna multiplexing (e.g., different antenna configurations, etc.) for the CHEST-RS/NLEST-RS transmissions. The antenna multiplexing may correspond to different multiplexing techniques, such as FDM, TDM, CDM, different beamforming configurations, antenna configurations, etc. Resource configuration 500 illustrates an example FDM approach for the resource configuration configured by the base station.

In some examples of the FDM multiplexing technique, the number of layers on a per-symbol basis may be determined according to the single layer resource element density, e.g., given by the formula: $N_{TX}^{symbol} = N_{RE}^{RB}/\text{density}$. In the non-limiting example illustrated in resource configuration 500, each layer may be shifted by one resource element. For example, for layer 515 the resource element for a linear RS 510 (e.g., the CHEST-RS and/or some other linear RS) may occur during symbol 5 and on a bottom subcarrier of the slot. The NL-RS 505 may occur during symbol 9 and may also use the same bottom subcarrier of the slot. For layer 520, the resource element for the linear RS 510 may occur during symbol 9, but may be shifted up one subcarrier. Similarly, the NL-RS 505 may occur during symbol 9, but may also be shifted up one subcarrier.

For layer 525, the resource element for the linear RS 510 may occur during symbol 5, but may be shifted up another subcarrier (e.g., to the third subcarrier of the frequency band (FB)). Similarly, the NL-RS 505 may occur during symbol 9, but may also be shifted up another subcarrier (e.g., to the third subcarrier of the FB).

For layer 530 (e.g., the bottom layer), the resource element for the linear RS 510 may occur during symbol 5, but may be shifted up another subcarrier (e.g., to the fourth subcarrier of the FB). Similarly, the NL-RS 505 may occur during symbol 9, but may also be shifted up another subcarrier (e.g., to the fourth subcarrier of the FB).

In some examples of a CDM multiplexing technique, a different gold sequence (e.g., seed) may be used for each layer. An SDM multiplexing technique may use no multiplexing, but may instead identify a digital precoding matrix to use for the NL-RS 505 transmissions.

Accordingly, the UE may report the channel estimation measurement and/or the non-linear estimation measurement to the base station, which may perform OTA-DPD or DPoD techniques to mitigate or eliminate interference or distortion introduced into the channel by the non-linear response of the PA configuration of the base station.

Figure 6:
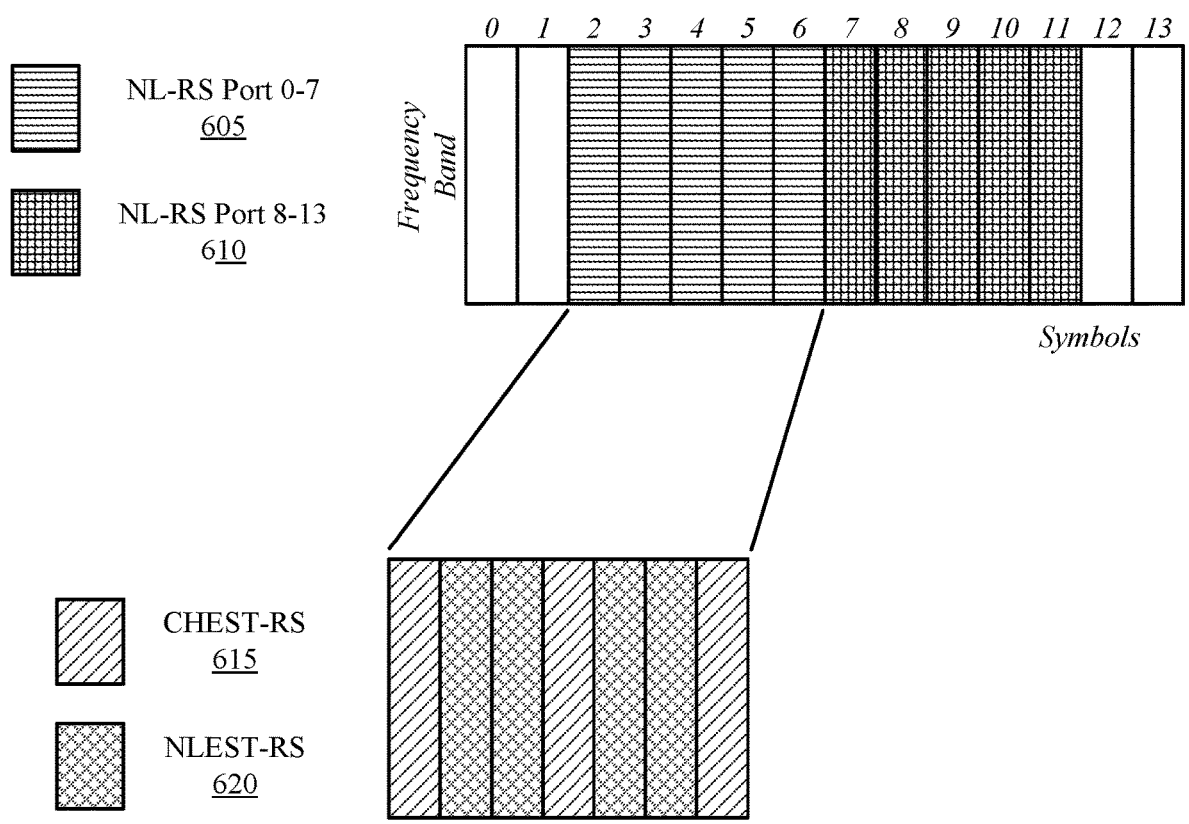
FIG. 6 illustrates an example of a resource configuration that supports non-linear reference signal design in accordance with aspects of the present disclosure.

FIG. 6 illustrates an example of a resource configuration 600 600 that supports non-linear reference signal design and communication in accordance with aspects of the present disclosure. Resource configuration 600 may implement aspects of or may be implemented by aspects of wireless communication systems 100 and/or 200 and/or resource configurations 300, 400, and/or 500. Aspects of resource configuration 600 may be implemented by a base station and/or UE, which may be examples of the corresponding devices described herein. Generally, resource configuration 600 illustrates an example multi-port resource configuration.

As discussed above, aspects of the described techniques introduce CHEST-RS 615 and NLEST-RS 620 signals (which are illustrated jointly as a NL-RS 605 using antenna ports 0-7 and NL-RS 610 using antenna ports 8-13) associated with a particular PA configuration of the transmitting device (e.g., a base station). That is, each CHEST-RS 615 and NLEST-RS 620 transmission may be associated with a specific PA configuration of the base station, such as a particular transmit chain, spatial stream, beamforming direction/configuration, particular PA/oscillator(s) within the transmit chain, and the like, alone or in any combination, of the base station. The UE may receive the CHEST-RS 615 transmitted over a frequency band (e.g., over the full bandwidth being used for communications between the base station and the UE). The UE may measure, identify, or otherwise determine a channel estimation measurement associated with the PA configuration based on the CHEST-RS 615 signal. For example, the UE may measure over time the receive power level of the CHEST-RS 615.

Similarly, the UE may receive the NLEST-RS 620 transmitted over a subset of the frequency band (e.g., over a portion of the full bandwidth being used for communications between the base station and the UE). The UE may measure, identify, or otherwise determine a non-linear estimation measurement associated with the PA configuration based on the NLEST-RS 620 signal. The nonlinear estimation measurement may generally identify or otherwise correspond to a nonlinear response of the PA configuration of the base station. The UE may provide feedback information associated with the channel estimation measurement and/or the non-linear estimation measurement to the base station, which may be utilized to mitigate or eliminate distortion or interference introduced into the channel resulting from the PA configuration non-linearity. Accordingly, the base station and UE may perform wireless communications based on the channel estimation measurement and the non-linear response of the PA configuration.

In some aspects, the base station may configure the UE with the resource configuration for the CHEST-RS 615 and/or NLEST-RS 620 transmissions. Broadly, the resource configuration may identify aspects of the time, frequency, spatial, code, etc., resources or other parameters associated with a corresponding signal. For example, the resource configuration may broadly identify the spatial allocation (e.g., number of antenna ports/precoding), the frequency allocation (e.g., the PRB density, number of CHEST-RS PRBs, number of NLEST-RS PRBs), the time allocation (e.g., number of CHEST-RS symbols/repetition, number of NLEST-RS symbols/repetition), and the like, for the CHEST-RS/NLEST-RS transmissions. The base station may use higher layer signaling, RRC signaling, a MAC CE, DCI, and/or other signaling techniques to configure the resource configuration for the UE. Resource configuration 600 illustrates a non-limiting example of a resource configuration that may be implemented in accordance with the described techniques.

In the example illustrated in resource configuration 600, the resource configuration configured by the base station is for multiply antenna ports. For example, resource configuration 600 may utilize antenna multiplexing (e.g., different antenna configurations, etc.) for the CHEST-RS/NLEST-RS transmissions. The antenna multiplexing may correspond to one or more different multiplexing techniques, such as FDM, TDM, CDM, etc. Resource configuration 600 illustrates an example TDM approach for the resource configuration configured by the base station.

In the TDM multiplexing technique, the CHEST-RS 615 and/or NLEST-RS 620 may be transmitted according to the TDM-based resource configuration and using multiple antenna ports (e.g., antenna ports 0-13, which are divided into a first set of antenna ports 0-7 and a second set of antenna ports 8-13). That is, each reference signal may be transmitted in different symbols of the slot and/or during the same symbol(s) but using different antenna ports. For example, at least some instances of the CHEST-RS 615 and the NLEST-RS 620 may be transmitted during the same symbols, but using different antenna ports. For example, in the situation where frequency diversity does not provide the resources necessary to support such reference signal transmissions, the transmit ports (e.g., antenna ports/configurations) may be multiplexed in time. Resource configuration 600 illustrates an example where the CHEST-RS 615 and NLEST-RS 620 may be configured with FDM where the first and second sets of antenna ports are TDM with respect to each other.

Resource configuration 600 illustrates an example where the CHEST-RS 615 and NLEST-RS 620 are configured with repetition. That is, resource configuration 600 of FIG. 6 illustrates an example repetition pattern where the NLEST-RS 620 is repeated four times and the CHEST-RS 615 is repeated twice for each set of antenna ports. Resource configuration 600 does include an optional CHEST-RS 615 transmission following the last NLEST-RS 620 transmission for each set of antenna ports. Accordingly and for antenna ports 0-7, the resource configuration 600 illustrates an example where the base station transmits CHEST-RS 615 using antenna ports 0-7 and then transmits two repetitions of the NLEST-RS 620 signals also using antenna ports 0-7. The base station may transmit another instance of the CHEST-RS 615 and then transmits another two repetitions of the NLEST-RS 620 signals using antenna ports 0-7. The optional CHEST-RS 615 transmission after the first iteration of CHEST-RS 615 and NLEST-RS 620 repetitions may improve channel estimation measurement and/or the non-linear estimation measurement obtained by the UE.

Similarly and for antenna ports 8-13, the resource configuration 600 illustrates an example where the base station transmits CHEST-RS 615 using antenna ports 8-13 and then transmits two repetitions of the NLEST-RS 620 signals also using antenna ports 8-13. The base station may transmit another instance of the CHEST-RS 615 and then transmits another two repetitions of the NLEST-RS 620 signals using antenna ports 8-13. The optional CHEST-RS 615 transmission after the last iteration of CHEST-RS 615 and NLEST-RS 620 repetitions may improve channel estimation measurement and/or the non-linear estimation measurement obtained by the UE.

It is to be understood that other repetition/sequencing patterns may also be used for the CHEST-RS 615 and/or NLEST-RS 620 signals.

FIGS. 7A-7C illustrate examples of a resource configuration 700 that supports non-linear reference signal design and communication in accordance with aspects of the present disclosure. resource configuration 700 may implement aspects of or may be implemented by aspects of wireless communication systems 100 and/or 200 and/or resource configurations 300, 400, 500, and/or 600. Aspects of resource configuration 700 may be implemented by a base station and/or UE, which may be examples of the corresponding devices described herein. Generally, resource configuration 700-*a* of FIG. 7A illustrates an example periodic-based resource configuration, resource configuration 700-*b* of FIG. 7B illustrates an example semi-persistent-based resource configuration, and resource configuration 700-*c* of FIG. 7C illustrates an example aperiodic-based resource configuration.

As discussed above, aspects of the described techniques introduce CHEST-RS and NLEST-RS signals (which are illustrated jointly as a NL-RS 705) associated with a particular PA configuration of the transmitting device (e.g., a base station). That is, each CHEST-RS and NLEST-RS transmission may be associated with a specific PA configuration of the base station, such as a particular transmit chain, spatial stream, beamforming direction/configuration, particular PA/oscillator(s) within the transmit chain, and the like, alone or in any combination, of the base station. The UE may receive the CHEST-RS transmitted over a frequency band (e.g., over the full bandwidth being used for communications between the base station and the UE). The UE may measure, identify, or otherwise determine a channel estimation measurement associated with the PA configuration based on the CHEST-RS signal. For example, the UE may measure over time the receive power level of the CHEST-RS.

Similarly, the UE may receive the NLEST-RS transmitted over a subset of the frequency band (e.g., over a portion of the full bandwidth being used for communications between the base station and the UE). The UE may measure, identify, or otherwise determine a non-linear estimation measurement associated with the PA configuration based on the NLEST-RS signal and the CHEST-RS. The nonlinear estimation measurement may generally identify or otherwise correspond to a nonlinear response of the PA configuration of the base station. The UE may provide feedback information associated with the channel estimation measurement and/or the non-linear estimation measurement to the base station, which may be utilized to mitigate or eliminate distortion or interference introduced into the channel resulting from the PA configuration non-linearity. Accordingly, the base station and UE may perform wireless communications based on the channel estimation measurement and the non-linear response of the PA configuration.

In some aspects, the base station may configure the UE with the resource configuration for the CHEST-RS and/or NLEST-RS transmissions. Broadly, the resource configuration may identify aspects of the time, frequency, spatial, code, etc., resources or other parameters associated with a corresponding signal. For example, the resource configuration may broadly identify the spatial allocation (e.g., number of antenna ports/precoding), the frequency allocation (e.g., the PRB density, number of CHEST-RS PRBs, number of NLEST-RS PRBs), the time allocation (e.g., number of CHEST-RS symbols/repetition, number of NLEST-RS symbols/repetition), and the like, for the CHEST-RS/NLEST-RS transmissions. The base station may use, for example, higher layer signaling, RRC signaling, a MAC CE, DCI, and/or other signaling techniques to configure the resource configuration for the UE. Resource configuration 700 illustrates three non-limiting examples of resource configurations that may be implemented in accordance with the described techniques. More particularly, the resource configuration 700 configured by the base station may include NL-RS 705 transmissions that are periodic, semi-persistent, and/or aperiodic.

Turning first to resource configuration 700-a of FIG. 7A, the resource configuration may indicate that the NL-RS 705 transmissions are configured to be periodic in nature (e.g., transmitted every $N^{th}$ slots). In particular, the NL-RS 705 transmissions are configured with a periodicity of seven slots, such that the first three slots of the period includes NL-RS 705 transmissions and the last four slots of the period do not include NL-RS 705 transmissions. For example, slots 2-4 may be configured with NL-RS 705 transmissions and slots 5-8 may not be configured with NL-RS 705 transmissions. This pattern is repeated again every seven slots (e.g., again during slots 9-15, slots 16-22, and so on).

Turning next to resource configuration 700-b of FIG. 7B, the resource configuration may indicate that the NL-RS 705 transmissions are configured to be semi-persistent in nature (e.g., similar to a periodic-based resource configuration where the NL-RS 705 are transmitted every $N^{th}$ slots, but may be turned on and off). In particular, the NL-RS 705 transmissions are configured with a periodicity of seven slots, such that the first three slots of the period includes NL-RS 705 transmissions and the last four slots of the period do not include NL-RS 705 transmissions. However, the NL-RS 705 transmissions may be turned on for some periods and other periods may be turned off. For example, the periodic nature of the resource configuration 700-a may include slots 2-4 being configured for NL-RS 705 transmissions and slots 5-8 may not be configured without NL-RS 705 transmissions. This pattern may be repeated again every seven slots (e.g., again during slots 9-15, slots 16-22, and so on), if the NL-RS 705 transmissions are turned on according to the semi-persistent resource configuration 700-b.

In the example illustrated in resource configuration 700-b, NL-RS 705 transmissions are turned on during slots 0-6, turned off during slots 7-20, and then turned on again during slots 21-27. Accordingly, the NL-RS 705 transmissions may occur during slots 2-4 and again during slots 23-25. However, the NL-RS 705 transmissions otherwise scheduled during slots 9-11 and 16-18 are not transmitted (lighter cross-hatched shading) because those resources have been turned off according to resource configuration 700-b. The base station may use various signaling techniques to turn the NL-RS 705 transmissions on and off, such as higher layer signaling, RRC signaling, MAC CE, DCI, and the like. New trigger signaling may also be used.

Turning finally to resource configuration 700-c of FIG. 7C, the resource configuration may indicate that the NL-RS 705 transmissions are configured to be aperiodic in nature (e.g., the NL-RS 705 transmissions are triggered by signaling). In particular, the NL-RS 705 transmissions are not configured to be periodic or semi-persistent. Instead, any NL-RS 705 transmissions are preceded by an NL-RS trigger 710. The NL-RS trigger 710 may utilize any signaling technique, such as higher layer signaling, RRC signaling, MAC CE, DCI, etc., In some examples, a new signal may be used to explicitly and/or implicitly indicate that the NL-RS 705 transmissions are to occur.

In the example illustrated in resource configuration 700-c, a UE may receive the NL-RS trigger 710 during the same slot and/or during one or more preceding slots that the NL-RS 705 transmissions are enabled for. In the non-limiting example resource configuration 700-c, the NL-RS trigger 710 is received one slot before the NL-RS 705 transmissions. For example, the UE may receive the NL-RS trigger 710 during slot 2 which schedules NL-RS 705 transmissions during slots 3 and 4. The UE may receive another NL-RS trigger 710 during slot 9 scheduling NL-RS 705 transmissions during slots 10 and 11, another NL-RS trigger during slot 16 scheduling NL-RS 705 transmissions during slots 17 and 18, and so on.

Accordingly, the base station may trigger NL-RS 705 transmissions for the UE to support non-linearity estimation/mitigation. The base station may trigger the NL-RS 705 transmissions as needed (e.g., based on receiving a threshold number of negative-acknowledgement indications) and/or based on a request from the UE (e.g., based on receiving a NL-RS trigger request from the UE). Aspects of the described techniques introduce a reference signal structure to be used for non-linearity estimation for OTA-DPD and/or DPoD techniques. The reference signal structure and format are flexible enough to address over-the-air non-linearity estimation procedures.

FIG. 8 illustrates an example of a resource configuration 800 that supports non-linear reference signal design and communication in accordance with aspects of the present disclosure. Resource configuration 800 may implement aspects of or may be implemented by aspects of wireless communication systems 100 and/or 200 and/or resource configurations 300, 400, 500, 600 and/or 700. Aspects of resource configuration 800 may be implemented by a base station and/or UE, which may be examples of the corresponding devices described herein.

As discussed above, aspects of the described techniques introduce CHEST-RS and NLEST-RS signals (which are illustrated jointly as a NL-RS) associated with a particular PA configuration of the transmitting device (e.g., a base station). That is, each CHEST-RS and NLEST-RS transmission may be associated with a specific PA configuration of the base station, such as a particular transmit chain, spatial stream, beamforming direction/configuration, particular PA/oscillator(s) within the transmit chain, antenna port, and the like, alone or in any combination, of the base station. The UE may receive the CHEST-RS transmitted over a frequency band (e.g., over the full bandwidth being used for communications between the base station and the UE). The UE may measure, identify, or otherwise determine a channel estimation measurement associated with the PA configuration based on the CHEST-RS signal. For example, the UE may measure over time the receive power level of the CHEST-RS.

Similarly, the UE may receive the NLEST-RS transmitted over a subset of the frequency band (e.g., over a portion of the full bandwidth being used for communications between the base station and the UE). The UE may measure, identify, or otherwise determine a non-linear estimation measurement associated with the PA configuration based on the NLEST-RS signal and the CHEST-RS. The nonlinear estimation measurement may generally identify or otherwise correspond to a nonlinear response of the PA configuration of the base station. The UE may provide feedback information associated with the channel estimation measurement and/or the non-linear estimation measurement to the base station, which may be utilized to mitigate or eliminate distortion or interference introduced into the channel resulting from the PA configuration non-linearity. Accordingly, the base station and UE may perform wireless communications based on the channel estimation measurement and the non-linear response of the PA configuration.

As also discussed above, a dynamic numerology scheme may be used for the NL-RS transmissions to support the high quantity of numbers or indices that may be associated with NL-RS transmissions on a per-PA configuration, antenna configuration, beamforming configuration, etc., basis of the transmitting device. That is, in some cases the number of required NL-RS transmissions may increase and FDM of the NL-RS transmissions may be limited to the number of component carriers (CCs). Interlaced FDM as multiple CSI-RS transmissions in the same symbol may not be viable as the analog beam is common for all subcarriers in the symbol (e.g., at least for the CC). That is, in some cases all of the antenna elements may be used for the NL-RS transmissions to achieve improved array gain and higher coverage. Resource configuration 800 illustrates an example of a resource configuration that enables higher order NL-RS TDM transmissions using dynamic numerology. Accordingly, the overhead of the NL-RS transmissions used for DPoD and/or OTA-DPD techniques may be improved.

For example, the base station and/or UE may otherwise determine a dynamic numerology scheme associated with the NL-RS transmissions from the base station according to an antenna configuration (e.g., antenna port (layers) of DMRS, in that each antenna configuration may have its own set of time, frequency, etc., resource allocation and configuration under the same reference signal. The UE may receive a NL-RS transmission from the base station associated with a PA configuration and determine a numerology (e.g., a number or index) associated with the NL-RS transmission according to the dynamic numerology scheme and/or the antenna configuration. The UE may also determine the nonlinear response of the PA configuration based on the NL-RS transmission and the numerology.

In some aspects, the dynamic numerology techniques may be applied according to different multiplexing techniques (e.g., TDM and/or FDM). The UE may receive a NL-RS transmission from the base station associated with a PA configuration and determine a numerology (e.g., a number or index) associated with the NL-RS transmission according to the dynamic numerology scheme and/or the multiplexing technique (e.g., whether the NL-RS transmission uses TDM and/or FDM).

Broadly, the dynamic numerology scheme enables flexible NL-RS system design and reference signal mapping. In the multiplexing technique example, the dynamic numerology scheme may provide a beneficial trade-off between FDM-to-TDM transitions (and/or TDM-to-TDM transitions) considering the NL-RS transmissions typically use a wider bandwidth to estimate the memory effects in the PA configuration non-linear response. In some aspects, the dynamic numerology scheme may preserve a signal-to-noise-ratio (SNR) during FDM-to-TDM and/or TDM-to-TDM transitions, which may typically be limited by the coherence bandwidth of the channel. This may be suitable for NL-RS transmissions on a per-beam basis. The SNR may be preserved in this example with respect to the same number of resource elements. However, this may potentially improve coverage and SNR due to the ability to use all subarrays for the NL-RS transmissions instead of using only a single subarray per-NL-RS port. In the TDM-to-TDM transition example, this may provide a reduced number of reference signal samples, but improved reference signal overhead. This example may be limited by required processing gain for nonlinearity estimation.

Accordingly, the base station may configure the UE with the resource configuration for the CHEST-RS and/or NLEST-RS transmissions. Broadly, the resource configuration may identify aspects of the time, frequency, spatial, code, etc., resources or other parameters associated with a corresponding signal. For example, the resource configuration may broadly identify the spatial allocation (e.g., number of antenna ports/precoding), the frequency allocation (e.g., the PRB density, number of CHEST-RS PRBs, number of NLEST-RS PRBs), the time allocation (e.g., number of CHEST-RS symbols/repetition, number of NLEST-RS symbols/repetition), and the like, for the CHEST-RS/NLEST-RS transmissions. The CHEST-RS and NLEST-RS may be configured with the same resources or with different resources. The resource configuration may also carry or otherwise convey information identifying the dynamic numerology scheme, or other signaling may be used to convey this indication. The base station may use higher layer signaling, RRC signaling, a MAC CE, DCI, and/or other signaling techniques to configure the resource configuration and/or dynamic numerology scheme for the UE.

Resource configuration 800 illustrates a non-limiting example of resource configurations that may be implemented in accordance with the described techniques for a FDM-to-TDM transition, with the FDM multiplexing scheme using a 120 kHz SCS carrier and the TDM multiplexing scheme using a 480 kHz SCS carrier, in this example. More particularly, the resource configuration 800 configured by the base station may include NL-RS transmissions using the dynamic numerology scheme.

For example, the NL-RS transmissions may begin using FDM on a 120 kHz SCS channel that are spatially independent (e.g., on a per-subarray basis). For the FDM multiplexing technique, the NL-RS transmissions may include NL-RS 805 transmission using subarray 0, NL-RS 810 transmission using subarray 1, NL-RS 815 transmission using subarray 2, and NL-RS 820 transmission using subarray 3. Accordingly and for the FDM multiplexing technique, NL-RS 805 transmission using subarray 0 may have a corresponding NL-RS numerology (e.g., number, index, or other identifier) of 0, NL-RS 810 transmission using subarray 1 may have a corresponding NL-RS numerology of 1, NL-RS 815 transmission using subarray 2 may have a corresponding NL-RS numerology of 2, and NL-RS 820 transmission using subarray 3 may have a corresponding NL-RS numerology of 3, in this example. The NL-RS transmissions using subarrays 0-3 may occur during symbols 1 and 2 of the slot in this example. Accordingly, the UE may identify or otherwise determine the number, index, or other identifier associated with each NL-RS transmission according to the dynamic numerology scheme for the FDM multiplexing technique.

However, the UE may identify or otherwise determine that the base station has switched from a first multiplexing technique (FDM in this example) to a second multiplexing technique (e.g., TDM in this example). The TDM multiplexing technique may include NL-RS transmissions that are spatially dependent (e.g., on a per-beam basis) and may use 480 kHz SCS in this example. For the TDM multiplexing technique, the NL-RS transmissions may include NL-RS 805 transmission using beam 0, NL-RS 810 transmission using beam 1, NL-RS 815 transmission using beam 2, and NL-RS 820 transmission using beam 3 in the TDM multiplexing scheme. Accordingly and for the TDM multiplexing technique the numbers, indices, or other identifiers may be reused from the FDM multiplexing scheme. For example, NL-RS 805 transmission using beam 0 may have a corresponding NL-RS numerology of 0, NL-RS 810 transmission using beam 1 may have a corresponding NL-RS numerology of 1, NL-RS 815 transmission using beam 2 may have a corresponding NL-RS numerology of 2, and NL-RS 820 transmission using beam 3 may have a corresponding NL-RS numerology of 3. The NL-RS transmissions using beams 0-3 may occur during symbols 4-11 in this example. Accordingly, the UE may identify or otherwise determine the number, index, or other identifier associated with each NL-RS transmission according to the dynamic numerology scheme for the TDM multiplexing technique Accordingly, the UE may receive the NL-RS transmission according to the second multiplexing technique (TDM in this example) using the same number, index, or other identifier associated with the NL-RS transmissions provided according to the first multiplexing technique (FDM in this example). That is, the UE may be able to distinguish between NL-RS transmission 805 using the subarray (and therefore number/index) 0 according to the FDM multiplexing technique from the NL-RS transmission 805 using beam (and therefore number/index) 0 according to the TDM multiplexing technique. This may enable fine tuning of a PA configuration non-linearity estimation and mitigation.

FIG. 9 illustrates an example of a resource configuration 900 that supports non-linear reference signal design and communication in accordance with aspects of the present disclosure. Resource configuration 900 may implement aspects of or may be implemented by aspects of wireless communication systems 100 and/or 200 and/or resource configurations 300, 400, 500, 600, 700 and/or 800. Aspects of resource configuration 900 may be implemented by a base station and/or UE, which may be examples of the corresponding devices described herein.

As discussed above, aspects of the described techniques introduce CHEST-RS and NLEST-RS signals (which are illustrated jointly as a NL-RS) associated with a particular PA configuration of the transmitting device (e.g., a base station). That is, each CHEST-RS and NLEST-RS transmission may be associated with a specific PA configuration of the base station, such as a particular transmit chain, spatial stream, beamforming direction/configuration, particular PA/oscillator(s) within the transmit chain, and the like, alone or in any combination, of the base station. The UE may receive the CHEST-RS transmitted over a frequency band (e.g., over the full bandwidth being used for communications between the base station and the UE). The UE may measure, identify, or otherwise determine a channel estimation measurement associated with the PA configuration based on the CHEST-RS signal. For example, the UE may measure over time the receive power level of the CHEST-RS.

Similarly, the UE may receive the NLEST-RS transmitted over a subset of the frequency band (e.g., over a portion of the full bandwidth being used for communications between the base station and the UE). The UE may measure, identify, or otherwise determine a non-linear estimation measurement associated with the PA configuration based on the NLEST-RS signal. The nonlinear estimation measurement may generally identify or otherwise correspond to a nonlinear response of the PA configuration of the base station. The UE may provide feedback information associated with the channel estimation measurement and/or the non-linear estimation measurement to the base station, which may be utilized to mitigate or eliminate distortion or interference introduced into the channel resulting from the PA configuration non-linearity. Accordingly, the base station and UE may perform wireless communications based on the channel estimation measurement and the non-linear response of the PA configuration.

As also discussed above, a dynamic numerology scheme may be used for the NL-RS transmissions to support the high quantity of numbers or indices that may be associated with NL-RS transmissions on a per-PA configuration, beamforming configuration, antenna configuration, etc., basis of the transmitting device. That is, in some cases the number of required NL-RS transmissions may increase and FDM of the NL-RS transmissions may be limited to the number of CCs. Interlaced FDM as multiple CSI-RS transmissions in the same symbol may not be viable as the analog beam is common for all subcarriers in the symbol (e.g., at least for the CC). That is, in some cases all of the antenna elements may be used for the NL-RS transmissions to achieve improved array gain and higher coverage. Resource configuration 900 illustrates example resource configurations that enable higher order NL-RS TDM transmissions using dynamic numerology. Accordingly, the overhead of the NL-RS transmissions used for DPoD and/or OTA-DPD techniques may be improved.

For example, the base station and/or UE may otherwise determine a dynamic numerology scheme associated with the NL-RS transmissions from the base station according to a PA configuration/antenna configuration basis. The UE may receive a NL-RS transmission from the base station associated with a PA configuration/antenna configuration pair and determine a numerology (e.g., a number or index) associated with the NL-RS transmission according to the dynamic numerology scheme and/or the antenna configuration. The UE may also determine the non-linear response of the PA configuration based on the NL-RS transmission and the numerology.

Broadly, the dynamic numerology scheme enables flexible NL-RS system design and reference signal mapping. The dynamic numerology scheme may provide a beneficial trade-off between FDM-to-TDM transitions (and/or TDM-to-TDM transitions) considering the NL-RS transmissions typically use a wider bandwidth to estimate the memory effects in the PA configuration non-linear response. In some aspects, the dynamic numerology scheme may preserve a SNR during FDM-to-TDM transitions, TDM-to-TDM transitions, etc., which may typically be limited by the coherence bandwidth of the channel. This may be suitable for NL-RS transmissions on a per-beam basis. The SNR may be preserved in this example with respect to the same number of resource elements. However, this may potentially improve coverage and SNR due to the ability to use all subarrays for the NL-RS transmissions instead of using only a single subarray per NL-RS port. In the TDM-to-TDM transition example, this may provide a reduced number of reference signal samples, but improved reference signal overhead. This example may be limited by required processing gain for nonlinearity estimation.

Accordingly, the base station may configure the UE with the resource configuration for the CHEST-RS and/or NLEST-RS transmissions. Broadly, the resource configuration may identify aspects of the time, frequency, spatial, code, etc., resources or other parameters associated with a corresponding signal. For example, the resource configuration may broadly identify the spatial allocation (e.g., number of antenna ports/precoding), the frequency allocation (e.g., the PRB density, number of CHEST-RS PRBs, number of NLEST-RS PRBs), the time allocation (e.g., number of CHEST-RS symbols/repetition, number of NLEST-RS symbols/repetition), and the like, for the CHEST-RS/NLEST-RS transmissions. The resources allocated to the CHEST-RS and the NLEST-RS may be the same (e.g., in terms of size and/or specific allocated resources) or may be different. The resource configuration may also carry or otherwise convey information identifying the dynamic numerology scheme, or other signaling may be used. The base station may use higher layer signaling, RRC signaling, a MAC CE, DCI, and/or other signaling techniques to configure the resource configuration and/or dynamic numerology scheme for the UE.

As also discussed above, aspects of the dynamic numerology scheme may also be applicable between different multiplexing techniques. Resource configuration 900 illustrates a non-limiting example of resource configurations that may be implemented in accordance with the described techniques for a TDM-to-TDM transition (with three TDM configurations using SCS of 120 kHz, 240 kHz, and 480 kHz being shown by way of example only). More particularly, the resource configuration 900 configured by the base station may include NL-RS transmissions using the dynamic numerology scheme.

For example, the NL-RS transmissions may begin using TDM on a 120 kHz SCS channel. For the TDM multiplexing technique, the NL-RS transmissions may include NL-RS 905 transmission during symbol 1, NL-RS 910 transmission during symbol 2, NL-RS 915 transmission during symbol 3, and NL-RS 820 transmission during symbol 4. The symbols in the 120 kHz SCS carrier may span 8.92 microseconds (µs). For this TDM multiplexing technique example, NL-RS 905 transmission may have a corresponding NL-RS numerology (e.g., number, index, or other identifier) of 0, NL-RS 910 transmission may have a corresponding NL-RS numerology of 1, NL-RS 915 transmission may have a corresponding NL-RS numerology of 2, and NL-RS 920 transmission may have a corresponding NL-RS numerology of 3. Accordingly, the UE may identify or otherwise determine the number, index, or other identifier associated with each NL-RS transmission according to the dynamic numerology scheme for the TDM multiplexing technique.

However, the UE may identify or otherwise determine that the base station has switched from a first multiplexing technique (TDM using a 120 kHz SCS channel in this example) to a second multiplexing technique (e.g., TDM using a 240 kHz SCS channel in this example). For the second TDM multiplexing technique, the NL-RS transmissions may include NL-RS 905 transmission during slot 1, NL-RS 910 transmission during slot 2, NL-RS 915 transmission during slot 3, and NL-RS 920 transmission during slot 4 in the TDM multiplexing scheme suing the 240 kHz SCS channel. As can be seen, the duration of the slots in the 120 kHz SCS channel is different from the duration of the slots in the 240 kHz SCS channel. The symbols in the 240 kHz SCS carrier may span 4.46 µs. Accordingly and for the second TDM multiplexing technique the numbers, indices, or other identifiers may be reused from the first TDM multiplexing scheme. For example, NL-RS 905 transmission in the 120 kHz SCS channel and the 240 kHz channel may both use a corresponding NL-RS numerology of 0, NL-RS 910 transmission in the 120 kHz SCS channel and the 240 kHz channel may both use a corresponding NL-RS numerology of 1, NL-RS 915 transmission in the 120 kHz SCS channel and the 240 kHz channel may both use a corresponding NL-RS numerology of 2, and NL-RS 920 transmission in the 120 kHz SCS channel and the 240 kHz channel may both use a corresponding NL-RS numerology of 3. Accordingly, the UE may identify or otherwise determine the number, index, or other identifier associated with each NL-RS transmission according to the dynamic numerology scheme for the TDM multiplexing technique.

Accordingly, the UE may receive the NL-RS transmission according to the second multiplexing technique (TDM in the 240 kHz SCS channel in this example) using the same number, index, or other identifier associated with the NL-RS transmissions provided according to the first multiplexing technique (TDM in the 120 kHz SCS channel in this example). That is, the UE may be able to distinguish between NL-RS transmission 905 in the 120 kHz SCS channel according to the TDM multiplexing technique from the NL-RS transmission 905 in the 240 kHz SCS channel (both of which may use the same number, index, or other identifier of 0) according to the TDM multiplexing techniques and the dynamic numerology scheme.

However, the UE may identify or otherwise determine that the base station has again switched from the second multiplexing technique (TDM using a 240 kHz SCS channel in this example) to a third multiplexing technique (e.g., TDM using a 480 kHz SCS channel in this example). For the third TDM multiplexing technique, the NL-RS transmissions may include NL-RS 905 transmission during slot 1, NL-RS 910 transmission during slot 2, NL-RS 915 transmission during slot 3, and NL-RS 920 transmission during slot 4 in the TDM multiplexing scheme suing the 480 kHz SCS channel. As can be seen, the duration of the slots in the 240 kHz SCS channel is different from the duration of the slots in the 480 kHz SCS channel. The symbols in the 480 kHz SCS carrier may span 2.23 microseconds (µs). Accordingly and for the third TDM multiplexing technique the numbers, indices, or other identifiers may be reused from the first and/or second TDM multiplexing scheme(s). For example, NL-RS 905 transmission in the 120 kHz SCS channel, 240 kHz SCS channel, and 480 kHz SCS channel may each use a corresponding NL-RS numerology of 0, NL-RS 910 transmission in the 120 kHz SCS channel, 240 kHz SCS channel, and 480 kHz SCS channel may each use a corresponding NL-RS numerology of 1, NL-RS 915 transmission in the 120 kHz SCS channel, 240 kHz SCS channel, and 480 kHz SCS channel may each use a corresponding NL-RS numerology of 2, and NL-RS 920 transmission in the 120 kHz SCS channel, 240 kHz SCS channel, and 480 SCS channel may each use a corresponding NL-RS numerology of 3. Accordingly, the UE may identify or otherwise determine the number, index, or other identifier associated with each NL-RS transmission according to the dynamic numerology scheme for the TDM multiplexing techniques.

Accordingly, the UE may receive the NL-RS transmission according to the third multiplexing technique (TDM in the 480 kHz SCS channel in this example) using the same number, index, or other identifier associated with the NL-RS transmissions provided according to the first multiplexing technique (TDM in the 120 kHz SCS channel in this example) and/or the second multiplexing technique (TDM in the 240 kHz SCS channel in this example). That is, the UE may be able to distinguish between NL-RS transmission 905 in the 120 kHz SCS channel according to the TDM multiplexing technique from the NL-RS transmission 905 in the 240 kHz SCS channel (both of which may use the same number, index, or other identifier of 0) according to the TDM multiplexing techniques and the dynamic numerology scheme. Similarly, the UE may be able to distinguish between NL-RS transmission 905 in the 240 kHz SCS channel according to the TDM multiplexing technique from the NL-RS transmission 905 in the 480 kHz SCS channel (both of which may use the same number, index, or other identifier of 0) according to the TDM multiplexing techniques and the dynamic numerology scheme. The UE may be able to distinguish between NL-RS transmission 905 in the 240 kHz SCS channel and NL-RS transmission 905 in the 480 kHz SCS channel (both of which may use the same number, index, or other identifier of 0) according to the TDM multiplexing techniques, the PA configuration/antenna configuration pair, and the dynamic numerology scheme FIG. 10 illustrates an example of a resource configuration 1000 that supports non-linear reference signal design and communication in accordance with aspects of the present disclosure. Resource configuration 1000 may implement aspects of or may be implemented by aspects of wireless communication systems 100 and/or 200 and/or resource configurations 300, 400, 500, 600, 700, 800, and/or 900. Aspects of resource configuration 1000 may be implemented by a base station and/or UE, which may be examples of the corresponding devices described herein.

As discussed above, aspects of the described techniques introduce CHEST-RS and NLEST-RS signals (which are illustrated jointly as a NL-RS) associated with a particular PA configuration of the transmitting device (e.g., a base station). That is, each CHEST-RS and NLEST-RS transmission may be associated with a specific PA configuration of the base station, such as a particular transmit chain, spatial stream, beamforming direction/configuration, particular PA/oscillator(s) within the transmit chain, and the like, alone or in any combination, of the base station. The UE may receive the CHEST-RS transmitted over a frequency band (e.g., over the full bandwidth being used for communications between the base station and the UE). The UE may measure, identify, or otherwise determine a channel estimation measurement associated with the PA configuration based on the CHEST-RS signal. For example, the UE may measure over time the receive power level of the CHEST-RS.

Similarly, the UE may receive the NLEST-RS transmitted over a subset of the frequency band (e.g., over a portion of the full bandwidth being used for communications between the base station and the UE). The UE may measure, identify, or otherwise determine a non-linear estimation measurement associated with the PA configuration based on the NLEST-RS signal and the CHEST-RS. The nonlinear estimation measurement may generally identify or otherwise correspond to a nonlinear response of the PA configuration of the base station. The UE may provide feedback information associated with the channel estimation measurement and/or the non-linear estimation measurement to the base station, which may be utilized to mitigate or eliminate distortion or interference introduced into the channel resulting from the PA configuration non-linearity. Accordingly, the base station and UE may perform wireless communications based on the channel estimation measurement and the non-linear response of the PA configuration.

As also discussed above, a dynamic numerology scheme may be used for the NL-RS transmissions to support the high quantity of numbers or indices that may be associated with NL-RS transmissions on a per-PA configuration, beamforming configuration, antenna configuration, etc., basis of the transmitting device. That is, in some cases the number of required NL-RS transmissions may increase and FDM of the NL-RS transmissions may be limited to the number of CCs. Interlaced FDM as multiple CSI-RS transmissions in the same symbol may not be viable as the analog beam is common for all subcarriers in the symbol (e.g., at least for the CC). That is, in some cases all of the antenna elements may be used for the NL-RS transmissions to achieve improved array gain and higher coverage. Resource configuration 1000 illustrates an example resource configuration that enables higher order NL-RS FDM-to-TDM transmission transitions using dynamic numerology. Accordingly, the overhead of the NL-RS transmissions used for DPoD and/or OTA-DPD techniques may be improved.

For example, the base station and/or UE may otherwise determine a dynamic numerology scheme associated with the NL-RS transmissions from the base station according to a PA configuration/antenna configuration pair. The UE may receive a NL-RS transmission from the base station associated with a PA configuration/antenna configuration pair and determine a numerology (e.g., a number or index) associated with the NL-RS transmission according to the dynamic numerology scheme. The UE may determine the numerology based on the multiplexing technique (e.g., whether the NL-RS transmission uses TDM and/or FDM), in some examples. The UE may also determine the non-linear response of the PA configuration based on the NL-RS transmission and the numerology.

Broadly, the dynamic numerology scheme enables flexible NL-RS system design and reference signal mapping. The dynamic numerology scheme may provide a beneficial trade-off between FDM-to-TDM transitions (and/or TDM-to-TDM transitions) considering the NL-RS transmissions typically use a wider bandwidth to estimate the memory effects in the PA configuration non-linear response. In some aspects, the dynamic numerology scheme may preserve a SNR during FDM-to-TDM transitions, TDM-to-TDM transitions, etc., which may typically be limited by the coherence bandwidth of the channel. This may be suitable for NL-RS transmissions on a per-beam basis. The SNR may be preserved in this example with respect to the same number of resource elements. However, this may potentially improve coverage and SNR due to the ability to use all subarrays for the NL-RS transmissions instead of using only a single subarray per NL-RS port. In the TDM-to-TDM transition example, this may provide a reduced number of reference signal samples, but improved reference signal overhead. This example may be limited by required processing gain for nonlinearity estimation.

Accordingly, the base station may configure the UE with the resource configuration for the CHEST-RS and/or NLEST-RS transmissions. Broadly, the resource configuration may identify aspects of the time, frequency, spatial, code, etc., resources or other parameters associated with a corresponding signal. For example, the resource configuration may broadly identify the spatial allocation (e.g., number of antenna ports/precoding), the frequency allocation (e.g., the PRB density, number of CHEST-RS PRBs, number of NLEST-RS PRBs), the time allocation (e.g., number of CHEST-RS symbols/repetition, number of NLEST-RS symbols/repetition), and the like, for the CHEST-RS/NLEST-RS transmissions. The resources allocated to the CHEST-RS may be the same (e.g. in terms of size and/or specific resources) and/or may be different than the resources allocated to the NLEST-RS. The resource configuration may also carry or otherwise convey information identifying the dynamic numerology scheme, or other signaling may be used. The base station may use higher layer signaling, RRC signaling, a MAC CE, DCI, and/or other signaling techniques to configure the resource configuration and/or dynamic numerology scheme for the UE.

Resource configuration 1000 illustrates a non-limiting example of resource configurations that may be implemented in accordance with the described techniques for a FDM-to-TDM transition. More particularly, the resource configuration 1000 configured by the base station may include NL-RS transmissions using the dynamic numerology scheme.

For example, the NL-RS transmissions may begin using FDM on a 120 kHz SCS channel that are spatially independent (e.g., on a per-subcarrier/beam basis, which may correspond to different subarrays and/or beams). For the FDM multiplexing technique, the NL-RS transmissions may include NL-RS 1005 transmission on a first subcarrier and using subarray 0, NL-RS 1010 transmission on a second subcarrier and using subarray 1, NL-RS 1015 transmission on a third subcarrier and using subarray 2, and NL-RS 1020 transmission on a fourth subcarrier and using subarray 3. Accordingly and for the FDM multiplexing technique, NL-RS 1005 transmission on the first subcarrier using subarray 0 may have a corresponding NL-RS numerology (e.g., number, index, or other identifier) of 0, NL-RS 1010 transmission on the second subcarrier using subarray 1 may have a corresponding NL-RS numerology of 1, NL-RS 1015 transmission on the third subcarrier using subarray 2 may have a corresponding NL-RS numerology of 2, and NL-RS 1020 transmission on the fourth subcarrier using subarray 3 may have a corresponding NL-RS numerology of 3, in this example. The NL-RS transmissions on the four subcarriers using subarrays 0-3 may occur during one symbol of the slot, in this example. Accordingly, the UE may identify or otherwise determine the number, index, or other identifier associated with each NL-RS transmission according to the dynamic numerology scheme for the FDM multiplexing technique and the PA configuration/antenna configuration basis.

However, the UE may identify or otherwise determine that the base station has switched from a first multiplexing technique (FDM in this example) to a second multiplexing technique (e.g., TDM in this example). The TDM multiplexing technique may include NL-RS transmissions that are spatially dependent (e.g., on a per-beam basis) and may use 480 kHz SCS in this example. For the TDM multiplexing technique, the NL-RS transmissions may include NL-RS 1005 transmission using beam 0 during a first symbol, NL-RS 1010 transmission using beam 1 during a second symbol, NL-RS 1015 transmission using beam 2 during a third symbol, and NL-RS 1020 transmission using beam 3 during a fourth symbol of the slot in the TDM multiplexing scheme. Accordingly and for the TDM multiplexing technique the numbers, indices, or other identifiers may be reused from the FDM multiplexing scheme. For example, NL-RS 1005 transmission using beam 0 during symbol 4 may have a corresponding NL-RS numerology of 0, NL-RS 1010 transmission using beam 1 during symbol 5 may have a corresponding NL-RS numerology of 1, NL-RS 1015 transmission using beam 2 during symbol 6 may have a corresponding NL-RS numerology of 2, and NL-RS 1020 transmission using beam 3 during symbol 7 may have a corresponding NL-RS numerology of 3. The NL-RS transmissions using beams 0-3 may occur during separate symbols of the slot (e.g., TDM), in this example. Accordingly, the UE may identify or otherwise determine the number, index, or other identifier associated with each NL-RS transmission according to the dynamic numerology scheme for the TDM multiplexing technique.

Accordingly, the UE may receive the NL-RS transmission according to the second multiplexing technique (TDM in this example) using the same number, index, or other identifier associated with the NL-RS transmissions provided according to the first multiplexing technique (FDM in this example). That is, the UE may be able to distinguish between NL-RS transmission 1005 using the subarray (and therefore number/index) 0 according to the FDM multiplexing technique from the NL-RS transmission 1005 using beam (and therefore number/index) 0 according to the TDM multiplexing technique in conjunction with the PA configuration and/or antenna configuration basis. This may reduce the overhead associated with NL-RS transmissions within the wireless network.

Figure 11:
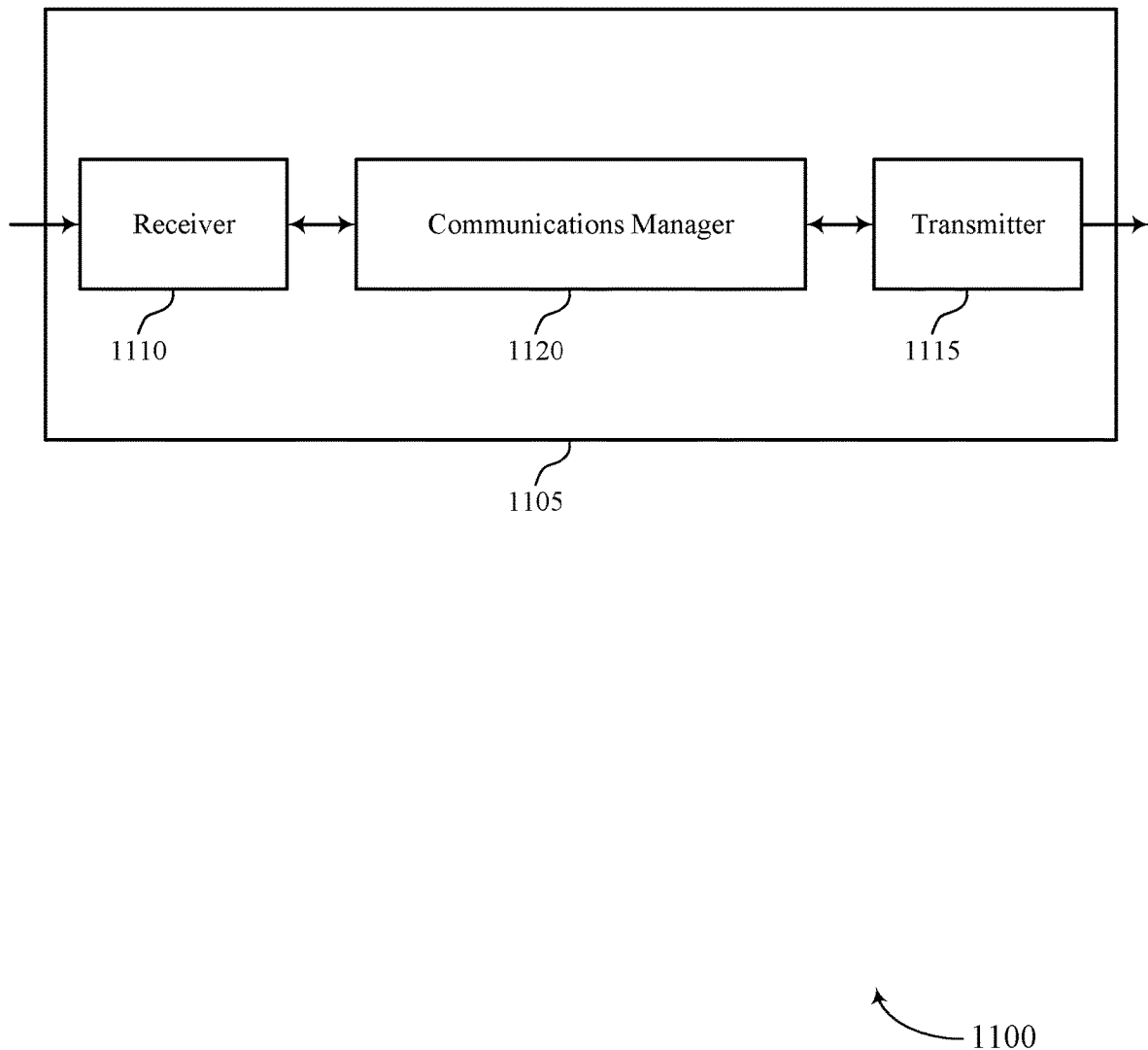
FIGS. 11 and 12 show block diagrams of devices that support non-linear reference signal design in accordance with aspects of the present disclosure.

FIG. 11 shows a block diagram 1100 of a device 1105 that supports non-linear reference signal design in accordance with aspects of the present disclosure. The device 1105 may be an example of aspects of a UE 115 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to non-linear reference signal design). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to non-linear reference signal design). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of non-linear reference signal design as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a receiving device in accordance with examples as disclosed herein. For example, the communications manager 1120 may be configured as or otherwise support a means for receiving, from a transmitting device, a CHEST-RS transmitted over a bandwidth, the CHEST-RS associated with a PA configuration of the transmitting device. The communications manager 1120 may be configured as or otherwise support a means for determining a channel estimation measurement associated with the PA configuration based on the CHEST-RS. The communications manager 1120 may be configured as or otherwise support a means for receiving, from the transmitting device, a NLEST-RS transmitted over a subset bandwidth of the bandwidth, the NLEST-RS associated with the PA configuration. The communications manager 1120 may be configured as or otherwise support a means for determining a non-linear estimation measurement associated with the PA configuration based on the NLEST-RS and the CHEST-RS, the non-linear estimation measurement identifying a non-linear response of the PA configuration. The communications manager 1120 may be configured as or otherwise support a means for communicating with the transmitting device based on the channel estimation measurement and the non-linear response of the PA configuration.

Additionally or alternatively, the communications manager 1120 may support wireless communication at a transmitting device in accordance with examples as disclosed herein. For example, the communications manager 1120 may be configured as or otherwise support a means for identifying a CHEST-RS and a NLEST-RS associated with a PA configuration of the transmitting device. The communications manager 1120 may be configured as or otherwise support a means for transmitting, to a receiving device, the CHEST-RS transmitted over a bandwidth. The communications manager 1120 may be configured as or otherwise support a means for transmitting, to the receiving device, the NLEST-RS transmitted over a subset bandwidth of the bandwidth. The communications manager 1120 may be configured as or otherwise support a means for communicating with the receiving device based on a channel estimation measurement based on the CHEST-RS and a non-linear response of the PA configuration based on the NLEST-RS and the CHEST-RS.

Additionally or alternatively, the communications manager 1120 may support wireless communication at a receiving device in accordance with examples as disclosed herein. For example, the communications manager 1120 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. The communications manager 1120 may be configured as or otherwise support a means for receiving, from the transmitting device, a NLEST-RS associated with a PA configuration of the transmitting device. The communications manager 1120 may be configured as or otherwise support a means for determining a numerology associated with the NLEST-RS based on the dynamic numerology scheme and a non-linear response of the PA configuration that is based on the NLEST-RS and the numerology. The communications manager 1120 may be configured as or otherwise support a means for communicating with the transmitting device based on the non-linear response of the PA configuration.

Additionally or alternatively, the communications manager 1120 may support wireless communication at a transmitting device in accordance with examples as disclosed herein. For example, the communications manager 1120 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. The communications manager 1120 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The communications manager 1120 may be configured as or otherwise support a means for communicating with the receiving device based on the non-linear response of the PA configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for improving OTA-DPD and/or DPoD predistortion compensation at the transmitting device, reducing overhead associated with NL-RS transmissions, and the like.

Figure 12:
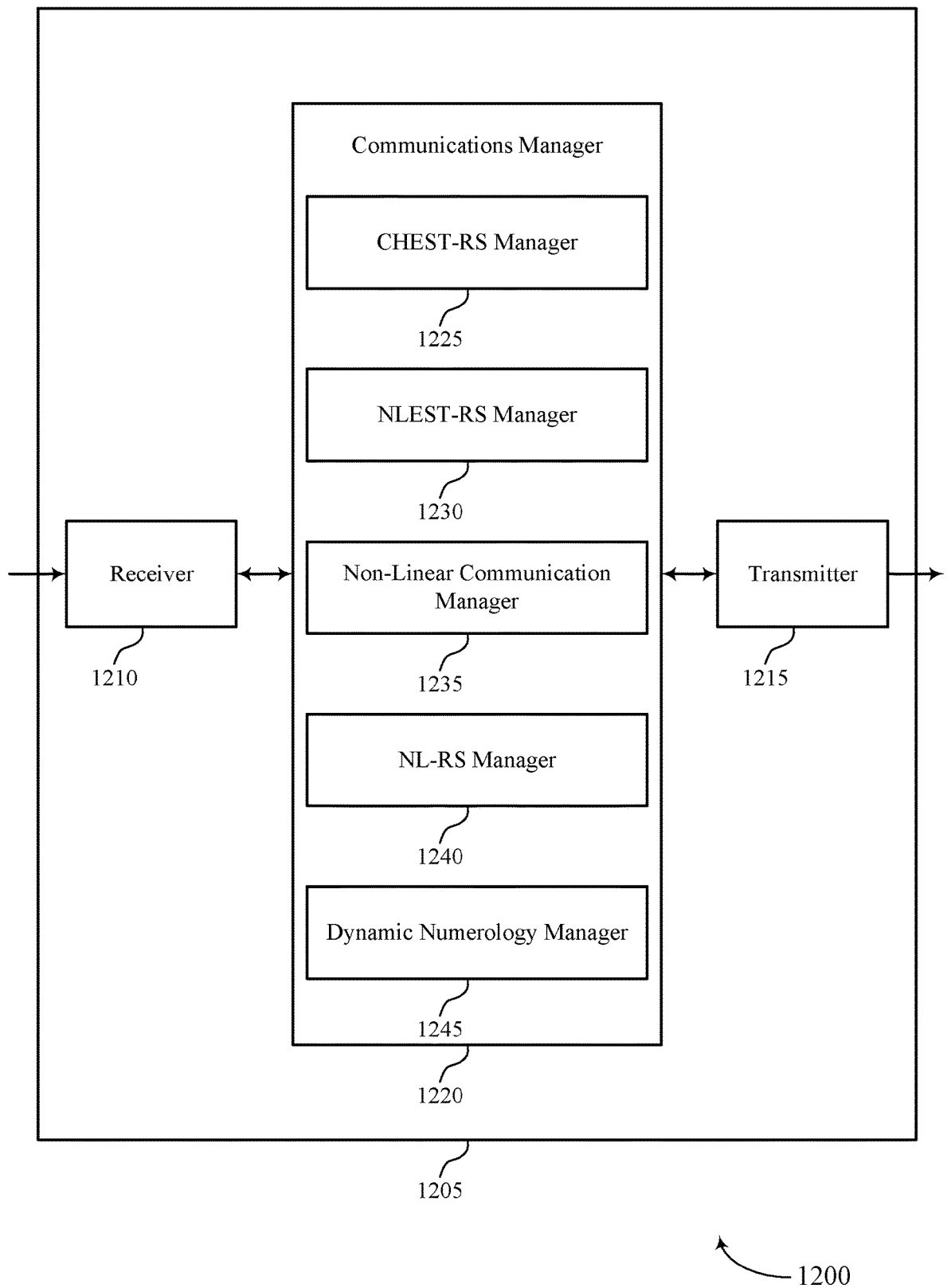

FIG. 12 shows a block diagram 1200 of a device 1205 that supports non-linear reference signal design in accordance with aspects of the present disclosure. The device 1205 may be an example of aspects of a device 1105, a UE 115, or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to non-linear reference signal design). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to non-linear reference signal design). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of non-linear reference signal design as described herein. For example, the communications manager 1220 may include an CHEST-RS manager 1225, an NLEST-RS manager 1230, a non-linear communication manager 1235, an NL-RS manager 1240, a dynamic numerology manager 1245, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a receiving device in accordance with examples as disclosed herein. The CHEST-RS manager 1225 may be configured as or otherwise support a means for receiving, from a transmitting device, a CHEST-RS transmitted over a bandwidth, the CHEST-RS associated with a PA configuration of the transmitting device. The CHEST-RS manager 1225 may be configured as or otherwise support a means for determining a channel estimation measurement associated with the PA configuration based on the CHEST-RS. The NLEST-RS manager 1230 may be configured as or otherwise support a means for receiving, from the transmitting device, a NLEST-RS transmitted over a subset bandwidth of the bandwidth, the NLEST-RS associated with the PA configuration. The NLEST-RS manager 1230 may be configured as or otherwise support a means for determining a non-linear estimation measurement associated with the PA configuration based on the NLEST-RS and the CHEST-RS, the non-linear estimation measurement identifying a non-linear response of the PA configuration. The non-linear communication manager 1235 may be configured as or otherwise support a means for communicating with the transmitting device based on the channel estimation measurement and the non-linear response of the PA configuration.

Additionally or alternatively, the communications manager 1220 may support wireless communication at a transmitting device in accordance with examples as disclosed herein. The NL-RS manager 1240 may be configured as or otherwise support a means for identifying a CHEST-RS and a NLEST-RS associated with a PA configuration of the transmitting device. The CHEST-RS manager 1225 may be configured as or otherwise support a means for transmitting, to a receiving device, the CHEST-RS transmitted over a bandwidth. The NLEST-RS manager 1230 may be configured as or otherwise support a means for transmitting, to the receiving device, the NLEST-RS transmitted over a subset bandwidth of the bandwidth. The non-linear communication manager 1235 may be configured as or otherwise support a means for communicating with the receiving device based on a channel estimation measurement based on the CHEST-RS and a non-linear response of the PA configuration based on the NLEST-RS and the CHEST-RS.

Additionally or alternatively, the communications manager 1220 may support wireless communication at a receiving device in accordance with examples as disclosed herein. The dynamic numerology manager 1245 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. The NLEST-RS manager 1230 may be configured as or otherwise support a means for receiving, from the transmitting device, a NLEST-RS associated with a PA configuration of the transmitting device. The dynamic numerology manager 1245 may be configured as or otherwise support a means for determining a numerology associated with the NLEST-RS based on the dynamic numerology scheme and a non-linear response of the PA configuration that is based on the NLEST-RS and the numerology. The dynamic numerology manager 1245 may be configured as or otherwise support a means for communicating with the transmitting device based on the non-linear response of the PA configuration.

Additionally or alternatively, the communications manager 1220 may support wireless communication at a transmitting device in accordance with examples as disclosed herein. The dynamic numerology manager 1245 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. The NL-RS manager 1240 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The non-linear communication manager 1235 may be configured as or otherwise support a means for communicating with the receiving device based on the non-linear response of the PA configuration.

Figure 13:
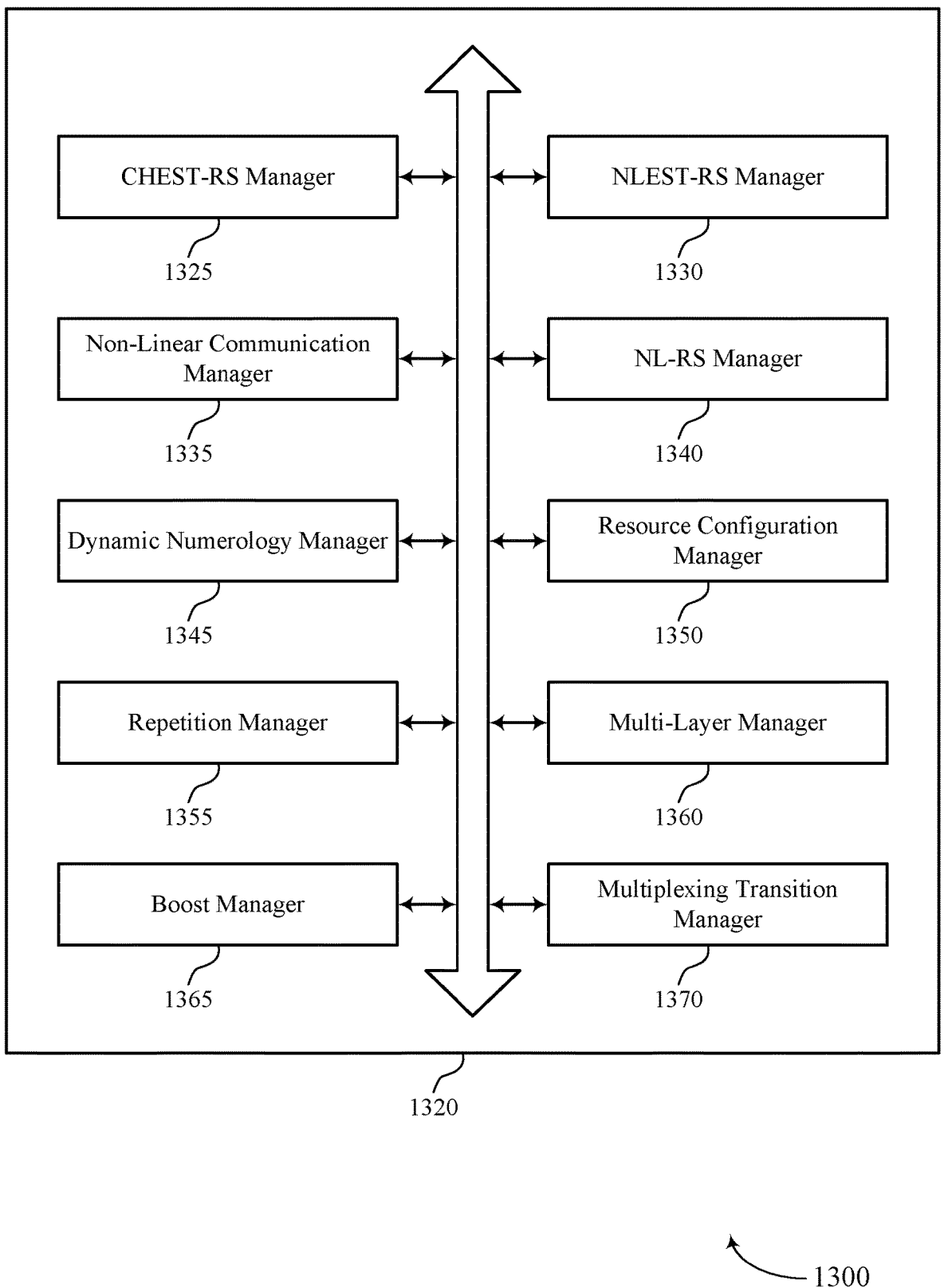
FIG. 13 shows a block diagram of a communications manager that supports non-linear reference signal design in accordance with aspects of the present disclosure.

FIG. 13 shows a block diagram 1300 of a communications manager 1320 that supports non-linear reference signal design in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of non-linear reference signal design as described herein. For example, the communications manager 1320 may include an CHEST-RS manager 1325, an NLEST-RS manager 1330, a non-linear communication manager 1335, an NL-RS manager 1340, a dynamic numerology manager 1345, a resource configuration manager 1350, a repetition manager 1355, a multi-layer manager 1360, a boost manager 1365, a multiplexing transition manager 1370, or any combination thereof. Each of these components may communicate, directly or indirectly, with one another (e.g., via one or more buses).

The communications manager 1320 may support wireless communication at a receiving device in accordance with examples as disclosed herein. The CHEST-RS manager 1325 may be configured as or otherwise support a means for receiving, from a transmitting device, a CHEST-RS transmitted over a bandwidth, the CHEST-RS associated with a PA configuration of the transmitting device. In some examples, the CHEST-RS manager 1325 may be configured as or otherwise support a means for determining a channel estimation measurement associated with the PA configuration based on the CHEST-RS. The NLEST-RS manager 1330 may be configured as or otherwise support a means for receiving, from the transmitting device, a NLEST-RS transmitted over a subset bandwidth of the bandwidth, the NLEST-RS associated with the PA configuration. In some examples, the NLEST-RS manager 1330 may be configured as or otherwise support a means for determining a non-linear estimation measurement associated with the PA configuration based on the NLEST-RS and the CHEST-RS, the non-linear estimation measurement identifying a non-linear response of the PA configuration. The non-linear communication manager 1335 may be configured as or otherwise support a means for communicating with the transmitting device based on the channel estimation measurement and the non-linear response of the PA configuration.

In some examples, the resource configuration manager 1350 may be configured as or otherwise support a means for receiving a signal identifying a resource configuration for the CHEST-RS, the NLEST-RS, or both, where the CHEST-RS and the NLEST-RS are received based on receiving the signal identifying the resource configuration, the resource configuration for the CHEST-RS and the resource configuration for the NLEST-RS including a same resource configuration or a different resource configurations.

In some examples, the repetition manager 1355 may be configured as or otherwise support a means for receiving one or more instances of the CHEST-RS according to a repetition pattern of the CHEST-RS, where the channel estimation measurement is based on receiving the one or more instances of the CHEST-RS.

In some examples, the repetition manager 1355 may be configured as or otherwise support a means for receiving one or more instances of the NLEST-RS according to a repetition pattern of the NLEST-RS, where the non-linear estimation measurement is based on the one or more instances of the NLEST-RS.

In some examples, the multi-layer manager 1360 may be configured as or otherwise support a means for identifying an antenna configuration of the CHEST-RS, where the channel estimation measurement is for the antenna configuration and the PA configuration.

In some examples, the multi-layer manager 1360 may be configured as or otherwise support a means for identifying an antenna configuration of the NLEST-RS, where the non-linear estimation measurement is for the antenna configuration and the PA configuration.

In some examples, receiving the CHEST-RS includes receiving during a first symbol. In some examples, receiving the NLEST-RS includes receiving during a second symbol following the first symbol.

In some examples, the resource configuration manager 1350 may be configured as or otherwise support a means for receiving one or more instances of the CHEST-RS and one or more instances of the non-linear reference signal according to a periodic schedule, a semi-persistent schedule, aperiodically, or any combination thereof.

Additionally or alternatively, the communications manager 1320 may support wireless communication at a transmitting device in accordance with examples as disclosed herein. The NL-RS manager 1340 may be configured as or otherwise support a means for identifying a CHEST-RS and a NLEST-RS associated with a PA configuration of the transmitting device. In some examples, the CHEST-RS manager 1325 may be configured as or otherwise support a means for transmitting, to a receiving device, the CHEST-RS transmitted over a bandwidth. In some examples, the NLEST-RS manager 1330 may be configured as or otherwise support a means for transmitting, to the receiving device, the NLEST-RS transmitted over a subset bandwidth of the bandwidth. In some examples, the non-linear communication manager 1335 may be configured as or otherwise support a means for communicating with the receiving device based on a channel estimation measurement based on the CHEST-RS and a non-linear response of the PA configuration based on the NLEST-RS and the CHEST-RS.

In some examples, the resource configuration manager 1350 may be configured as or otherwise support a means for transmitting a signal identifying a resource configuration for the CHEST-RS, the NLEST-RS, or both, where the CHEST-RS and the NLEST-RS are transmitted based on the signal identifying the resource configuration, the resource configuration for the CHEST-RS and the resource configuration for the NLEST-RS including a same resource configuration or a different resource configuration.

In some examples, the repetition manager 1355 may be configured as or otherwise support a means for transmitting one or more instances of the CHEST-RS according to a repetition pattern of the CHEST-RS, where the channel estimation measurement is based on transmitting the one or more instances of the CHEST-RS.

In some examples, the boost manager 1365 may be configured as or otherwise support a means for selecting an de-boosted transmit power level for the CHEST-RS.

In some examples, the repetition manager 1355 may be configured as or otherwise support a means for transmitting one or more instances of the NLEST-RS according to a repetition pattern of the NLEST-RS, where the non-linear estimation measurement is based on the one or more instances of the NLEST-RS.

In some examples, the boost manager 1365 may be configured as or otherwise support a means for selecting a boosted transmit power level for the CHEST-RS.

In some examples, the multi-layer manager 1360 may be configured as or otherwise support a means for identifying an antenna configuration of the CHEST-RS, where the channel estimation measurement is for the antenna configuration and the PA configuration.

In some examples, the multi-layer manager 1360 may be configured as or otherwise support a means for identifying an antenna configuration of the NLEST-RS, where the non-linear estimation measurement is for the antenna configuration and the PA configuration.

In some examples, transmitting the CHEST-RS includes transmitting during a first symbol. In some examples, transmitting the NLEST-RS includes transmitting during a second symbol following the first symbol.

In some examples, the resource configuration manager 1350 may be configured as or otherwise support a means for transmitting one or more instances of the CHEST-RS and one or more instances of the non-linear reference signal according to a periodic schedule, a semi-persistent schedule, aperiodically, or any combination thereof.

Additionally or alternatively, the communications manager 1320 may support wireless communication at a receiving device in accordance with examples as disclosed herein. The dynamic numerology manager 1345 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. In some examples, the NLEST-RS manager 1330 may be configured as or otherwise support a means for receiving, from the transmitting device, a NLEST-RS associated with a PA configuration of the transmitting device. In some examples, the dynamic numerology manager 1345 may be configured as or otherwise support a means for determining a numerology associated with the NLEST-RS based on the dynamic numerology scheme and a non-linear response of the PA configuration that is based on the NLEST-RS and the numerology. In some examples, the dynamic numerology manager 1345 may be configured as or otherwise support a means for communicating with the transmitting device based on the non-linear response of the PA configuration.

In some examples, the multiplexing transition manager 1370 may be configured as or otherwise support a means for determining that transmission of the NLEST-RS are switched from a first multiplexing technique to a second multiplexing technique of one or more multiplexing techniques. In some examples, the multiplexing transition manager 1370 may be configured as or otherwise support a means for receiving, based on the dynamic numerology scheme, the NLEST-RS according to the second multiplexing technique using an index number associated with the NLEST-RS for the first multiplexing technique.

In some examples, the multiplexing transition manager 1370 may be configured as or otherwise support a means for identifying, based on the dynamic numerology scheme, the index number associated with the NLEST-RS for the first multiplexing technique, where the NLEST-RS is received according to the second multiplexing technique based on the index number.

In some examples, the first multiplexing technique includes a frequency division multiplexing technique and the second multiplexing technique includes a time division multiplexing technique.

In some examples, the first multiplexing technique and the second multiplexing technique each include a respective time division multiplexing technique.

In some examples, the one or more multiplexing techniques include a frequency division multiplexing technique, a time division multiplexing technique, a code division multiplexing technique, or any combination thereof.

Additionally or alternatively, the communications manager 1320 may support wireless communication at a transmitting device in accordance with examples as disclosed herein. In some examples, the dynamic numerology manager 1345 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. In some examples, the NL-RS manager 1340 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. In some examples, the non-linear communication manager 1335 may be configured as or otherwise support a means for communicating with the receiving device based on the non-linear response of the PA configuration.

In some examples, the multiplexing transition manager 1370 may be configured as or otherwise support a means for determining that transmission of the NLEST-RS has switched from a first multiplexing technique to a second multiplexing technique of the one or more multiplexing techniques. In some examples, the multiplexing transition manager 1370 may be configured as or otherwise support a means for transmitting, based on the dynamic numerology scheme, the NLEST-RS according to the second multiplexing technique using an index number associated with the NLEST-RS for the first multiplexing technique.

In some examples, the multiplexing transition manager 1370 may be configured as or otherwise support a means for identifying, based on the dynamic numerology scheme, the index number associated with the NLEST-RS for the first multiplexing technique, where the NLEST-RS is transmitted according to the second multiplexing technique based on the index number.

In some examples, the first multiplexing technique includes a frequency division multiplexing technique and the second multiplexing technique includes a time division multiplexing technique.

In some examples, the first multiplexing technique and the second multiplexing technique each include a respective time division multiplexing technique.

In some examples, the one or more multiplexing techniques include a frequency division multiplexing technique, a time division multiplexing technique, a code division multiplexing technique, or any combination thereof.

Figure 14:
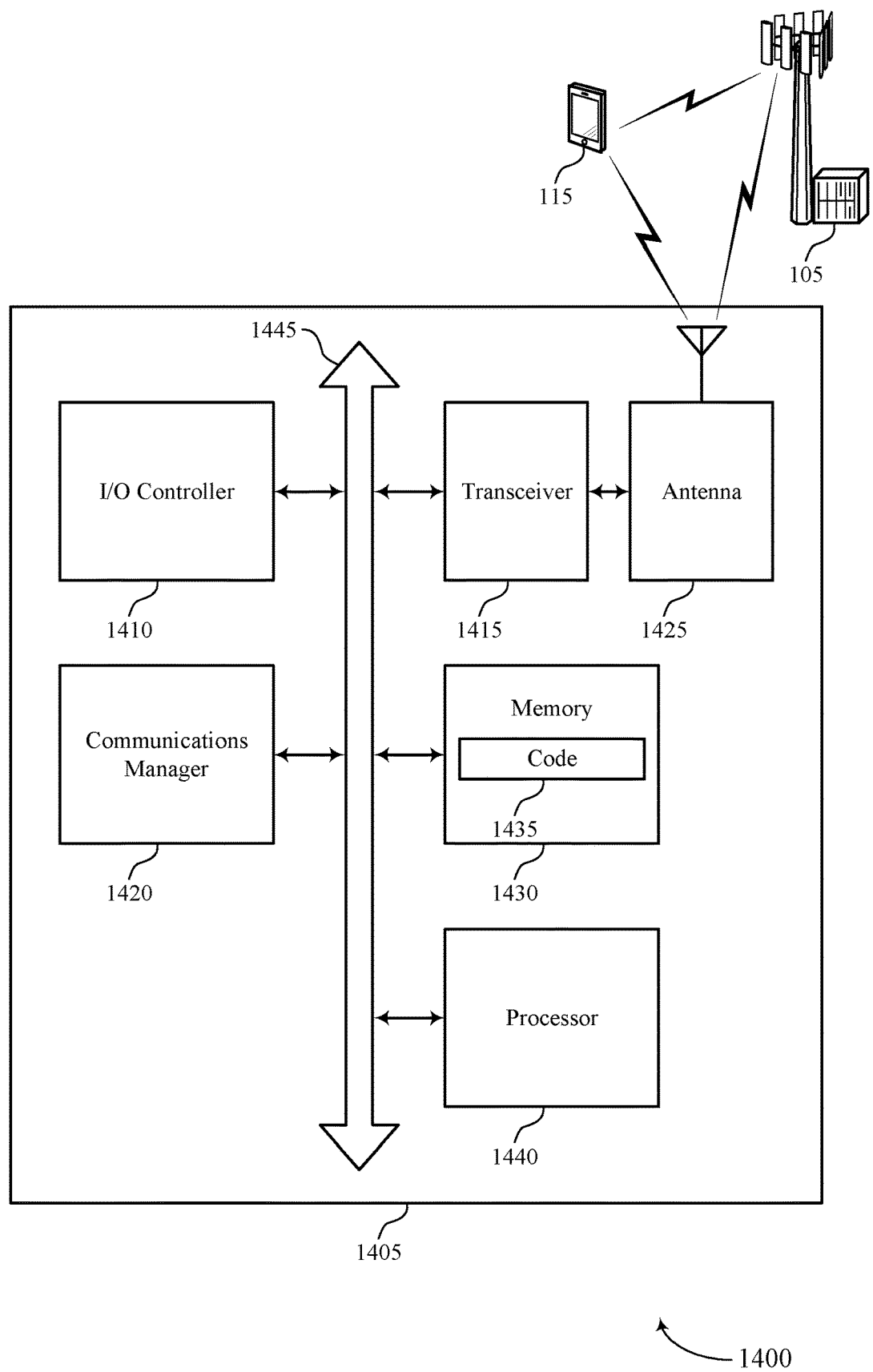
FIG. 14 shows a diagram of a system including a UE that supports non-linear reference signal design in accordance with aspects of the present disclosure.

FIG. 14 shows a diagram of a system 1400 including a device 1405 that supports non-linear reference signal design in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting non-linear reference signal design). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a receiving device in accordance with examples as disclosed herein. For example, the communications manager 1420 may be configured as or otherwise support a means for receiving, from a transmitting device, a CHEST-RS transmitted over a bandwidth, the CHEST-RS associated with a PA configuration of the transmitting device. The communications manager 1420 may be configured as or otherwise support a means for determining a channel estimation measurement associated with the PA configuration based on the CHEST-RS. The communications manager 1420 may be configured as or otherwise support a means for receiving, from the transmitting device, a NLEST-RS transmitted over a subset bandwidth of the bandwidth, the NLEST-RS associated with the PA configuration. The communications manager 1420 may be configured as or otherwise support a means for determining a non-linear estimation measurement associated with the PA configuration based on the NLEST-RS and the CHEST-RS, the non-linear estimation measurement identifying a non-linear response of the PA configuration. The communications manager 1420 may be configured as or otherwise support a means for communicating with the transmitting device based on the channel estimation measurement and the non-linear response of the PA configuration.

Additionally or alternatively, the communications manager 1420 may support wireless communication at a transmitting device in accordance with examples as disclosed herein. For example, the communications manager 1420 may be configured as or otherwise support a means for identifying a CHEST-RS and a NLEST-RS associated with a PA configuration of the transmitting device. The communications manager 1420 may be configured as or otherwise support a means for transmitting, to a receiving device, the CHEST-RS transmitted over a bandwidth. The communications manager 1420 may be configured as or otherwise support a means for transmitting, to the receiving device, the NLEST-RS transmitted over a subset bandwidth of the bandwidth. The communications manager 1420 may be configured as or otherwise support a means for communicating with the receiving device based on a channel estimation measurement based on the CHEST-RS and a non-linear response of the PA configuration based on the NLEST-RS and the CHEST-RS.

Additionally or alternatively, the communications manager 1420 may support wireless communication at a receiving device in accordance with examples as disclosed herein. For example, the communications manager 1420 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. The communications manager 1420 may be configured as or otherwise support a means for receiving, from the transmitting device, a NLEST-RS associated with a PA configuration of the transmitting device. The communications manager 1420 may be configured as or otherwise support a means for determining a numerology associated with the NLEST-RS based on the dynamic numerology scheme and a non-linear response of the PA configuration that is based on the NLEST-RS and the numerology. The communications manager 1420 may be configured as or otherwise support a means for communicating with the transmitting device based on the non-linear response of the PA configuration.

Additionally or alternatively, the communications manager 1420 may support wireless communication at a transmitting device in accordance with examples as disclosed herein. For example, the communications manager 1420 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. The communications manager 1420 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The communications manager 1420 may be configured as or otherwise support a means for communicating with the receiving device based on the non-linear response of the PA configuration.

By including or configuring the communications manager 1420 in accordance with examples as described herein, the device 1405 may support techniques for improving OTA-DPD and/or DPoD predistortion compensation at the transmitting device, reducing overhead associated with NL-RS transmissions, and the like.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of non-linear reference signal design as described herein, or the processor 1440 and the memory 1430 may be otherwise configured to perform or support such operations.

Figure 15:
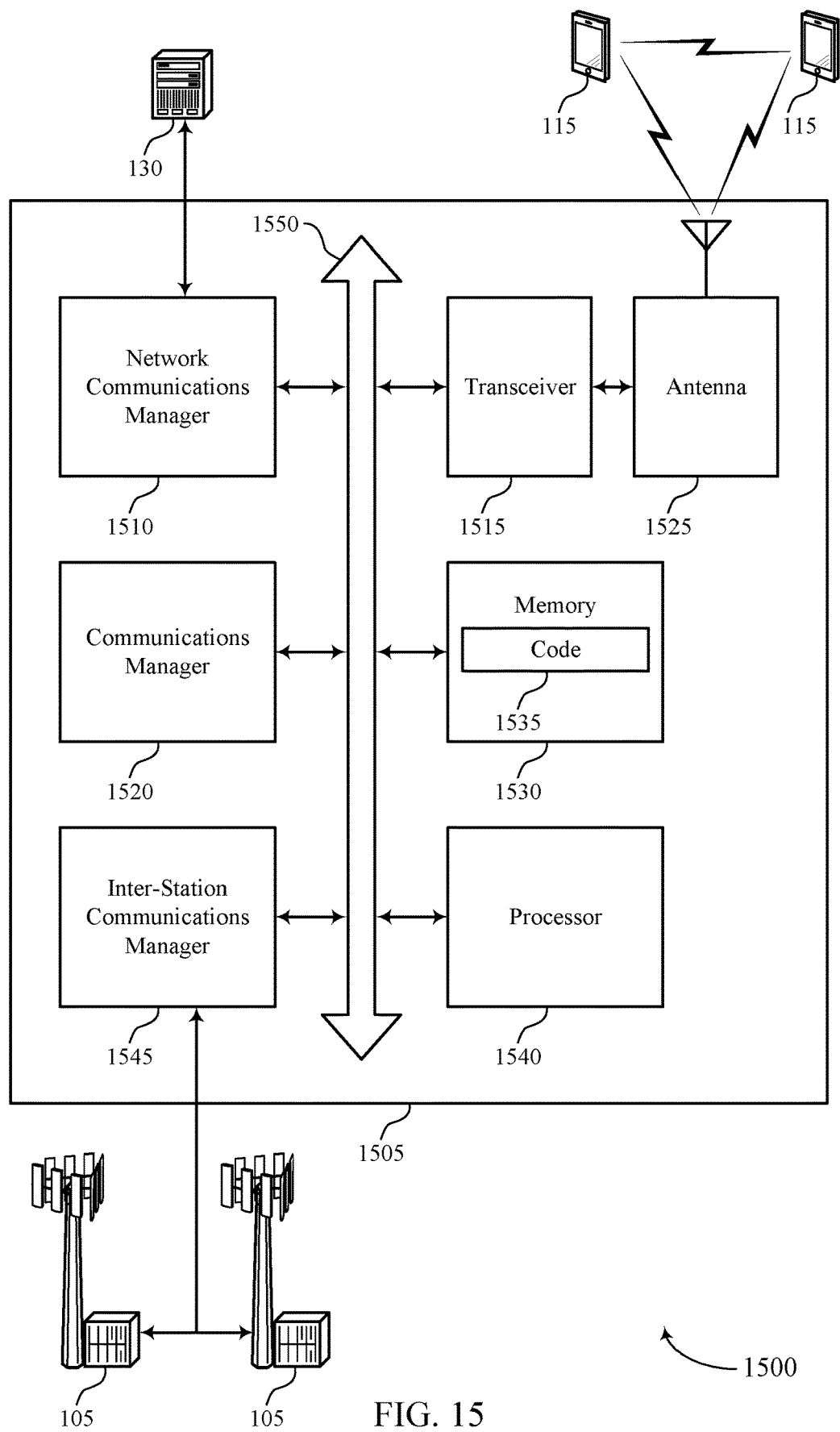
FIG. 15 shows a diagram of a system including a base station that supports non-linear reference signal design in accordance with aspects of the present disclosure.

FIG. 15 shows a diagram of a system 1500 including a device 1505 that supports non-linear reference signal design in accordance with aspects of the present disclosure. The device 1505 may be an example of or include the components of a device 1105, a device 1205, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1115, a transmitter 1215, a receiver 1110, a receiver 1210, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting non-linear reference signal design). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a receiving device in accordance with examples as disclosed herein. For example, the communications manager 1520 may be configured as or otherwise support a means for receiving, from a transmitting device, a CHEST-RS transmitted over a bandwidth, the CHEST-RS associated with a PA configuration of the transmitting device. The communications manager 1520 may be configured as or otherwise support a means for determining a channel estimation measurement associated with the PA configuration based on the CHEST-RS. The communications manager 1520 may be configured as or otherwise support a means for receiving, from the transmitting device, a NLEST-RS transmitted over a subset bandwidth of the bandwidth, the NLEST-RS associated with the PA configuration. The communications manager 1520 may be configured as or otherwise support a means for determining a non-linear estimation measurement associated with the PA configuration based on the NLEST-RS and the CHEST-RS, the non-linear estimation measurement identifying a non-linear response of the PA configuration. The communications manager 1520 may be configured as or otherwise support a means for communicating with the transmitting device based on the channel estimation measurement and the non-linear response of the PA configuration.

Additionally or alternatively, the communications manager 1520 may support wireless communication at a transmitting device in accordance with examples as disclosed herein. For example, the communications manager 1520 may be configured as or otherwise support a means for identifying a CHEST-RS and a NLEST-RS associated with a PA configuration of the transmitting device. The communications manager 1520 may be configured as or otherwise support a means for transmitting, to a receiving device, the CHEST-RS transmitted over a bandwidth. The communications manager 1520 may be configured as or otherwise support a means for transmitting, to the receiving device, the NLEST-RS transmitted over a subset bandwidth of the bandwidth. The communications manager 1520 may be configured as or otherwise support a means for communicating with the receiving device based on a channel estimation measurement based on the CHEST-RS and a non-linear response of the PA configuration based on the NLEST-RS and the CHEST-RS.

Additionally or alternatively, the communications manager 1520 may support wireless communication at a receiving device in accordance with examples as disclosed herein. For example, the communications manager 1520 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. The communications manager 1520 may be configured as or otherwise support a means for receiving, from the transmitting device, a NLEST-RS associated with a PA configuration of the transmitting device. The communications manager 1520 may be configured as or otherwise support a means for determining a numerology associated with the NLEST-RS based on the dynamic numerology scheme and a non-linear response of the PA configuration that is based on the NLEST-RS and the numerology. The communications manager 1520 may be configured as or otherwise support a means for communicating with the transmitting device based on the non-linear response of the PA configuration.

Additionally or alternatively, the communications manager 1520 may support wireless communication at a transmitting device in accordance with examples as disclosed herein. For example, the communications manager 1520 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. The communications manager 1520 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The communications manager 1520 may be configured as or otherwise support a means for communicating with the receiving device based on the non-linear response of the PA configuration.

By including or configuring the communications manager 1520 in accordance with examples as described herein, the device 1505 may support techniques for improving OTA-DPD and/or DPoD predistortion compensation at the transmitting device, reducing overhead associated with NL-RS transmissions, and the like.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of non-linear reference signal design as described herein, or the processor 1540 and the memory 1530 may be otherwise configured to perform or support such operations.

Figure 16:
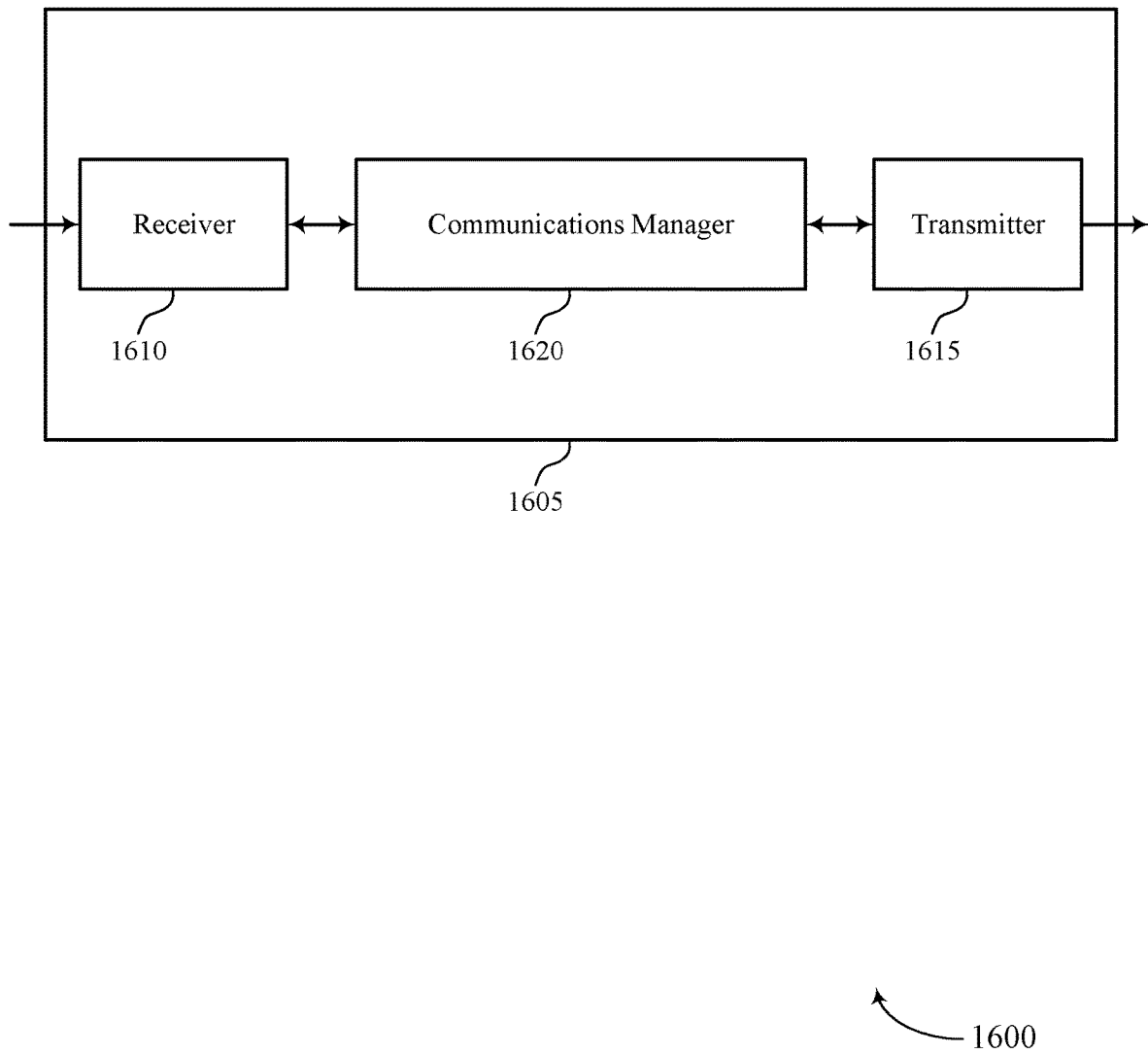
FIGS. 16 and 17 show block diagrams of devices that support non-linear reference signal design in accordance with aspects of the present disclosure.

FIG. 16 shows a block diagram 1600 of a device 1605 that supports non-linear reference signal design in accordance with aspects of the present disclosure. The device 1605 may be an example of aspects of a UE 115 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to non-linear reference signal design). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to non-linear reference signal design). In some examples, the transmitter 1615 may be co-located with a receiver 1610 in a transceiver module. The transmitter 1615 may utilize a single antenna or a set of multiple antennas.

The communications manager 1620, the receiver 1610, the transmitter 1615, or various combinations thereof or various components thereof may be examples of means for performing various aspects of non-linear reference signal design as described herein. For example, the communications manager 1620, the receiver 1610, the transmitter 1615, or various combinations or components thereof may support a method for performing one or more of the functions described herein.

In some examples, the communications manager 1620, the receiver 1610, the transmitter 1615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1620, the receiver 1610, the transmitter 1615, or various combinations or components thereof may be implemented in code (e.g., as communications management software or firmware) executed by a processor. If implemented in code executed by a processor, the functions of the communications manager 1620, the receiver 1610, the transmitter 1615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1620 may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a receiving device in accordance with examples as disclosed herein. For example, the communications manager 1620 may be configured as or otherwise support a means for receiving, from a transmitting device, a CHEST-RS transmitted over a bandwidth, the CHEST-RS associated with a PA configuration of the transmitting device. The communications manager 1620 may be configured as or otherwise support a means for determining a channel estimation measurement associated with the PA configuration based on the CHEST-RS. The communications manager 1620 may be configured as or otherwise support a means for receiving, from the transmitting device, a NLEST-RS transmitted over a subset bandwidth of the bandwidth, the NLEST-RS associated with the PA configuration. The communications manager 1620 may be configured as or otherwise support a means for determining a non-linear estimation measurement associated with the PA configuration based on the NLEST-RS and the CHEST-RS, the non-linear estimation measurement identifying a non-linear response of the PA configuration. The communications manager 1620 may be configured as or otherwise support a means for communicating with the transmitting device based on the channel estimation measurement and the non-linear response of the PA configuration.

Additionally or alternatively, the communications manager 1620 may support wireless communication at a transmitting device in accordance with examples as disclosed herein. For example, the communications manager 1620 may be configured as or otherwise support a means for identifying a CHEST-RS and a NLEST-RS associated with a PA configuration of the transmitting device. The communications manager 1620 may be configured as or otherwise support a means for transmitting, to a receiving device, the CHEST-RS transmitted over a bandwidth. The communications manager 1620 may be configured as or otherwise support a means for transmitting, to the receiving device, the NLEST-RS transmitted over a subset bandwidth of the bandwidth. The communications manager 1620 may be configured as or otherwise support a means for communicating with the receiving device based on a channel estimation measurement based on the CHEST-RS and a non-linear response of the PA configuration based on the NLEST-RS and the CHEST-RS.

Additionally or alternatively, the communications manager 1620 may support wireless communication at a receiving device in accordance with examples as disclosed herein. For example, the communications manager 1620 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. The communications manager 1620 may be configured as or otherwise support a means for receiving, from the transmitting device, a NLEST-RS associated with a PA configuration of the transmitting device. The communications manager 1620 may be configured as or otherwise support a means for determining a numerology associated with the NLEST-RS based on the dynamic numerology scheme and a non-linear response of the PA configuration that is based on the NLEST-RS and the numerology. The communications manager 1620 may be configured as or otherwise support a means for communicating with the transmitting device based on the non-linear response of the PA configuration.

Additionally or alternatively, the communications manager 1620 may support wireless communication at a transmitting device in accordance with examples as disclosed herein. For example, the communications manager 1620 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. The communications manager 1620 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The communications manager 1620 may be configured as or otherwise support a means for communicating with the receiving device based on the non-linear response of the PA configuration.

By including or configuring the communications manager 1620 in accordance with examples as described herein, the device 1605 (e.g., a processor controlling or otherwise coupled to the receiver 1610, the transmitter 1615, the communications manager 1620, or a combination thereof)

may support techniques for improving OTA-DPD and/or DPoD predistortion compensation at the transmitting device, reducing overhead associated with NL-RS transmissions, and the like.

Figure 17:
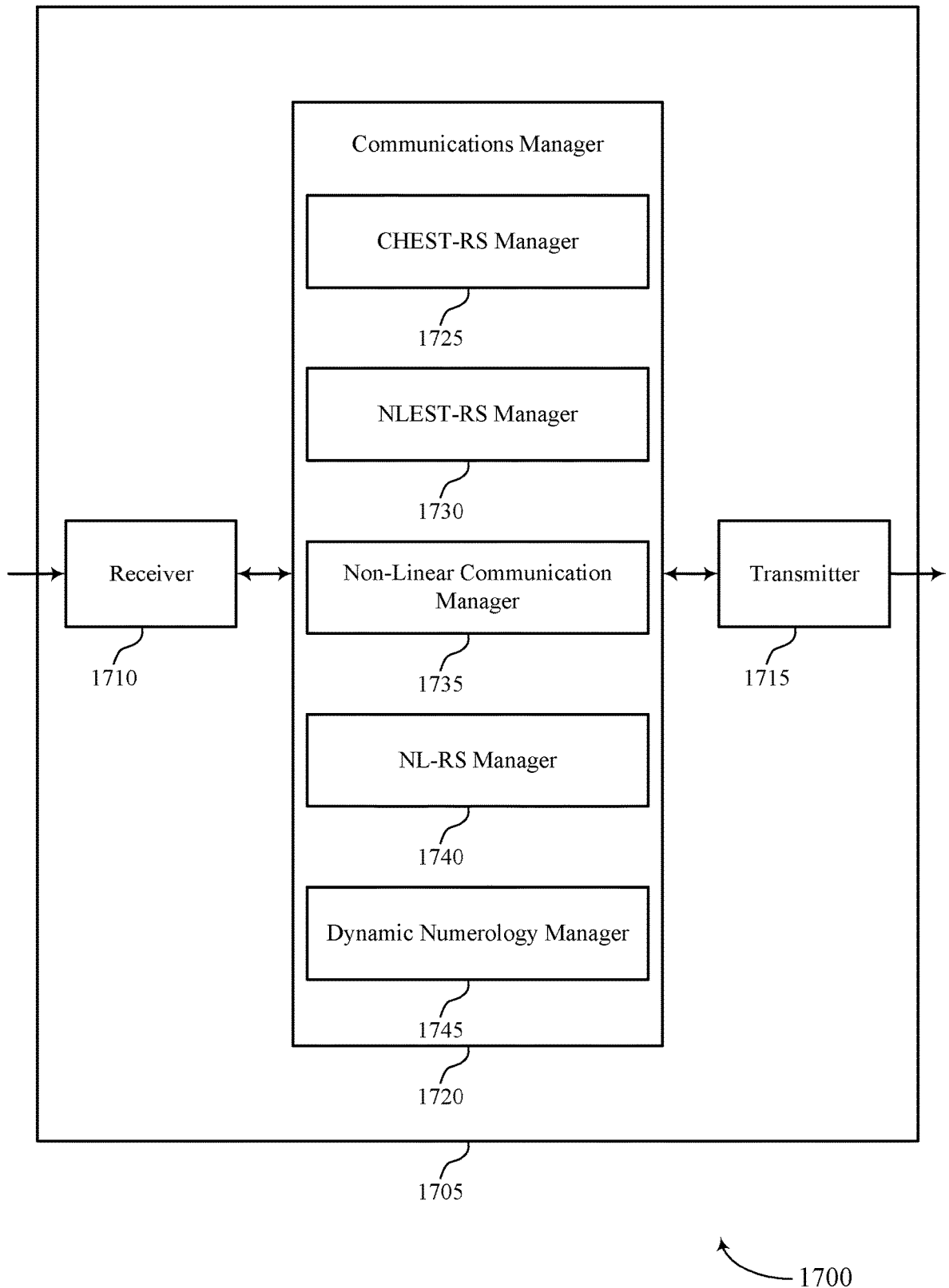

FIG. 17 shows a block diagram 1700 of a device 1705 that supports non-linear reference signal design in accordance with aspects of the present disclosure. The device 1705 may be an example of aspects of a device 1605, a UE 115, or a base station 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to non-linear reference signal design). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, information channels related to non-linear reference signal design). In some examples, the transmitter 1715 may be co-located with a receiver 1710 in a transceiver module. The transmitter 1715 may utilize a single antenna or a set of multiple antennas.

The device 1705, or various components thereof, may be an example of means for performing various aspects of non-linear reference signal design as described herein. For example, the communications manager 1720 may include an CHEST-RS manager 1725, an NLEST-RS manager 1730, a non-linear communication manager 1735, an NL-RS manager 1740, a dynamic numerology manager 1745, or any combination thereof. The communications manager 1720 may be an example of aspects of a communications manager 1620 as described herein. In some examples, the communications manager 1720, or various components thereof, may be configured to perform various operations (e.g., receiving, monitoring, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to receive information, transmit information, or perform various other operations as described herein.

The communications manager 1720 may support wireless communication at a receiving device in accordance with examples as disclosed herein. The CHEST-RS manager 1725 may be configured as or otherwise support a means for receiving, from a transmitting device, a CHEST-RS transmitted over a bandwidth, the CHEST-RS associated with a PA configuration of the transmitting device. The CHEST-RS manager 1725 may be configured as or otherwise support a means for determining a channel estimation measurement associated with the PA configuration based on the CHEST-RS. The NLEST-RS manager 1730 may be configured as or otherwise support a means for receiving, from the transmitting device, a NLEST-RS transmitted over a subset bandwidth of the bandwidth, the NLEST-RS associated with the PA configuration. The NLEST-RS manager 1730 may be configured as or otherwise support a means for determining a non-linear estimation measurement associated with the PA configuration based on the NLEST-RS and the CHEST-RS, the non-linear estimation measurement identifying a non-linear response of the PA configuration. The non-linear communication manager 1735 may be configured as or otherwise support a means for communicating with the transmitting device based on the channel estimation measurement and the non-linear response of the PA configuration.

Additionally or alternatively, the communications manager 1720 may support wireless communication at a transmitting device in accordance with examples as disclosed herein. The NL-RS manager 1740 may be configured as or otherwise support a means for identifying a CHEST-RS and a NLEST-RS associated with a PA configuration of the transmitting device. The CHEST-RS manager 1725 may be configured as or otherwise support a means for transmitting, to a receiving device, the CHEST-RS transmitted over a bandwidth. The NLEST-RS manager 1730 may be configured as or otherwise support a means for transmitting, to the receiving device, the NLEST-RS transmitted over a subset bandwidth of the bandwidth. The non-linear communication manager 1735 may be configured as or otherwise support a means for communicating with the receiving device based on a channel estimation measurement based on the CHEST-RS and a non-linear response of the PA configuration based on the NLEST-RS and the CHEST-RS.

Additionally or alternatively, the communications manager 1720 may support wireless communication at a receiving device in accordance with examples as disclosed herein. The dynamic numerology manager 1745 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. The NLEST-RS manager 1730 may be configured as or otherwise support a means for receiving, from the transmitting device, a NLEST-RS associated with a PA configuration of the transmitting device. The dynamic numerology manager 1745 may be configured as or otherwise support a means for determining a numerology associated with the NLEST-RS based on the dynamic numerology scheme and a non-linear response of the PA configuration that is based on the NLEST-RS and the numerology. The dynamic numerology manager 1745 may be configured as or otherwise support a means for communicating with the transmitting device based on the non-linear response of the PA configuration.

Additionally or alternatively, the communications manager 1720 may support wireless communication at a transmitting device in accordance with examples as disclosed herein. The dynamic numerology manager 1745 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. The NL-RS manager 1740 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The non-linear communication manager 1735 may be configured as or otherwise support a means for communicating with the receiving device based on the non-linear response of the PA configuration.

Figure 18:
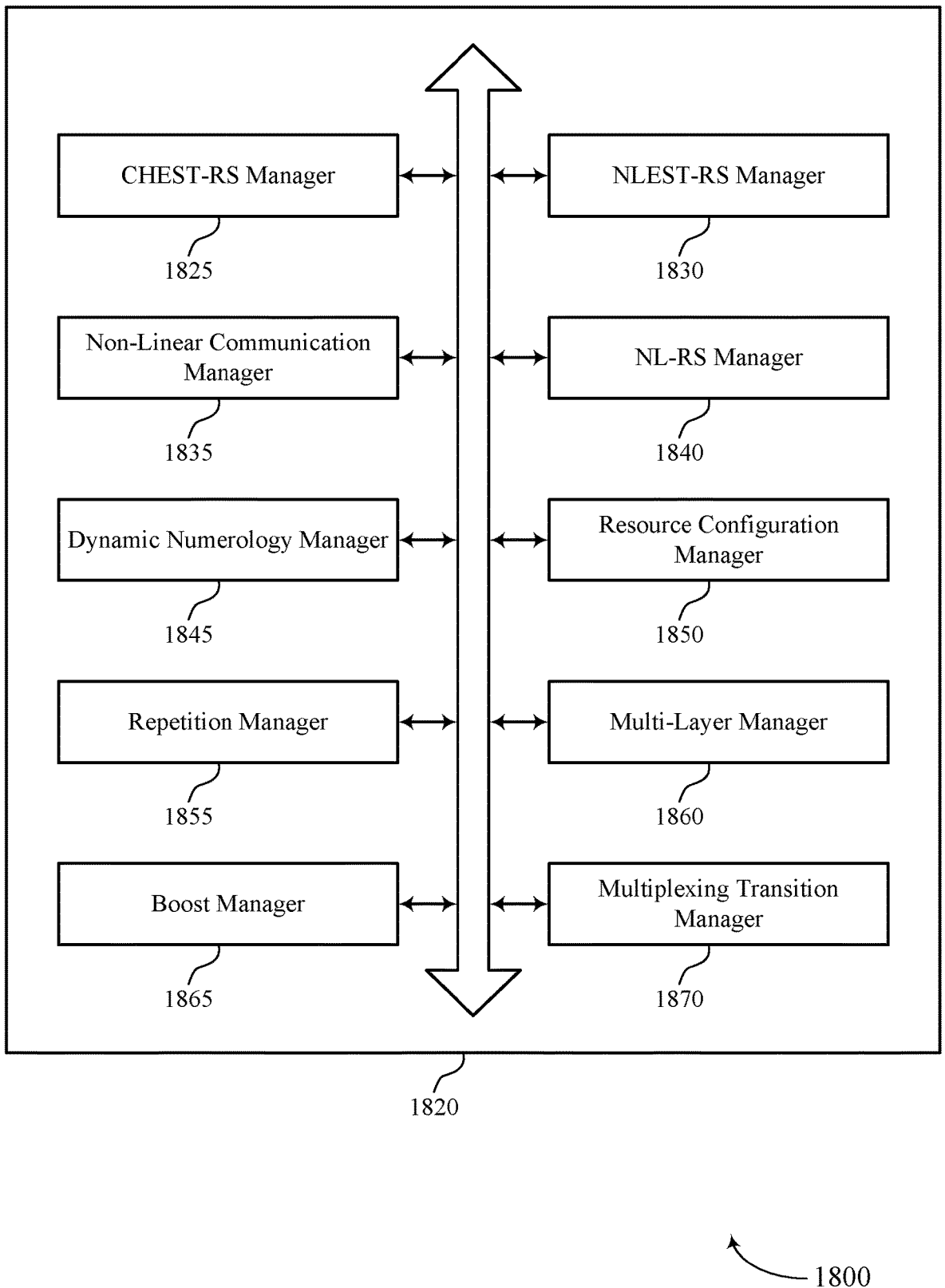
FIG. 18 shows a block diagram of a communications manager that supports non-linear reference signal design in accordance with aspects of the present disclosure.

FIG. 18 shows a block diagram 1800 of a communications manager 1820 that supports non-linear reference signal design in accordance with aspects of the present disclosure. The communications manager 1820 may be an example of aspects of a communications manager 1620, a communications manager 1720, or both, as described herein. The communications manager 1820, or various components thereof, may be an example of means for performing various aspects of non-linear reference signal design as described herein. For example, the communications manager 1820 may include an CHEST-RS manager 1825, an NLEST-RS manager 1830, a non-linear communication manager 1835, an NL-RS manager 1840, a dynamic numerology manager 1845, a resource configuration manager 1850, a repetition manager 1855, a multi-layer manager 1860, a boost manager 1865, a multiplexing transition manager 1870, or any combination thereof. Each of these components may communicate, directly or indirectly, with one another (e.g., via one or more buses).

The communications manager 1820 may support wireless communication at a receiving device in accordance with examples as disclosed herein. The CHEST-RS manager 1825 may be configured as or otherwise support a means for receiving, from a transmitting device, a CHEST-RS transmitted over a bandwidth, the CHEST-RS associated with a PA configuration of the transmitting device. In some examples, the CHEST-RS manager 1825 may be configured as or otherwise support a means for determining a channel estimation measurement associated with the PA configuration based on the CHEST-RS. The NLEST-RS manager 1830 may be configured as or otherwise support a means for receiving, from the transmitting device, a NLEST-RS transmitted over a subset bandwidth of the bandwidth, the NLEST-RS associated with the PA configuration. In some examples, the NLEST-RS manager 1830 may be configured as or otherwise support a means for determining a non-linear estimation measurement associated with the PA configuration based on the NLEST-RS and the CHEST-RS, the non-linear estimation measurement identifying a non-linear response of the PA configuration. The non-linear communication manager 1835 may be configured as or otherwise support a means for communicating with the transmitting device based on the channel estimation measurement and the non-linear response of the PA configuration.

In some examples, the resource configuration manager 1850 may be configured as or otherwise support a means for receiving a signal identifying a resource configuration for the CHEST-RS, the NLEST-RS, or both, where the CHEST-RS and the NLEST-RS are received based on receiving the signal identifying the resource configuration, the resource configuration for the CHEST-RS and the resource configuration for the NLEST-RS including a same resource configuration or a different resource configurations.

In some examples, the repetition manager 1855 may be configured as or otherwise support a means for receiving one or more instances of the CHEST-RS according to a repetition pattern of the CHEST-RS, where the channel estimation measurement is based on receiving the one or more instances of the CHEST-RS.

In some examples, the repetition manager 1855 may be configured as or otherwise support a means for receiving one or more instances of the NLEST-RS according to a repetition pattern of the NLEST-RS, where the non-linear estimation measurement is based on the one or more instances of the NLEST-RS.

In some examples, the multi-layer manager 1860 may be configured as or otherwise support a means for identifying an antenna configuration of the CHEST-RS, where the channel estimation measurement is for the antenna configuration and the PA configuration.

In some examples, the multi-layer manager 1860 may be configured as or otherwise support a means for identifying an antenna configuration of the NLEST-RS, where the non-linear estimation measurement is for the antenna configuration and the PA configuration.

In some examples, receiving the CHEST-RS includes receiving during a first symbol. In some examples, receiving the NLEST-RS includes receiving during a second symbol following the first symbol.

In some examples, the resource configuration manager 1850 may be configured as or otherwise support a means for receiving one or more instances of the CHEST-RS and one or more instances of the non-linear reference signal according to a periodic schedule, a semi-persistent schedule, aperiodically, or any combination thereof.

Additionally or alternatively, the communications manager 1820 may support wireless communication at a transmitting device in accordance with examples as disclosed herein. The NL-RS manager 1840 may be configured as or otherwise support a means for identifying a CHEST-RS and a NLEST-RS associated with a PA configuration of the transmitting device. In some examples, the CHEST-RS manager 1825 may be configured as or otherwise support a means for transmitting, to a receiving device, the CHEST-RS transmitted over a bandwidth. In some examples, the NLEST-RS manager 1830 may be configured as or otherwise support a means for transmitting, to the receiving device, the NLEST-RS transmitted over a subset bandwidth of the bandwidth. In some examples, the non-linear communication manager 1835 may be configured as or otherwise support a means for communicating with the receiving device based on a channel estimation measurement based on the CHEST-RS and a non-linear response of the PA configuration based on the NLEST-RS and the CHEST-RS.

In some examples, the resource configuration manager 1850 may be configured as or otherwise support a means for transmitting a signal identifying a resource configuration for the CHEST-RS, the NLEST-RS, or both, where the CHEST-RS and the NLEST-RS are transmitted based on the signal identifying the resource configuration, the resource configuration for the CHEST-RS and the resource configuration for the NLEST-RS including a same resource configuration or a different resource configuration.

In some examples, the repetition manager 1855 may be configured as or otherwise support a means for transmitting one or more instances of the CHEST-RS according to a repetition pattern of the CHEST-RS, where the channel estimation measurement is based on transmitting the one or more instances of the CHEST-RS.

In some examples, the boost manager 1865 may be configured as or otherwise support a means for selecting an de-boosted transmit power level for the CHEST-RS.

In some examples, the repetition manager 1855 may be configured as or otherwise support a means for transmitting one or more instances of the NLEST-RS according to a repetition pattern of the NLEST-RS, where the non-linear estimation measurement is based on the one or more instances of the NLEST-RS.

In some examples, the boost manager 1865 may be configured as or otherwise support a means for selecting a boosted transmit power level for the CHEST-RS.

In some examples, the multi-layer manager 1860 may be configured as or otherwise support a means for identifying an antenna configuration of the CHEST-RS, where the channel estimation measurement is for the antenna configuration and the PA configuration.

In some examples, the multi-layer manager 1860 may be configured as or otherwise support a means for identifying an antenna configuration of the NLEST-RS, where the non-linear estimation measurement is for the antenna configuration and the PA configuration.

In some examples, transmitting the CHEST-RS includes transmitting during a first symbol. In some examples, transmitting the NLEST-RS includes transmitting during a second symbol following the first symbol.

In some examples, the resource configuration manager 1850 may be configured as or otherwise support a means for transmitting one or more instances of the CHEST-RS and one or more instances of the non-linear reference signal according to a periodic schedule, a semi-persistent schedule, aperiodically, or any combination thereof.

Additionally or alternatively, the communications manager 1820 may support wireless communication at a receiving device in accordance with examples as disclosed herein. The dynamic numerology manager 1845 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. In some examples, the NLEST-RS manager 1830 may be configured as or otherwise support a means for receiving, from the transmitting device, a NLEST-RS associated with a PA configuration of the transmitting device. In some examples, the dynamic numerology manager 1845 may be configured as or otherwise support a means for determining a numerology associated with the NLEST-RS based on the dynamic numerology scheme and a non-linear response of the PA configuration that is based on the NLEST-RS and the numerology. In some examples, the dynamic numerology manager 1845 may be configured as or otherwise support a means for communicating with the transmitting device based on the non-linear response of the PA configuration.

In some examples, the multiplexing transition manager 1870 may be configured as or otherwise support a means for determining that transmission of the NLEST-RS are switched from a first multiplexing technique to a second multiplexing technique of one or more multiplexing techniques. In some examples, the multiplexing transition manager 1870 may be configured as or otherwise support a means for receiving, based on the dynamic numerology scheme, the NLEST-RS according to the second multiplexing technique using an index number associated with the NLEST-RS for the first multiplexing technique.

In some examples, the multiplexing transition manager 1870 may be configured as or otherwise support a means for identifying, based on the dynamic numerology scheme, the index number associated with the NLEST-RS for the first multiplexing technique, where the NLEST-RS is received according to the second multiplexing technique based on the index number.

In some examples, the first multiplexing technique includes a frequency division multiplexing technique and the second multiplexing technique includes a time division multiplexing technique.

In some examples, the first multiplexing technique and the second multiplexing technique each include a respective time division multiplexing technique.

In some examples, the one or more multiplexing techniques include a frequency division multiplexing technique, a time division multiplexing technique, a code division multiplexing technique, or any combination thereof.

Additionally or alternatively, the communications manager 1820 may support wireless communication at a transmitting device in accordance with examples as disclosed herein. In some examples, the dynamic numerology manager 1845 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. In some examples, the NL-RS manager 1840 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. In some examples, the non-linear communication manager 1835 may be configured as or otherwise support a means for communicating with the receiving device based on the non-linear response of the PA configuration.

In some examples, the multiplexing transition manager 1870 may be configured as or otherwise support a means for determining that transmission of the NLEST-RS has switched from a first multiplexing technique to a second multiplexing technique of the one or more multiplexing techniques. In some examples, the multiplexing transition manager 1870 may be configured as or otherwise support a means for transmitting, based on the dynamic numerology scheme, the NLEST-RS according to the second multiplexing technique using an index number associated with the NLEST-RS for the first multiplexing technique.

In some examples, the multiplexing transition manager 1870 may be configured as or otherwise support a means for identifying, based on the dynamic numerology scheme, the index number associated with the NLEST-RS for the first multiplexing technique, where the NLEST-RS is transmitted according to the second multiplexing technique based on the index number.

In some examples, the first multiplexing technique includes a frequency division multiplexing technique and the second multiplexing technique includes a time division multiplexing technique.

In some examples, the first multiplexing technique and the second multiplexing technique each include a respective time division multiplexing technique.

In some examples, the one or more multiplexing techniques include a frequency division multiplexing technique, a time division multiplexing technique, a code division multiplexing technique, or any combination thereof.

Figure 19:
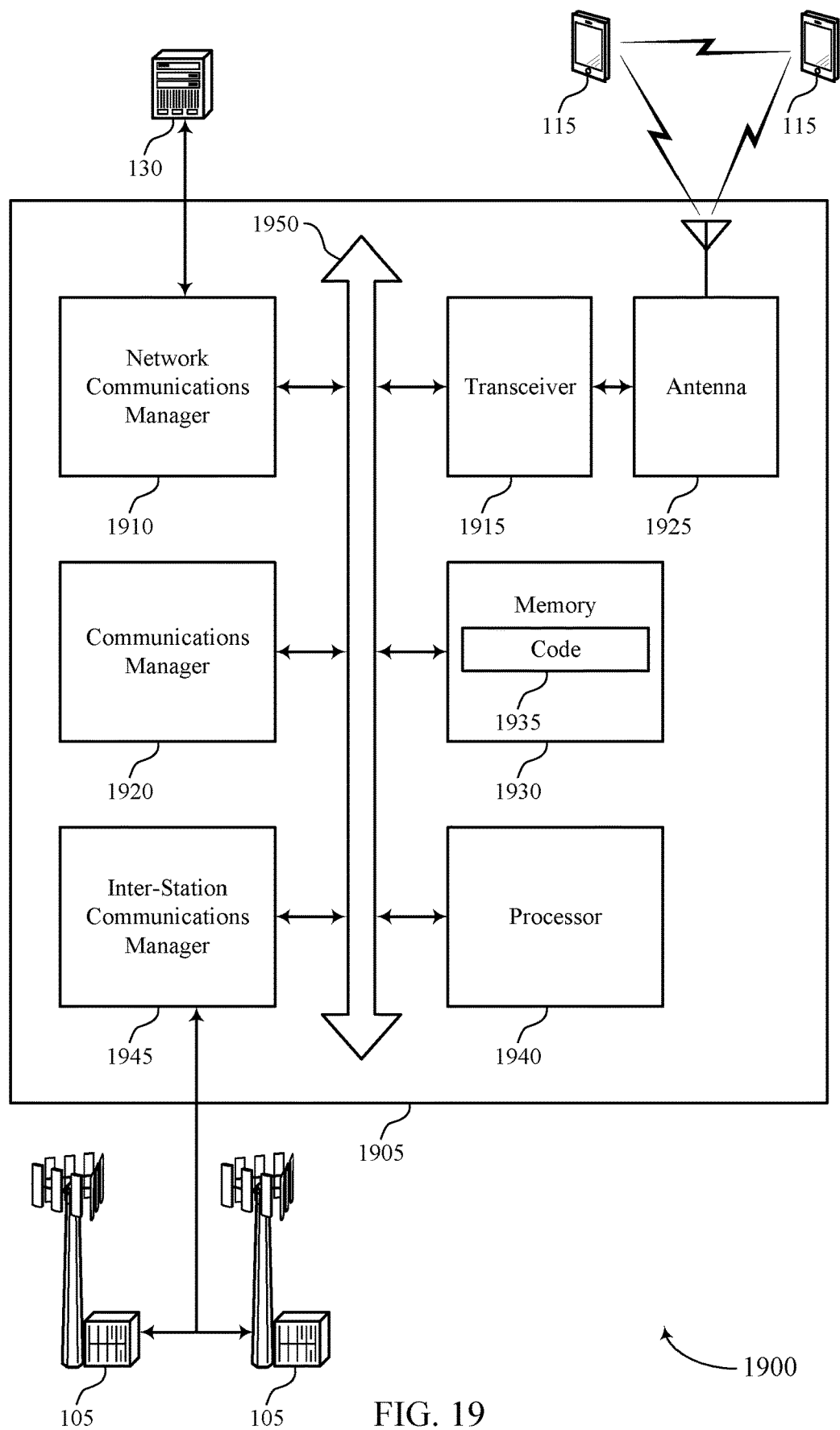
FIG. 19 shows a diagram of a system including a UE that supports non-linear reference signal design in accordance with aspects of the present disclosure.

FIG. 19 shows a diagram of a system 1900 including a device 1905 that supports non-linear reference signal design in accordance with aspects of the present disclosure. The device 1905 may be an example of or include the components of a device 1605, a device 1705, or a base station 105 as described herein. The device 1905 may communicate wirelessly with one or more base stations 105, UEs 115, or any combination thereof. The device 1905 may include components for bi-directional voice and data communications including components for transmitting and receiving communications, such as a communications manager 1920, a network communications manager 1910, a transceiver 1915, an antenna 1925, a memory 1930, code 1935, a processor 1940, and an inter-station communications manager 1945. These components may be in electronic communication or otherwise coupled (e.g., operatively, communicatively, functionally, electronically, electrically) via one or more buses (e.g., a bus 1950).

The network communications manager 1910 may manage communications with a core network 130 (e.g., via one or more wired backhaul links). For example, the network communications manager 1910 may manage the transfer of data communications for client devices, such as one or more UEs 115.

In some cases, the device 1905 may include a single antenna 1925. However, in some other cases the device 1905 may have more than one antenna 1925, which may be capable of concurrently transmitting or receiving multiple wireless transmissions. The transceiver 1915 may communicate bi-directionally, via the one or more antennas 1925, wired, or wireless links as described herein. For example, the transceiver 1915 may represent a wireless transceiver and may communicate bi-directionally with another wireless transceiver. The transceiver 1915 may also include a modem to modulate the packets, to provide the modulated packets to one or more antennas 1925 for transmission, and to demodulate packets received from the one or more antennas 1925. The transceiver 1915, or the transceiver 1915 and one or more antennas 1925, may be an example of a transmitter 1615, a transmitter 1715, a receiver 1610, a receiver 1710, or any combination thereof or component thereof, as described herein.

The memory 1930 may include random access memory (RAM) and read-only memory (ROM). The memory 1930 may store computer-readable, computer-executable code 1935 including instructions that, when executed by the processor 1940, cause the device 1905 to perform various functions described herein. The code 1935 may be stored in a non-transitory computer-readable medium such as system memory or another type of memory. In some cases, the code 1935 may not be directly executable by the processor 1940 but may cause a computer (e.g., when compiled and executed) to perform functions described herein. In some cases, the memory 1930 may contain, among other things, a basic input/output (I/O) system (BIOS) which may control basic hardware or software operation such as the interaction with peripheral components or devices.

The processor 1940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting non-linear reference signal design). For example, the device 1905 or a component of the device 1905 may include a processor 1940 and memory 1930 coupled to the processor 1940, the processor 1940 and memory 1930 configured to perform various functions described herein.

The inter-station communications manager 1945 may manage communications with other base stations 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communications network technology to provide communication between base stations 105.

The communications manager 1920 may support wireless communication at a receiving device in accordance with examples as disclosed herein. For example, the communications manager 1920 may be configured as or otherwise support a means for receiving, from a transmitting device, a CHEST-RS transmitted over a bandwidth, the CHEST-RS associated with a PA configuration of the transmitting device. The communications manager 1920 may be configured as or otherwise support a means for determining a channel estimation measurement associated with the PA configuration based on the CHEST-RS. The communications manager 1920 may be configured as or otherwise support a means for receiving, from the transmitting device, a NLEST-RS transmitted over a subset bandwidth of the bandwidth, the NLEST-RS associated with the PA configuration. The communications manager 1920 may be configured as or otherwise support a means for determining a non-linear estimation measurement associated with the PA configuration based on the NLEST-RS and the CHEST-RS, the non-linear estimation measurement identifying a non-linear response of the PA configuration. The communications manager 1920 may be configured as or otherwise support a means for communicating with the transmitting device based on the channel estimation measurement and the non-linear response of the PA configuration.

Additionally or alternatively, the communications manager 1920 may support wireless communication at a transmitting device in accordance with examples as disclosed herein. For example, the communications manager 1920 may be configured as or otherwise support a means for identifying a CHEST-RS and a NLEST-RS associated with a PA configuration of the transmitting device. The communications manager 1920 may be configured as or otherwise support a means for transmitting, to a receiving device, the CHEST-RS transmitted over a bandwidth. The communications manager 1920 may be configured as or otherwise support a means for transmitting, to the receiving device, the NLEST-RS transmitted over a subset bandwidth of the bandwidth. The communications manager 1920 may be configured as or otherwise support a means for communicating with the receiving device based on a channel estimation measurement based on the CHEST-RS and a non-linear response of the PA configuration based on the NLEST-RS and the CHEST-RS.

Additionally or alternatively, the communications manager 1920 may support wireless communication at a receiving device in accordance with examples as disclosed herein. For example, the communications manager 1920 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. The communications manager 1920 may be configured as or otherwise support a means for receiving, from the transmitting device, a NLEST-RS associated with a PA configuration of the transmitting device. The communications manager 1920 may be configured as or otherwise support a means for determining a numerology associated with the NLEST-RS based on the dynamic numerology scheme and a non-linear response of the PA configuration that is based on the NLEST-RS and the numerology. The communications manager 1920 may be configured as or otherwise support a means for communicating with the transmitting device based on the non-linear response of the PA configuration.

Additionally or alternatively, the communications manager 1920 may support wireless communication at a transmitting device in accordance with examples as disclosed herein. For example, the communications manager 1920 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. The communications manager 1920 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The communications manager 1920 may be configured as or otherwise support a means for communicating with the receiving device based on the non-linear response of the PA configuration.

By including or configuring the communications manager 1920 in accordance with examples as described herein, the device 1905 may support techniques for improving OTA-DPD and/or DPoD predistortion compensation at the transmitting device, reducing overhead associated with NL-RS transmissions, and the like.

In some examples, the communications manager 1920 may be configured to perform various operations (e.g., receiving, monitoring, transmitting) using or otherwise in cooperation with the transceiver 1915, the one or more antennas 1925, or any combination thereof. Although the communications manager 1920 is illustrated as a separate component, in some examples, one or more functions described with reference to the communications manager 1920 may be supported by or performed by the processor 1940, the memory 1930, the code 1935, or any combination thereof. For example, the code 1935 may include instructions executable by the processor 1940 to cause the device 1905 to perform various aspects of non-linear reference signal design as described herein, or the processor 1940 and the memory 1930 may be otherwise configured to perform or support such operations.

Figure 20:
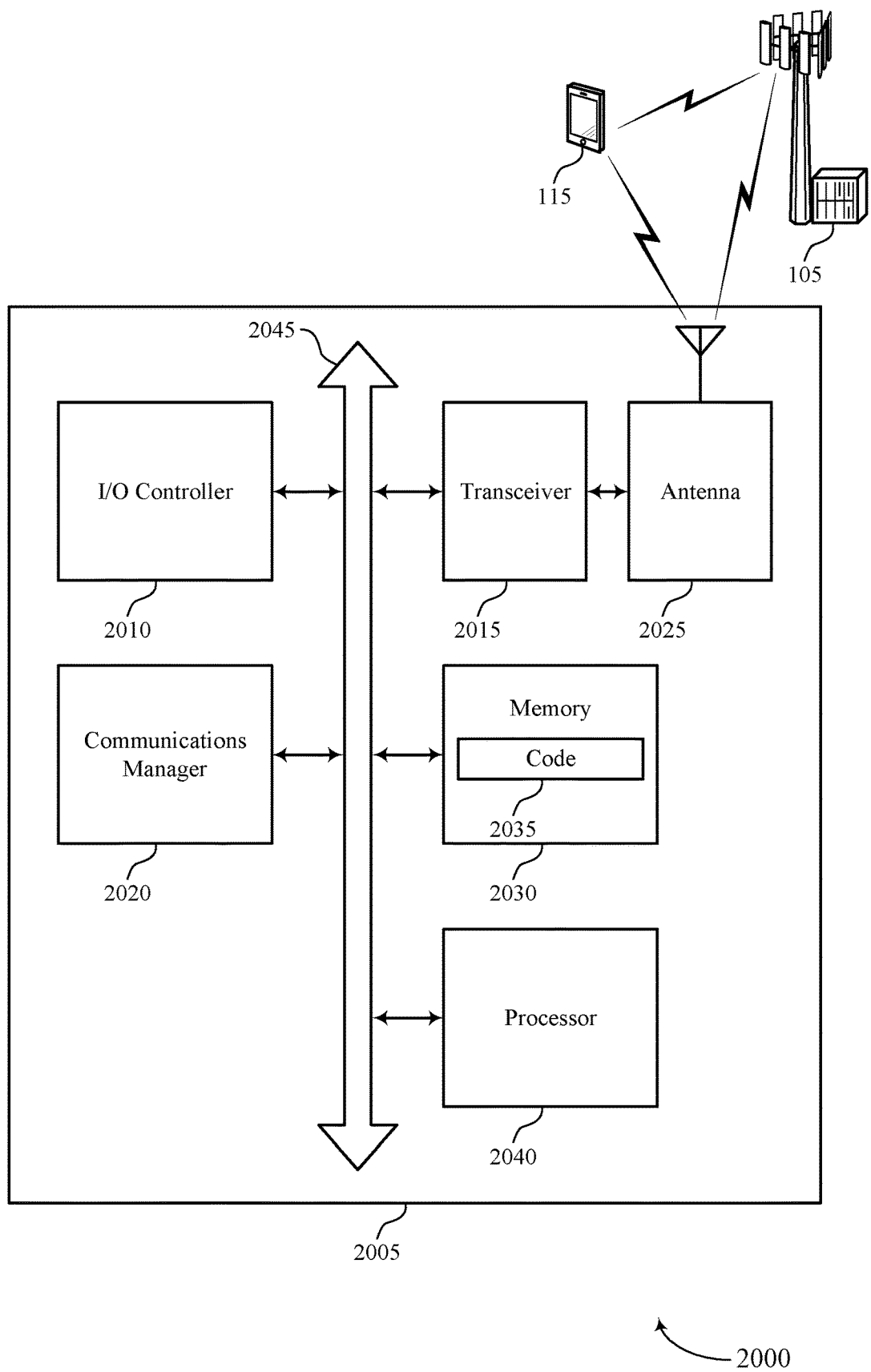
FIG. 20 shows a diagram of a system including a base station that supports non-linear reference signal design in accordance with aspects of the present disclosure.

FIG. 20 shows a diagram of a system 2000 including a device 2005 that supports non-linear reference signal design in accordance with aspects of the present disclosure. The device 2005 may be an example of or include the components of a device 1605, a device 1705, or a UE 115 as described herein. The device 2005 may communicate wirelessly with one or more base stations 105, UEs 115, or any combination thereof. The device 2005 may include components for bi-directional voice and data communications including components for transmitting and receiving communications, such as a communications manager 2020, an I/O controller 2010, a transceiver 2015, an antenna 2025, a memory 2030, code 2035, and a processor 2040. These components may be in electronic communication or otherwise coupled (e.g., operatively, communicatively, functionally, electronically, electrically) via one or more buses (e.g., a bus 2045).

The I/O controller 2010 may manage input and output signals for the device 2005. The I/O controller 2010 may also manage peripherals not integrated into the device 2005. In some cases, the I/O controller 2010 may represent a physical connection or port to an external peripheral. In some cases, the I/O controller 2010 may utilize an operating system such as iOS®, ANDROID®, MS-DOS®, MS-WINDOWS®, OS/2®, UNIX®, LINUX®, or another known operating system. Additionally or alternatively, the I/O controller 2010 may represent or interact with a modem, a keyboard, a mouse, a touchscreen, or a similar device. In some cases, the I/O controller 2010 may be implemented as part of a processor, such as the processor 2040. In some cases, a user may interact with the device 2005 via the I/O controller 2010 or via hardware components controlled by the I/O controller 2010.

In some cases, the device 2005 may include a single antenna 2025. However, in some other cases, the device 2005 may have more than one antenna 2025, which may be capable of concurrently transmitting or receiving multiple wireless transmissions. The transceiver 2015 may communicate bi-directionally, via the one or more antennas 2025, wired, or wireless links as described herein. For example, the transceiver 2015 may represent a wireless transceiver and may communicate bi-directionally with another wireless transceiver. The transceiver 2015 may also include a modem to modulate the packets, to provide the modulated packets to one or more antennas 2025 for transmission, and to demodulate packets received from the one or more antennas 2025. The transceiver 2015, or the transceiver 2015 and one or more antennas 2025, may be an example of a transmitter 1615, a transmitter 1715, a receiver 1610, a receiver 1710, or any combination thereof or component thereof, as described herein.

The memory 2030 may include RAM and ROM. The memory 2030 may store computer-readable, computer-executable code 2035 including instructions that, when executed by the processor 2040, cause the device 2005 to perform various functions described herein. The code 2035 may be stored in a non-transitory computer-readable medium such as system memory or another type of memory. In some cases, the code 2035 may not be directly executable by the processor 2040 but may cause a computer (e.g., when compiled and executed) to perform functions described herein. In some cases, the memory 2030 may contain, among other things, a BIOS which may control basic hardware or software operation such as the interaction with peripheral components or devices.

The processor 2040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some other cases, a memory controller may be integrated into the processor 2040. The processor 2040 may be configured to execute computer-readable instructions stored in a memory (e.g., the memory 2030) to cause the device 2005 to perform various functions (e.g., functions or tasks supporting non-linear reference signal design). For example, the device

2005 or a component of the device 2005 may include a processor 2040 and memory 2030 coupled to the processor 2040, the processor 2040 and memory 2030 configured to perform various functions described herein.

The communications manager 2020 may support wireless communication at a receiving device in accordance with examples as disclosed herein. For example, the communications manager 2020 may be configured as or otherwise support a means for receiving, from a transmitting device, a CHEST-RS transmitted over a bandwidth, the CHEST-RS associated with a PA configuration of the transmitting device. The communications manager 2020 may be configured as or otherwise support a means for determining a channel estimation measurement associated with the PA configuration based on the CHEST-RS. The communications manager 2020 may be configured as or otherwise support a means for receiving, from the transmitting device, a NLEST-RS transmitted over a subset bandwidth of the bandwidth, the NLEST-RS associated with the PA configuration. The communications manager 2020 may be configured as or otherwise support a means for determining a non-linear estimation measurement associated with the PA configuration based on the NLEST-RS and the CHEST-RS, the non-linear estimation measurement identifying a non-linear response of the PA configuration. The communications manager 2020 may be configured as or otherwise support a means for communicating with the transmitting device based on the channel estimation measurement and the non-linear response of the PA configuration.

Additionally or alternatively, the communications manager 2020 may support wireless communication at a transmitting device in accordance with examples as disclosed herein. For example, the communications manager 2020 may be configured as or otherwise support a means for identifying a CHEST-RS and a NLEST-RS associated with a PA configuration of the transmitting device. The communications manager 2020 may be configured as or otherwise support a means for transmitting, to a receiving device, the CHEST-RS transmitted over a bandwidth. The communications manager 2020 may be configured as or otherwise support a means for transmitting, to the receiving device, the NLEST-RS transmitted over a subset bandwidth of the bandwidth. The communications manager 2020 may be configured as or otherwise support a means for communicating with the receiving device based on a channel estimation measurement based on the CHEST-RS and a non-linear response of the PA configuration based on the NLEST-RS and the CHEST-RS.

Additionally or alternatively, the communications manager 2020 may support wireless communication at a receiving device in accordance with examples as disclosed herein. For example, the communications manager 2020 may be configured as or otherwise support a means for determining a dynamic numerology scheme associated with one or more NLEST-RSs to be transmitted from a transmitting device according to corresponding one or more antenna configurations, each NLEST-RS associated with a corresponding antenna configuration and a PA configuration. The communications manager 2020 may be configured as or otherwise support a means for receiving, from the transmitting device, a NLEST-RS associated with a PA configuration of the transmitting device. The communications manager 2020 may be configured as or otherwise support a means for determining a numerology associated with the NLEST-RS based on the dynamic numerology scheme and a non-linear response of the PA configuration that is based on the NLEST-RS and the numerology. The communications manager 2020 may be configured as or otherwise support a means for communicating with the transmitting device based on the non-linear response of the PA configuration.

Additionally or alternatively, the communications manager 2020 may support wireless communication at a transmitting device in accordance with examples as disclosed herein. For example, the communications manager 2020 may be configured as or otherwise support a means for determining a dynamic numerology scheme associated with one or more NLEST-RSs to be transmitted to a receiving device according to corresponding one or more antenna configurations, each NLEST-RS associated with a corresponding antenna configuration and PA configuration. The communications manager 2020 may be configured as or otherwise support a means for transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The communications manager 2020 may be configured as or otherwise support a means for communicating with the receiving device based on the non-linear response of the PA configuration.

By including or configuring the communications manager 2020 in accordance with examples as described herein, the device 2005 may support techniques for improving OTA-DPD and/or DPoD predistortion compensation at the transmitting device, reducing overhead associated with NL-RS transmissions, and the like.

In some examples, the communications manager 2020 may be configured to perform various operations (e.g., receiving, monitoring, transmitting) using or otherwise in cooperation with the transceiver 2015, the one or more antennas 2025, or any combination thereof. Although the communications manager 2020 is illustrated as a separate component, in some examples, one or more functions described with reference to the communications manager 2020 may be supported by or performed by the processor 2040, the memory 2030, the code 2035, or any combination thereof. For example, the code 2035 may include instructions executable by the processor 2040 to cause the device 2005 to perform various aspects of non-linear reference signal design as described herein, or the processor 2040 and the memory 2030 may be otherwise configured to perform or support such operations.

Figure 21:
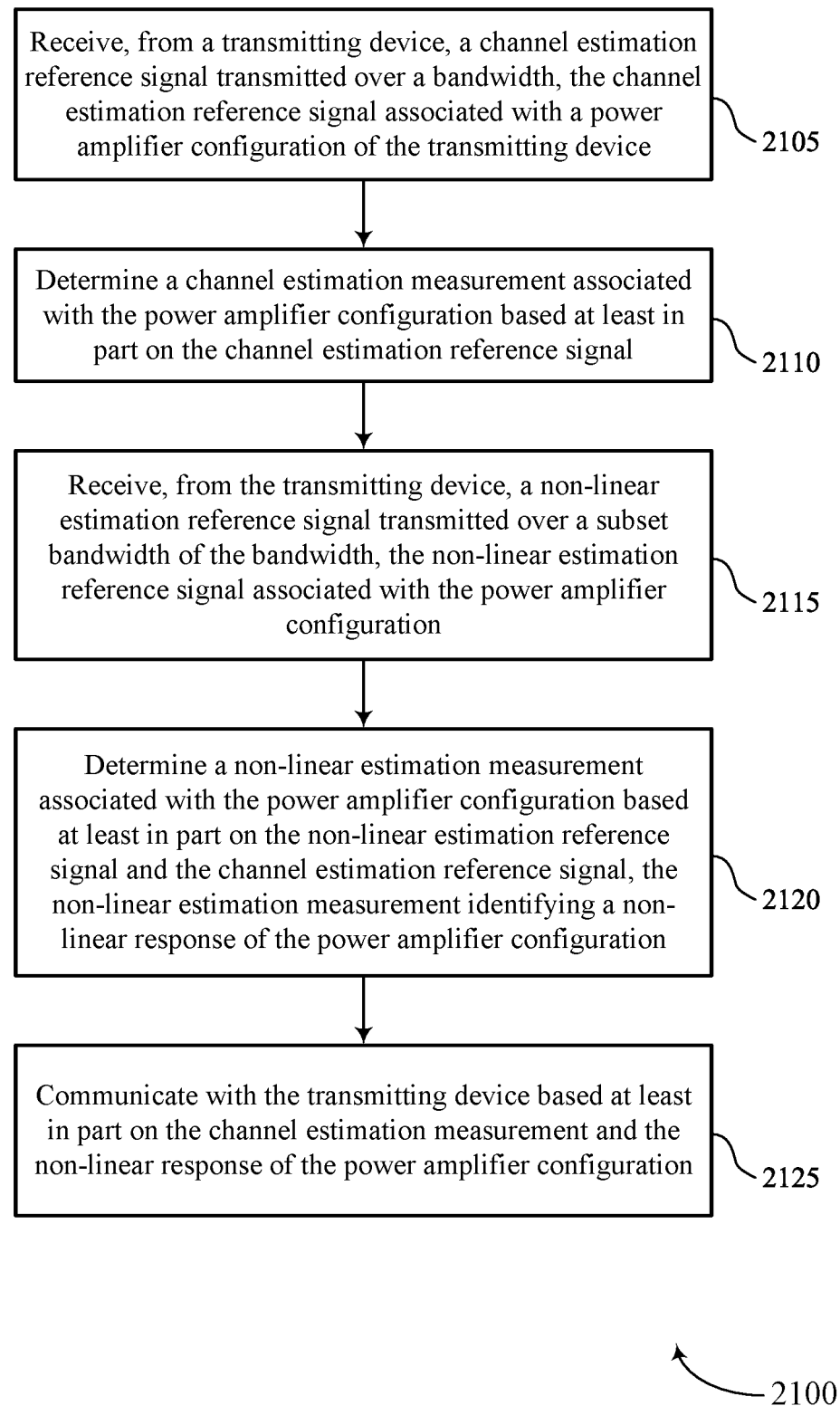
FIGS. 21 through 26 show flowcharts illustrating methods that support non-linear reference signal design in accordance with aspects of the present disclosure.

FIG. 21 shows a flowchart illustrating a method 2100 that supports non-linear reference signal design in accordance with aspects of the present disclosure. The operations of the method 2100 may be implemented by a UE or a base station or its components as described herein. For example, the operations of the method 2100 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 2105, the method may include receiving, from a transmitting device, a CHEST-RS transmitted over a bandwidth, the CHEST-RS associated with a PA configuration of the transmitting device. The operations of 2105 may be performed in accordance with examples as disclosed herein. In some examples, aspects of the operations of 2105 may be performed by an CHEST-RS manager 1325 as described with reference to FIG. 13.

At 2110, the method may include determining a channel estimation measurement associated with the PA configuration based on the CHEST-RS. The operations of 2110 may be performed in accordance with examples as disclosed herein. In some examples, aspects of the operations of 2110 may be performed by an CHEST-RS manager 1325 as described with reference to FIG. 13.

At 2115, the method may include receiving, from the transmitting device, a NLEST-RS transmitted over a subset bandwidth of the bandwidth, the NLEST-RS associated with the PA configuration. The operations of 2115 may be performed in accordance with examples as disclosed herein. In some examples, aspects of the operations of 2115 may be performed by an NLEST-RS manager 1330 as described with reference to FIG. 13.

At 2120, the method may include determining a non-linear estimation measurement associated with the PA configuration based on the NLEST-RS and the CHEST-RS, the non-linear estimation measurement identifying a non-linear response of the PA configuration. The operations of 2120 may be performed in accordance with examples as disclosed herein. In some examples, aspects of the operations of 2120 may be performed by an NLEST-RS manager 1330 as described with reference to FIG. 13.

At 2125, the method may include communicating with the transmitting device based on the channel estimation measurement and the non-linear response of the PA configuration. The operations of 2125 may be performed in accordance with examples as disclosed herein. In some examples, aspects of the operations of 2125 may be performed by a non-linear communication manager 1335 as described with reference to FIG. 13.

Figure 22:
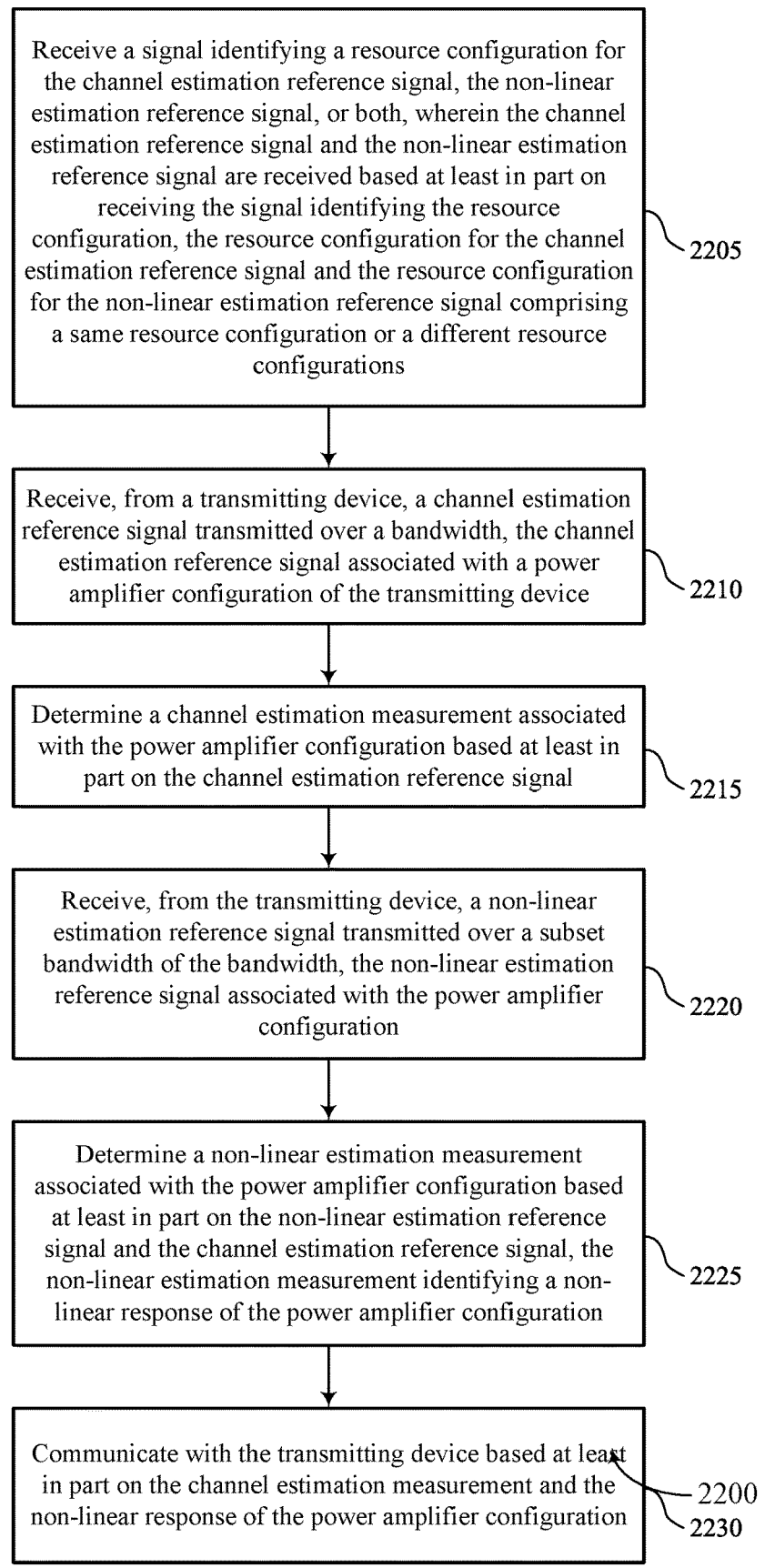

FIG. 22 shows a flowchart illustrating a method 2200 that supports non-linear reference signal design in accordance with aspects of the present disclosure. The operations of the method 2200 may be implemented by a UE or a base station or its components as described herein. For example, the operations of the method 2200 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 2205, the method may include receiving a signal identifying a resource configuration for the CHEST-RS, the NLEST-RS, or both, where the CHEST-RS and the NLEST-RS are received based on receiving the signal identifying the resource configuration, the resource configuration for the CHEST-RS and the resource configuration for the NLEST-RS including a same resource configuration or a different resource configurations. The operations of 2205 may be performed in accordance with examples as disclosed herein. In some examples, aspects of the operations of 2205 may be performed by a resource configuration manager 1350 as described with reference to FIG. 13.

At 2210, the method may include receiving, from a transmitting device, a CHEST-RS transmitted over a bandwidth, the CHEST-RS associated with a PA configuration of the transmitting device. The operations of 2210 may be performed in accordance with examples as disclosed herein. In some examples, aspects of the operations of 2210 may be performed by an CHEST-RS manager 1325 as described with reference to FIG. 13.

At 2215, the method may include determining a channel estimation measurement associated with the PA configuration based on the CHEST-RS. The operations of 2215 may be performed in accordance with examples as disclosed herein. In some examples, aspects of the operations of 2215 may be performed by an CHEST-RS manager 1325 as described with reference to FIG. 13.

At 2220, the method may include receiving, from the transmitting device, a NLEST-RS transmitted over a subset bandwidth of the bandwidth, the NLEST-RS associated with the PA configuration. The operations of 2220 may be performed in accordance with examples as disclosed herein. In some examples, aspects of the operations of 2220 may be performed by an NLEST-RS manager 1330 as described with reference to FIG. 13.

At 2225, the method may include determining a non-linear estimation measurement associated with the PA configuration based on the NLEST-RS and the CHEST-RS, the non-linear estimation measurement identifying a non-linear response of the PA configuration. The operations of 2225 may be performed in accordance with examples as disclosed herein. In some examples, aspects of the operations of 2225 may be performed by an NLEST-RS manager 1330 as described with reference to FIG. 13.

At 2230, the method may include communicating with the transmitting device based on the channel estimation measurement and the non-linear response of the PA configuration. The operations of 2230 may be performed in accordance with examples as disclosed herein. In some examples, aspects of the operations of 2230 may be performed by a non-linear communication manager 1335 as described with reference to FIG. 13.

Figure 23:
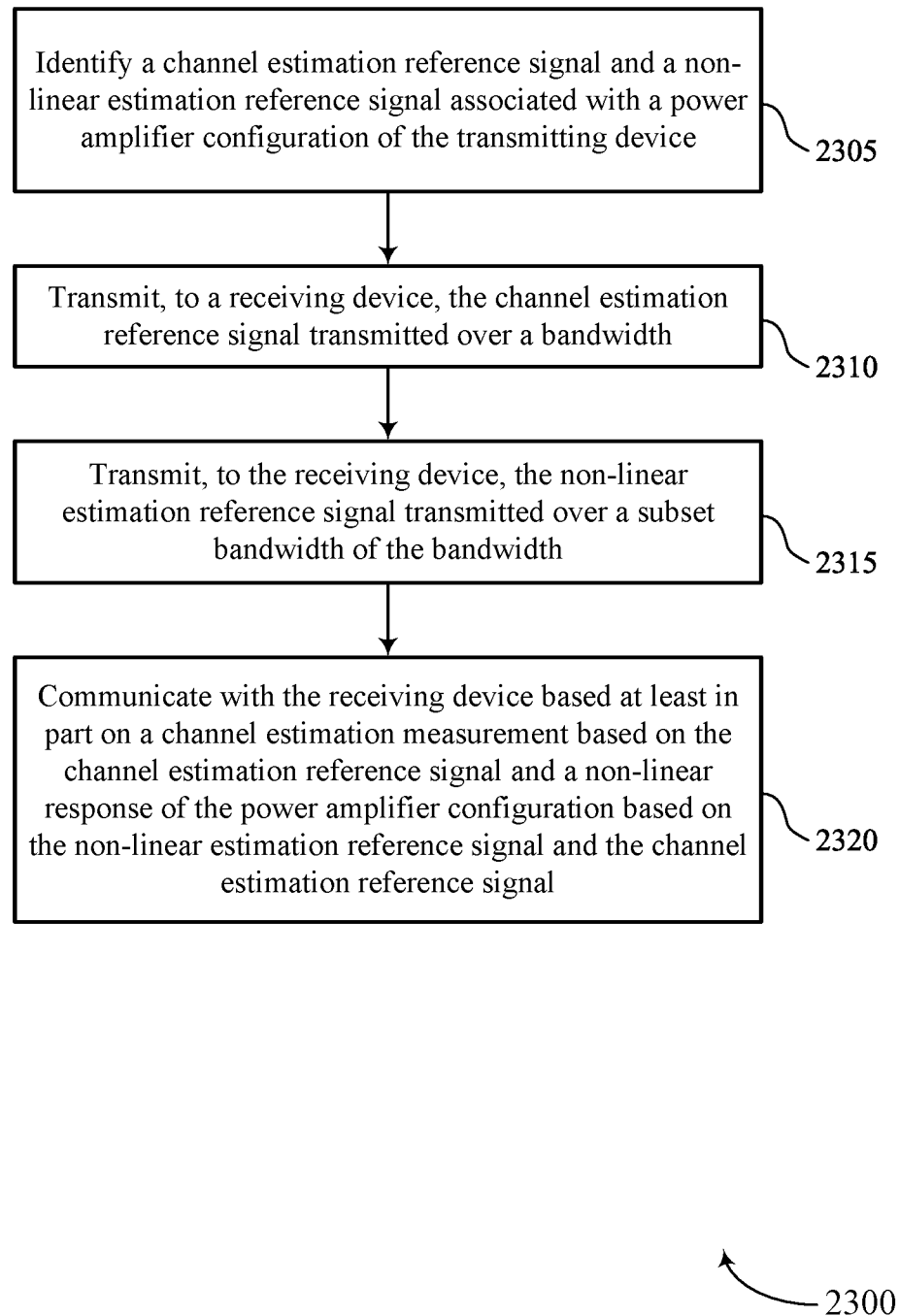

FIG. 23 shows a flowchart illustrating a method 2300 that supports non-linear reference signal design in accordance with aspects of the present disclosure. The operations of the method 2300 may be implemented by a base station or a UE or its components as described herein. For example, the operations of the method 2300 may be performed by a base station 105 or a UE 115 as described with reference to FIGS. 1 through 10 and 16 through 20. In some examples, a base station or a UE may execute a set of instructions to control the functional elements of the base station or the UE to perform the described functions. Additionally or alternatively, the base station or the UE may perform aspects of the described functions using special-purpose hardware.

At 2305, the method may include identifying a CHEST-RS and a NLEST-RS associated with a PA configuration of the transmitting device. The operations of 2305 may be performed in accordance with examples as disclosed herein. In some examples, aspects of the operations of 2305 may be performed by an NL-RS manager 1840 as described with reference to FIG. 18.

At 2310, the method may include transmitting, to a receiving device, the CHEST-RS transmitted over a bandwidth. The operations of 2310 may be performed in accordance with examples as disclosed herein. In some examples, aspects of the operations of 2310 may be performed by an CHEST-RS manager 1825 as described with reference to FIG. 18.

At 2315, the method may include transmitting, to the receiving device, the NLEST-RS transmitted over a subset bandwidth of the bandwidth. The operations of 2315 may be performed in accordance with examples as disclosed herein. In some examples, aspects of the operations of 2315 may be performed by an NLEST-RS manager 1830 as described with reference to FIG. 18.

At 2320, the method may include communicating with the receiving device based on a channel estimation measurement based on the CHEST-RS and a non-linear response of the PA configuration based on the NLEST-RS and the CHEST-RS. The operations of 2320 may be performed in accordance with examples as disclosed herein. In some examples, aspects of the operations of 2320 may be performed by a non-linear communication manager 1835 as described with reference to FIG. 18.

Figure 24:
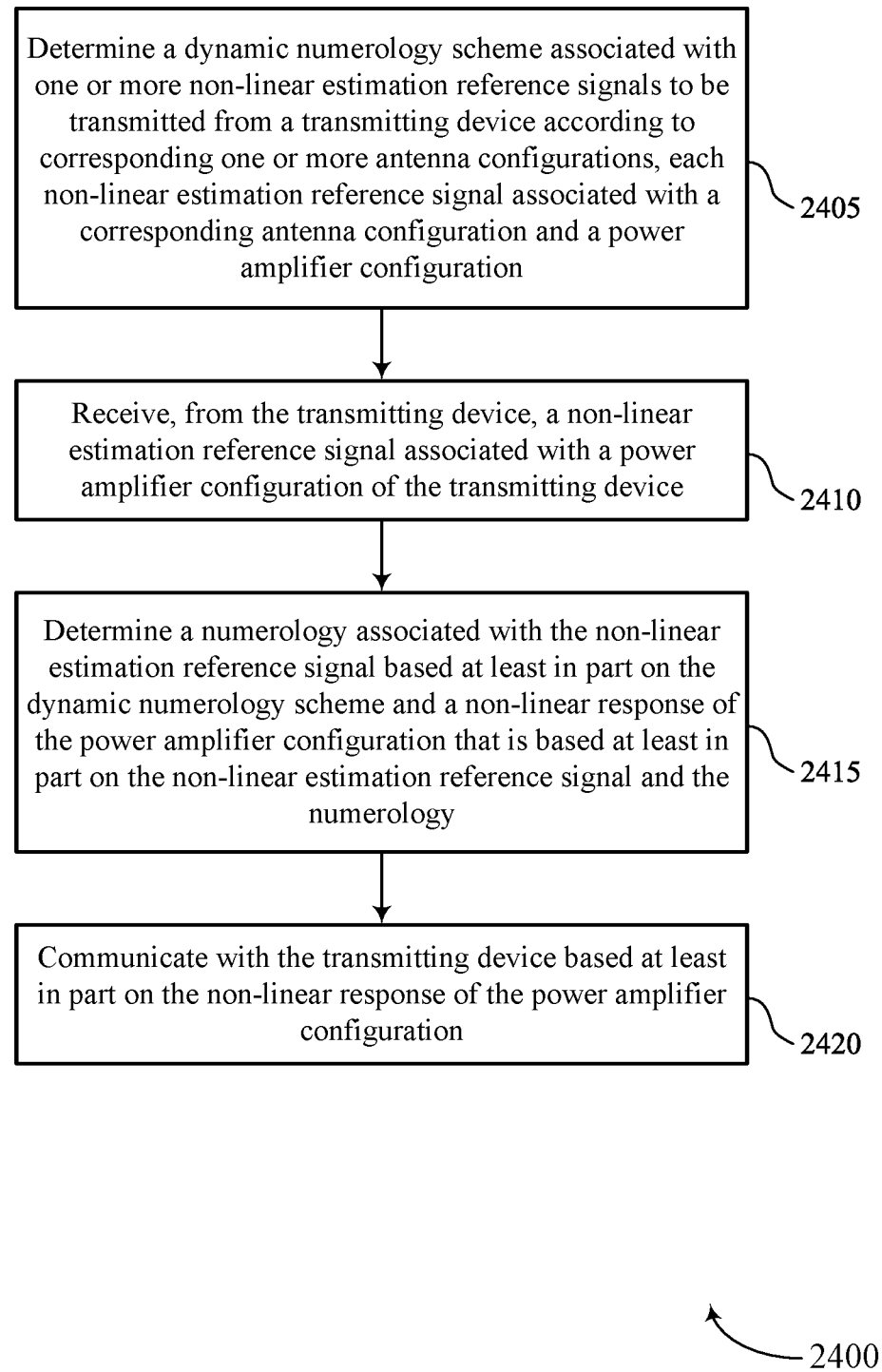

FIG. 24 shows a flowchart illustrating a method 2400 that supports non-linear reference signal design in accordance with aspects of the present disclosure. The operations of the method 2400 may be implemented by a UE or a base station or its components as described herein. For example, the operations of the method 2400 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 2405, the method may include determining a dynamic numerology scheme associated with one or more NLEST-RSs to be transmitted from a transmitting device according to corresponding one or more antenna configurations, each NLEST-RS associated with a corresponding antenna configuration and a PA configuration. The operations of 2405 may be performed in accordance with examples as disclosed herein. In some examples, aspects of the operations of 2405 may be performed by a dynamic numerology manager 1345 as described with reference to FIG. 13.

At 2410, the method may include receiving, from the transmitting device, a NLEST-RS associated with a PA configuration of the transmitting device. The operations of 2410 may be performed in accordance with examples as disclosed herein. In some examples, aspects of the operations of 2410 may be performed by an NLEST-RS manager 1330 as described with reference to FIG. 13.

At 2415, the method may include determining a numerology associated with the NLEST-RS based on the dynamic numerology scheme and a non-linear response of the PA configuration that is based on the NLEST-RS and the numerology. The operations of 2415 may be performed in accordance with examples as disclosed herein. In some examples, aspects of the operations of 2415 may be performed by a dynamic numerology manager 1345 as described with reference to FIG. 13.

At 2420, the method may include communicating with the transmitting device based on the non-linear response of the PA configuration. The operations of 2420 may be performed in accordance with examples as disclosed herein. In some examples, aspects of the operations of 2420 may be performed by a dynamic numerology manager 1345 as described with reference to FIG. 13.

Figure 25:
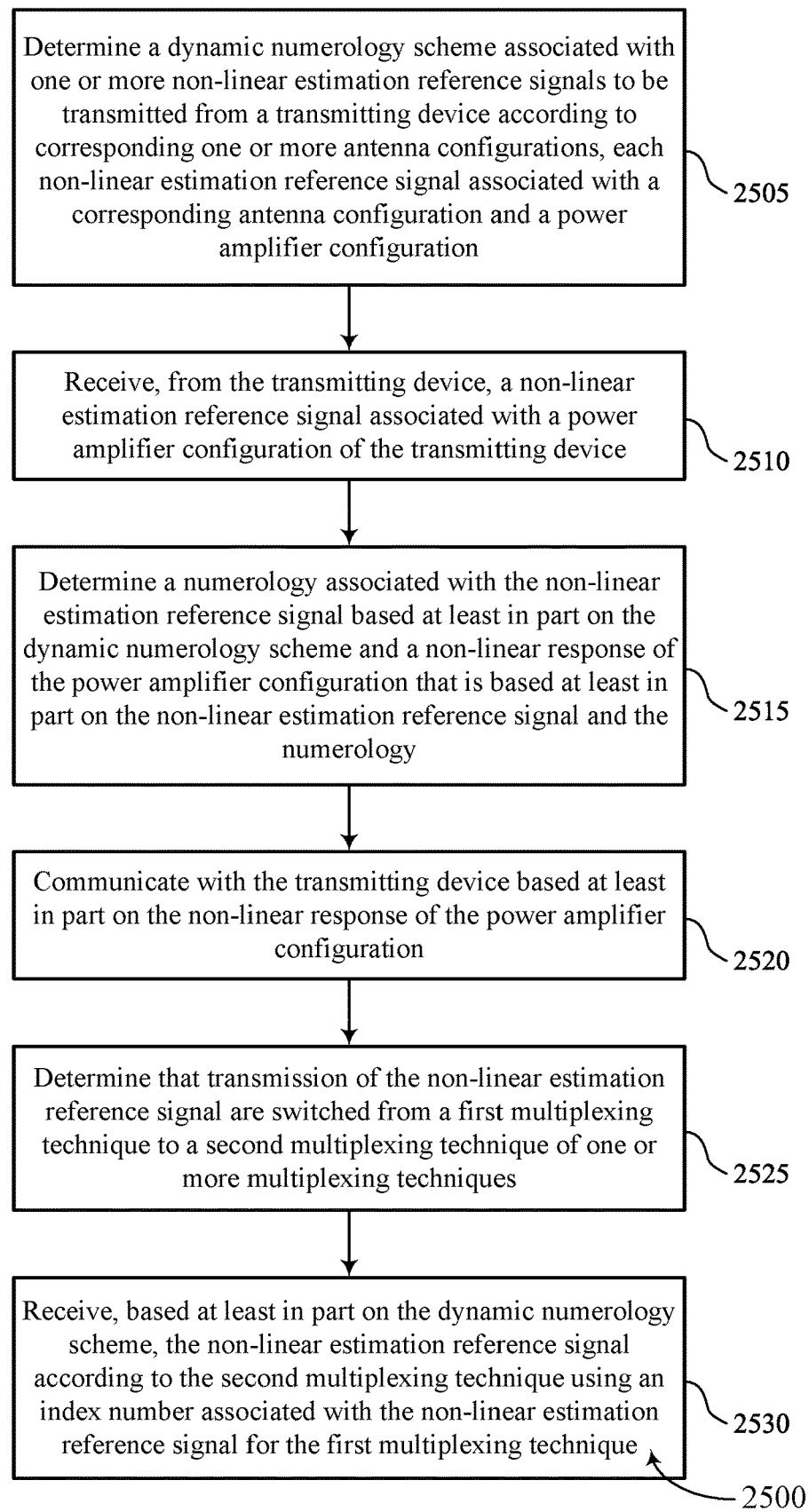

FIG. 25 shows a flowchart illustrating a method 2500 that supports non-linear reference signal design in accordance with aspects of the present disclosure. The operations of the method 2500 may be implemented by a UE or a base station or its components as described herein. For example, the operations of the method 2500 may be performed by a UE 115 or a base station 105 as described with reference to FIGS. 1 through 15. In some examples, a UE or a base station may execute a set of instructions to control the functional elements of the UE or the base station to perform the described functions. Additionally or alternatively, the UE or the base station may perform aspects of the described functions using special-purpose hardware.

At 2505, the method may include determining a dynamic numerology scheme associated with one or more NLEST-RSs to be transmitted from a transmitting device according to corresponding one or more antenna configurations, each NLEST-RS associated with a corresponding antenna configuration and a PA configuration. The operations of 2505 may be performed in accordance with examples as disclosed herein. In some examples, aspects of the operations of 2505 may be performed by a dynamic numerology manager 1345 as described with reference to FIG. 13.

At 2510, the method may include receiving, from the transmitting device, a NLEST-RS associated with a PA configuration of the transmitting device. The operations of 2510 may be performed in accordance with examples as disclosed herein. In some examples, aspects of the operations of 2510 may be performed by an NLEST-RS manager 1330 as described with reference to FIG. 13.

At 2515, the method may include determining a numerology associated with the NLEST-RS based on the dynamic numerology scheme and a non-linear response of the PA configuration that is based on the NLEST-RS and the numerology. The operations of 2515 may be performed in accordance with examples as disclosed herein. In some examples, aspects of the operations of 2515 may be performed by a dynamic numerology manager 1345 as described with reference to FIG. 13.

At 2520, the method may include communicating with the transmitting device based on the non-linear response of the PA configuration. The operations of 2520 may be performed in accordance with examples as disclosed herein. In some examples, aspects of the operations of 2520 may be performed by a dynamic numerology manager 1345 as described with reference to FIG. 13.

At 2525, the method may include determining that transmission of the NLEST-RS are switched from a first multiplexing technique to a second multiplexing technique of one or more multiplexing techniques. The operations of 2525 may be performed in accordance with examples as disclosed herein. In some examples, aspects of the operations of 2525 may be performed by a multiplexing transition manager 1370 as described with reference to FIG. 13.

At 2530, the method may include receiving, based on the dynamic numerology scheme, the NLEST-RS according to the second multiplexing technique using an index number associated with the NLEST-RS for the first multiplexing technique. The operations of 2530 may be performed in accordance with examples as disclosed herein. In some examples, aspects of the operations of 2530 may be performed by a multiplexing transition manager 1370 as described with reference to FIG. 13.

Figure 26:
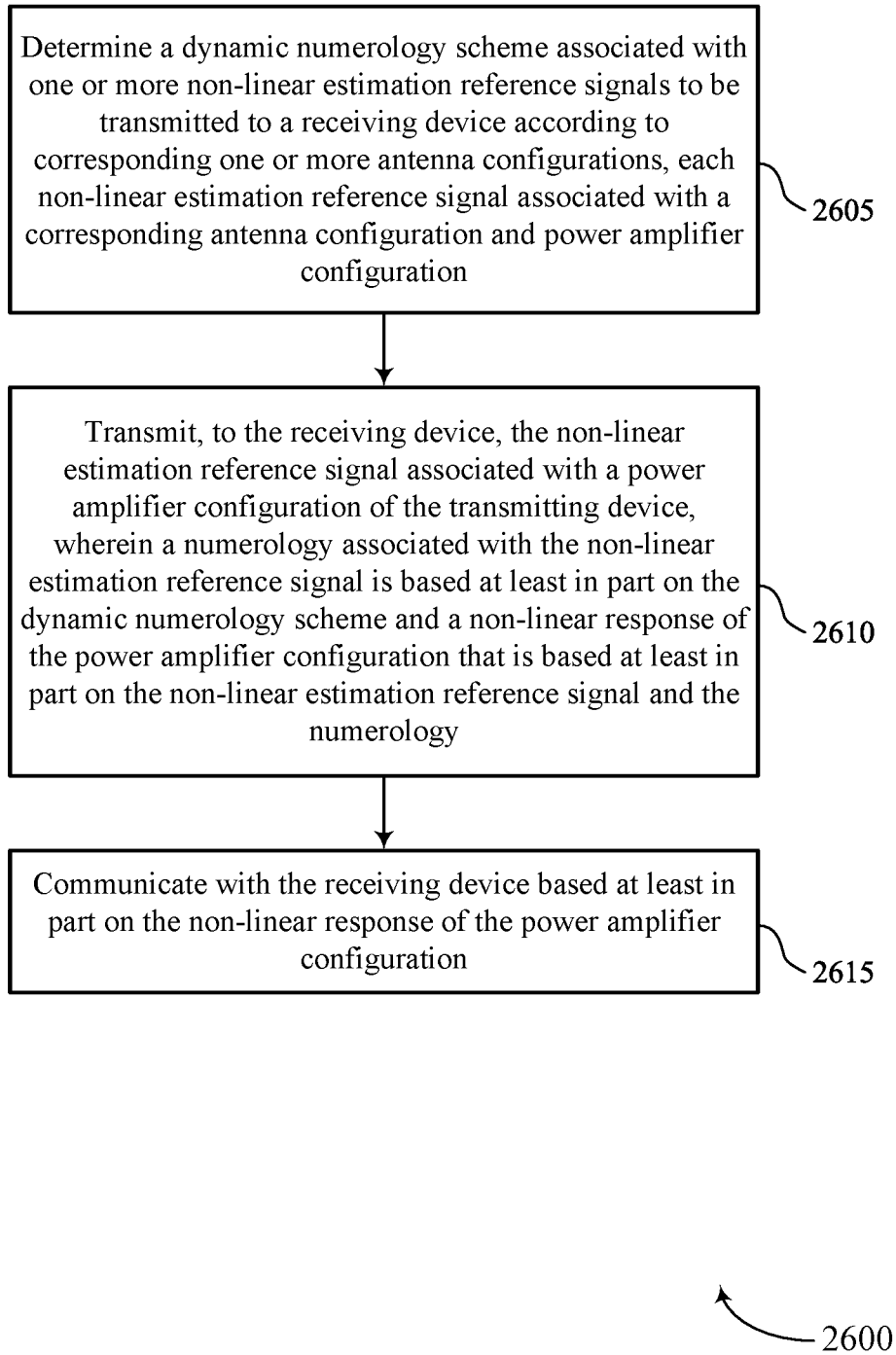

FIG. 26 shows a flowchart illustrating a method 2600 that supports non-linear reference signal design in accordance with aspects of the present disclosure. The operations of the method 2600 may be implemented by a base station or a UE or its components as described herein. For example, the operations of the method 2600 may be performed by a base station 105 or a UE 115 as described with reference to FIGS. 1 through 10 and 16 through 20. In some examples, a base station or a UE may execute a set of instructions to control the functional elements of the base station or the UE to perform the described functions. Additionally or alternatively, the base station or the UE may perform aspects of the described functions using special-purpose hardware.

At 2605, the method may include determining a dynamic numerology scheme associated with one or more NLEST-RSs to be transmitted to a receiving device according to corresponding one or more antenna configurations, each NLEST-RS associated with a corresponding antenna configuration and PA configuration. The operations of 2605 may be performed in accordance with examples as disclosed herein. In some examples, aspects of the operations of 2605 may be performed by a dynamic numerology manager 1845 as described with reference to FIG. 18.

At 2610, the method may include transmitting, to the receiving device, the NLEST-RS associated with a PA configuration of the transmitting device, where a numerology associated with the NLEST-RS is based on the dynamic numerology scheme and a non-linear response of the PA configuration that is based on the NLEST-RS and the numerology. The operations of 2610 may be performed in accordance with examples as disclosed herein. In some examples, aspects of the operations of 2610 may be performed by an NL-RS manager 1840 as described with reference to FIG. 18.

At 2615, the method may include communicating with the receiving device based on the non-linear response of the PA configuration. The operations of 2615 may be performed in accordance with examples as disclosed herein. In some examples, aspects of the operations of 2615 may be performed by a non-linear communication manager 1835 as described with reference to FIG. 18.

The following provides an overview of aspects of the present disclosure:

Aspect 1: A method for wireless communication at a receiving device, comprising: receiving, from a transmitting device, a channel estimation reference signal transmitted over a bandwidth, the channel estimation reference signal associated with a power amplifier configuration of the transmitting device; determining a channel estimation measurement associated with the power amplifier configuration based at least in part on the channel estimation reference signal; receiving, from the transmitting device, a non-linear estimation reference signal transmitted over a subset bandwidth of the bandwidth, the non-linear estimation reference signal associated with the power amplifier configuration; determining a non-linear estimation measurement associated with the power amplifier configuration based at least in part on the non-linear estimation reference signal and the channel estimation reference signal, the non-linear estimation measurement identifying a non-linear response of the power amplifier configuration; and communicating with the transmitting device based at least in part on the channel estimation measurement and the non-linear response of the power amplifier configuration.

Aspect 2: The method of aspect 1, further comprising: receiving a signal identifying a resource configuration for the channel estimation reference signal, the non-linear estimation reference signal, or both, wherein the channel estimation reference signal and the non-linear estimation reference signal are received based at least in part on receiving the signal identifying the resource configuration, the resource configuration for the channel estimation reference signal and the resource configuration for the non-linear estimation reference signal comprising a same resource configuration or a different resource configurations.

Aspect 3: The method of any of aspects 1 through 2, further comprising: receiving one or more instances of the channel estimation reference signal according to a repetition pattern of the channel estimation reference signal, wherein the channel estimation measurement is based at least in part on receiving the one or more instances of the channel estimation reference signal.

Aspect 4: The method of any of aspects 1 through 3, further comprising: receiving one or more instances of the non-linear estimation reference signal according to a repetition pattern of the non-linear estimation reference signal, wherein the non-linear estimation measurement is based at least in part on the one or more instances of the non-linear estimation reference signal.

Aspect 5: The method of any of aspects 1 through 4, further comprising: identifying an antenna configuration of the channel estimation reference signal, wherein the channel estimation measurement is for the antenna configuration and the power amplifier configuration.

Aspect 6: The method of any of aspects 1 through 5, further comprising: identifying an antenna configuration of the non-linear estimation reference signal, wherein the non-linear estimation measurement is for the antenna configuration and the power amplifier configuration.

Aspect 7: The method of any of aspects 1 through 6, wherein receiving the channel estimation reference signal comprises receiving during a first symbol, and receiving the non-linear estimation reference signal comprises receiving during a second symbol following the first symbol.

Aspect 8: The method of any of aspects 1 through 7, further comprising: receiving one or more instances of the channel estimation reference signal and one or more instances of the non-linear reference signal according to a periodic schedule, a semi-persistent schedule, aperiodically, or any combination thereof.

Aspect 9: A method for wireless communication at a transmitting device, comprising: identifying a channel estimation reference signal and a non-linear estimation reference signal associated with a power amplifier configuration of the transmitting device; transmitting, to a receiving device, the channel estimation reference signal transmitted over a bandwidth; transmitting, to the receiving device, the non-linear estimation reference signal transmitted over a subset bandwidth of the bandwidth; and communicating with the receiving device based at least in part on a channel estimation measurement based on the channel estimation reference signal and a non-linear response of the power amplifier configuration based on the non-linear estimation reference signal and the channel estimation reference signal.

Aspect 10: The method of aspect 9, further comprising: transmitting a signal identifying a resource configuration for the channel estimation reference signal, the non-linear estimation reference signal, or both, wherein the channel estimation reference signal and the non-linear estimation reference signal are transmitted based at least in part on the signal identifying the resource configuration, the resource configuration for the channel estimation reference signal and the resource configuration for the non-linear estimation reference signal comprising a same resource configuration or a different resource configuration.

Aspect 11: The method of any of aspects 9 through 10, further comprising: transmitting one or more instances of the channel estimation reference signal according to a repetition pattern of the channel estimation reference signal, wherein the channel estimation measurement is based at least in part on transmitting the one or more instances of the channel estimation reference signal.

Aspect 12: The method of any of aspects 9 through 11, further comprising: selecting an de-boosted transmit power level for the channel estimation reference signal.

Aspect 13: The method of any of aspects 9 through 12, further comprising: transmitting one or more instances of the non-linear estimation reference signal according to a repetition pattern of the non-linear estimation reference signal, wherein the non-linear estimation measurement is based at least in part on the one or more instances of the non-linear estimation reference signal.

Aspect 14: The method of any of aspects 9 through 13, further comprising: selecting a boosted transmit power level for the channel estimation reference signal.

Aspect 15: The method of any of aspects 9 through 14, further comprising: identifying an antenna configuration of the channel estimation reference signal, wherein the channel estimation measurement is for the antenna configuration and the power amplifier configuration.

Aspect 16: The method of any of aspects 9 through 15, further comprising: identifying an antenna configuration of the non-linear estimation reference signal, wherein the non-linear estimation measurement is for the antenna configuration and the power amplifier configuration.

Aspect 17: The method of any of aspects 9 through 16, wherein transmitting the channel estimation reference signal comprises transmitting during a first symbol, and transmitting the non-linear estimation reference signal comprises transmitting during a second symbol following the first symbol.

Aspect 18: The method of any of aspects 9 through 17, further comprising: transmitting one or more instances of the channel estimation reference signal and one or more instances of the non-linear reference signal according to a periodic schedule, a semi-persistent schedule, aperiodically, or any combination thereof.

Aspect 19: A method for wireless communication at a receiving device, comprising: determining a dynamic numerology scheme associated with one or more non-linear estimation reference signals to be transmitted from a transmitting device according to corresponding one or more antenna configurations, each non-linear estimation reference signal associated with a corresponding antenna configuration and a power amplifier configuration; receiving, from the transmitting device, a non-linear estimation reference signal associated with a power amplifier configuration of the transmitting device; determining a numerology associated with the non-linear estimation reference signal based at least in part on the dynamic numerology scheme and a non-linear response of the power amplifier configuration that is based at least in part on the non-linear estimation reference signal and the numerology; and communicating with the transmitting device based at least in part on the non-linear response of the power amplifier configuration.

Aspect 20: The method of aspect 19, further comprising: determining that transmission of the non-linear estimation reference signal are switched from a first multiplexing technique to a second multiplexing technique of one or more multiplexing techniques; and receiving, based at least in part on the dynamic numerology scheme, the non-linear estimation reference signal according to the second multiplexing technique using an index number associated with the non-linear estimation reference signal for the first multiplexing technique.

Aspect 21: The method of aspect 20, further comprising: identifying, based at least in part on the dynamic numerology scheme, the index number associated with the non-linear estimation reference signal for the first multiplexing technique, wherein the non-linear estimation reference signal is received according to the second multiplexing technique based at least in part on the index number.

Aspect 22: The method of any of aspects 20 through 21, wherein the first multiplexing technique comprises a frequency division multiplexing technique and the second multiplexing technique comprises a time division multiplexing technique.

Aspect 23: The method of any of aspects 20 through 22, wherein the first multiplexing technique and the second multiplexing technique each comprise a respective time division multiplexing technique.

Aspect 24: The method of any of aspects 20 through 23, wherein the one or more multiplexing techniques comprise a frequency division multiplexing technique, a time division multiplexing technique, a code division multiplexing technique, or any combination thereof.

Aspect 25: A method for wireless communication at a transmitting device, comprising: determining a dynamic numerology scheme associated with one or more non-linear estimation reference signals to be transmitted to a receiving device according to corresponding one or more antenna configurations, each non-linear estimation reference signal associated with a corresponding antenna configuration and power amplifier configuration; transmitting, to the receiving device, the non-linear estimation reference signal associated with a power amplifier configuration of the transmitting device, wherein a numerology associated with the non-linear estimation reference signal is based at least in part on the dynamic numerology scheme and a non-linear response of the power amplifier configuration that is based at least in part on the non-linear estimation reference signal and the numerology; and communicating with the receiving device based at least in part on the non-linear response of the power amplifier configuration.

Aspect 26: The method of aspect 25, further comprising: determining that transmission of the non-linear estimation reference signal has switched from a first multiplexing technique to a second multiplexing technique of the one or more multiplexing techniques; and transmitting, based at least in part on the dynamic numerology scheme, the non-linear estimation reference signal according to the second multiplexing technique using an index number associated with the non-linear estimation reference signal for the first multiplexing technique.

Aspect 27: The method of aspect 26, further comprising: identifying, based at least in part on the dynamic numerology scheme, the index number associated with the non-linear estimation reference signal for the first multiplexing technique, wherein the non-linear estimation reference signal is transmitted according to the second multiplexing technique based at least in part on the index number.

Aspect 28: The method of any of aspects 26 through 27, wherein the first multiplexing technique comprises a frequency division multiplexing technique and the second multiplexing technique comprises a time division multiplexing technique.

Aspect 29: The method of any of aspects 26 through 28, wherein the first multiplexing technique and the second multiplexing technique each comprise a respective time division multiplexing technique.

Aspect 30: The method of any of aspects 26 through 29, wherein the one or more multiplexing techniques comprise a frequency division multiplexing technique, a time division multiplexing technique, a code division multiplexing technique, or any combination thereof.

Aspect 31: An apparatus for wireless communication at a receiving device, comprising a processor; memory coupled with the processor; and instructions stored in the memory and executable by the processor to cause the apparatus to perform a method of any of aspects 1 through 8.

Aspect 32: An apparatus for wireless communication at a receiving device, comprising at least one means for performing a method of any of aspects 1 through 8.

Aspect 33: A non-transitory computer-readable medium storing code for wireless communication at a receiving device, the code comprising instructions executable by a processor to perform a method of any of aspects 1 through 8.

Aspect 34: An apparatus for wireless communication at a transmitting device, comprising a processor; memory coupled with the processor; and instructions stored in the memory and executable by the processor to cause the apparatus to perform a method of any of aspects 9 through 18.

Aspect 35: An apparatus for wireless communication at a transmitting device, comprising at least one means for performing a method of any of aspects 9 through 18.

Aspect 36: A non-transitory computer-readable medium storing code for wireless communication at a transmitting device, the code comprising instructions executable by a processor to perform a method of any of aspects 9 through 18.

Aspect 37: An apparatus for wireless communication at a receiving device, comprising a processor; memory coupled with the processor; and instructions stored in the memory and executable by the processor to cause the apparatus to perform a method of any of aspects 19 through 24.

Aspect 38: An apparatus for wireless communication at a receiving device, comprising at least one means for performing a method of any of aspects 19 through 24.

Aspect 39: A non-transitory computer-readable medium storing code for wireless communication at a receiving device, the code comprising instructions executable by a processor to perform a method of any of aspects 19 through 24.

Aspect 40: An apparatus for wireless communication at a transmitting device, comprising a processor; memory coupled with the processor; and instructions stored in the memory and executable by the processor to cause the apparatus to perform a method of any of aspects 25 through 30.

Aspect 41: An apparatus for wireless communication at a transmitting device, comprising at least one means for performing a method of any of aspects 25 through 30.

Aspect 42: A non-transitory computer-readable medium storing code for wireless communication at a transmitting device, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a receiving device, comprising:
    receiving, from a transmitting device, a channel estimation reference signal transmitted over a bandwidth, the channel estimation reference signal associated with a power amplifier configuration of the transmitting device;
    determining a channel estimation measurement associated with the power amplifier configuration based at least in part on the channel estimation reference signal;
    receiving, from the transmitting device, a non-linear estimation reference signal transmitted over a subset bandwidth of the bandwidth, the non-linear estimation reference signal associated with the power amplifier configuration;
    determining a non-linear estimation measurement associated with the power amplifier configuration based at least in part on the non-linear estimation reference signal and the channel estimation reference signal, the non-linear estimation measurement identifying a non-linear response of the power amplifier configuration; and
    communicating with the transmitting device based at least in part on the channel estimation measurement and the non-linear response of the power amplifier configuration.

2. The method of claim 1, further comprising:
    receiving a signal identifying a resource configuration for the channel estimation reference signal, the non-linear estimation reference signal, or both, wherein the channel estimation reference signal and the non-linear estimation reference signal are received based at least in part on receiving the signal identifying the resource configuration, the resource configuration for the channel estimation reference signal and the resource configuration for the non-linear estimation reference signal comprising a same resource configuration or a different resource configurations.

3. The method of claim 1, further comprising:
    receiving one or more instances of the channel estimation reference signal according to a repetition pattern of the channel estimation reference signal, wherein the channel estimation measurement is based at least in part on receiving the one or more instances of the channel estimation reference signal.

4. The method of claim 1, further comprising:
    receiving one or more instances of the non-linear estimation reference signal according to a repetition pattern of the non-linear estimation reference signal, wherein the non-linear estimation measurement is based at least in part on the one or more instances of the non-linear estimation reference signal.

5. The method of claim 1, further comprising:
    identifying an antenna configuration of the channel estimation reference signal, wherein the channel estimation measurement is for the antenna configuration and the power amplifier configuration.

6. The method of claim 1, further comprising:
    identifying an antenna configuration of the non-linear estimation reference signal, wherein the non-linear estimation measurement is for the antenna configuration and the power amplifier configuration.

7. The method of claim 1, wherein
    receiving the channel estimation reference signal comprises receiving during a first symbol, and
    receiving the non-linear estimation reference signal comprises receiving during a second symbol following the first symbol.

8. The method of claim 1, further comprising:
    receiving one or more instances of the channel estimation reference signal and one or more instances of the non-linear reference signal according to a periodic schedule, a semi-persistent schedule, aperiodically, or any combination thereof.

9. A method for wireless communication at a transmitting device, comprising:
    identifying a channel estimation reference signal and a non-linear estimation reference signal associated with a power amplifier configuration of the transmitting device;
    transmitting, to a receiving device, the channel estimation reference signal transmitted over a bandwidth;
    transmitting, to the receiving device, the non-linear estimation reference signal transmitted over a subset bandwidth of the bandwidth; and
    communicating with the receiving device based at least in part on a channel estimation measurement based on the channel estimation reference signal and a non-linear response of the power amplifier configuration based on the non-linear estimation reference signal and the channel estimation reference signal.

10. The method of claim 9, further comprising:
transmitting a signal identifying a resource configuration for the channel estimation reference signal, the non-linear estimation reference signal, or both, wherein the channel estimation reference signal and the non-linear estimation reference signal are transmitted based at least in part on the signal identifying the resource configuration, the resource configuration for the channel estimation reference signal and the resource configuration for the non-linear estimation reference signal comprising a same resource configuration or a different resource configuration.

11. The method of claim 9, further comprising:
transmitting one or more instances of the channel estimation reference signal according to a repetition pattern of the channel estimation reference signal, wherein the channel estimation measurement is based at least in part on transmitting the one or more instances of the channel estimation reference signal.

12. The method of claim 9, further comprising:
selecting an de-boosted transmit power level for the channel estimation reference signal.

13. The method of claim 9, further comprising:
transmitting one or more instances of the non-linear estimation reference signal according to a repetition pattern of the non-linear estimation reference signal, wherein
the non-linear estimation measurement is based at least in part on the one or more instances of the non-linear estimation reference signal.

14. The method of claim 9, further comprising:
selecting a boosted transmit power level for the channel estimation reference signal.

15. The method of claim 9, further comprising:
identifying an antenna configuration of the channel estimation reference signal, wherein the channel estimation measurement is for the antenna configuration and the power amplifier configuration.

16. The method of claim 9, further comprising:
identifying an antenna configuration of the non-linear estimation reference signal, wherein the non-linear estimation measurement is for the antenna configuration and the power amplifier configuration.

17. The method of claim 9, wherein
transmitting the channel estimation reference signal comprises transmitting during a first symbol, and
transmitting the non-linear estimation reference signal comprises transmitting during a second symbol following the first symbol.

18. The method of claim 9, further comprising:
transmitting one or more instances of the channel estimation reference signal and one or more instances of the non-linear reference signal according to a periodic schedule, a semi-persistent schedule, aperiodically, or any combination thereof.

19. A method for wireless communication at a receiving device, comprising:
determining a dynamic numerology scheme associated with one or more non-linear estimation reference signals to be transmitted from a transmitting device according to corresponding one or more antenna configurations, each non-linear estimation reference signal associated with a corresponding antenna configuration and a power amplifier configuration;
receiving, from the transmitting device, a non-linear estimation reference signal associated with a power amplifier configuration of the transmitting device;
determining a numerology associated with the non-linear estimation reference signal based at least in part on the dynamic numerology scheme and a non-linear response of the power amplifier configuration that is based at least in part on the non-linear estimation reference signal and the numerology; and
communicating with the transmitting device based at least in part on the non-linear response of the power amplifier configuration.

20. The method of claim 19, further comprising:
determining that transmission of the non-linear estimation reference signal are switched from a first multiplexing technique to a second multiplexing technique of one or more multiplexing techniques; and
receiving, based at least in part on the dynamic numerology scheme, the non-linear estimation reference signal according to the second multiplexing technique using an index number associated with the non-linear estimation reference signal for the first multiplexing technique.

21. The method of claim 20, further comprising:
identifying, based at least in part on the dynamic numerology scheme, the index number associated with the non-linear estimation reference signal for the first multiplexing technique, wherein the non-linear estimation reference signal is received according to the second multiplexing technique based at least in part on the index number.

22. The method of claim 20, wherein the first multiplexing technique comprises a frequency division multiplexing technique and the second multiplexing technique comprises a time division multiplexing technique.

23. The method of claim 20, wherein the first multiplexing technique and the second multiplexing technique each comprise a respective time division multiplexing technique.

24. The method of claim 20, wherein the one or more multiplexing techniques comprise a frequency division multiplexing technique, a time division multiplexing technique, a code division multiplexing technique, or any combination thereof.

25. A method for wireless communication at a transmitting device, comprising:
determining a dynamic numerology scheme associated with one or more non-linear estimation reference signals to be transmitted to a receiving device according to corresponding one or more antenna configurations, each non-linear estimation reference signal associated with a corresponding antenna configuration and power amplifier configuration;
transmitting, to the receiving device, the non-linear estimation reference signal associated with a power amplifier configuration of the transmitting device, wherein a numerology associated with the non-linear estimation reference signal is based at least in part on the dynamic numerology scheme and a non-linear response of the power amplifier configuration that is based at least in part on the non-linear estimation reference signal and the numerology; and
communicating with the receiving device based at least in part on the non-linear response of the power amplifier configuration.

26. The method of claim 25, further comprising:
determining that transmission of the non-linear estimation reference signal has switched from a first multiplexing technique to a second multiplexing technique of the one or more multiplexing techniques; and transmitting, based at least in part on the dynamic numerology scheme, the non-linear estimation reference signal according to the second multiplexing technique using an index number associated with the non-linear estimation reference signal for the first multiplexing technique.

27. The method of claim 26, further comprising:
identifying, based at least in part on the dynamic numerology scheme, the index number associated with the non-linear estimation reference signal for the first multiplexing technique, wherein the non-linear estimation reference signal is transmitted according to the second multiplexing technique based at least in part on the index number.

28. The method of claim 26, wherein the first multiplexing technique comprises a frequency division multiplexing technique and the second multiplexing technique comprises a time division multiplexing technique.

29. The method of claim 26, wherein the first multiplexing technique and the second multiplexing technique each comprise a respective time division multiplexing technique.

30. The method of claim 26, wherein the one or more multiplexing techniques comprise a frequency division multiplexing technique, a time division multiplexing technique, a code division multiplexing technique, or any combination thereof.

* * * * *